(12) United States Patent
Gould et al.

(10) Patent No.: US 7,668,827 B2
(45) Date of Patent: Feb. 23, 2010

(54) DISPLAY INTERFACE FOR NAVIGATING SEARCH RESULTS

(76) Inventors: Eric Justin Gould, 501 Lone Oak Dr., Austin, TX (US) 78704; Janna Buckmaster, 504 Lone Oak Dr., Austin, TX (US) 78704; Todd Wilkens, 1172 15$^{th}$ St., San Francisco, CA (US) 94103; Paulus W. Trisnadi, 6320 Convict Hill Rd., Austin, TX (US) 78749

( * ) Notice: Subject to any disclaimer, the term of this patent is extended or adjusted under 35 U.S.C. 154(b) by 251 days.

(21) Appl. No.: 11/514,287

(22) Filed: Aug. 31, 2006

(65) Prior Publication Data

US 2007/0112842 A1 May 17, 2007

Related U.S. Application Data

(63) Continuation of application No. 10/822,155, filed on Apr. 8, 2004, now Pat. No. 7,461,426, which is a continuation of application No. 10/268,109, filed on Oct. 8, 2002, now Pat. No. 6,745,201, which is a continuation of application No. 09/433,614, filed on Nov. 2, 1999, now Pat. No. 6,505,209.

(51) Int. Cl.
*G06F 7/00* (2006.01)
*G06F 17/30* (2006.01)

(52) U.S. Cl. .......................................... 707/6
(58) Field of Classification Search ....... 707/6
See application file for complete search history.

(56) References Cited

U.S. PATENT DOCUMENTS

| | | | |
|---|---|---|---|
| 5,590,250 A | 12/1996 | Lamping et al. | |
| 5,619,632 A | 4/1997 | Lamping et al. | |
| 5,812,135 A | 9/1998 | Kotchey | |
| 5,893,122 A | 4/1999 | Tabuchi | |
| 5,917,492 A * | 6/1999 | Bereiter et al. | 715/854 |
| 5,999,944 A | 12/1999 | Lipkin | |
| 6,128,617 A | 10/2000 | Lowry | |
| 6,185,585 B1 | 2/2001 | Sequeira | |
| 6,240,412 B1 | 5/2001 | Dyko et al. | |
| 6,289,342 B1 | 9/2001 | Lawrence et al. | |
| 6,339,767 B1 | 1/2002 | Rivette et al. | |

(Continued)

OTHER PUBLICATIONS

Official Action of Jul. 25, 2008, in U.S. Appl. No. 11/514,373, 17 pages.

(Continued)

*Primary Examiner*—Mohammad Ali
*Assistant Examiner*—Alexey Shmatov

(57) ABSTRACT

Navigating a collection of nodes by selecting a first node, generating a context list, and displaying the first node and list are discussed. Each context of a context collection includes a second node essentially referencing the first node. Another aspect includes a method of generating an address from a collection of contexts containing steps of receiving a selected attribute collection and generating the address. Another aspect includes a method of navigating a hypergraph including at least one context list containing at least one context including a node. The method includes steps of selecting a first context list of the context lists, selecting a first context of the first context list, and displaying the node of the first context of the first context list. Aspects also include computer programs implemented on computer readable media.

39 Claims, 42 Drawing Sheets

U.S. PATENT DOCUMENTS

| | | | |
|---|---|---|---|
| 6,370,551 B1 | 4/2002 | Golovchinsky et al. | |
| 6,377,287 B1 | 4/2002 | Hao et al. | |
| 6,496,208 B1 | 12/2002 | Bernhardt et al. | |
| 6,505,209 B1 | 1/2003 | Gould et al. | |
| 6,745,201 B2 | 6/2004 | Gould et al. | |
| 6,763,496 B1 | 7/2004 | Hennings et al. | |
| 6,816,175 B1 | 11/2004 | Hamp et al. | |
| 2002/0065810 A1* | 5/2002 | Bradley | 707/2 |
| 2004/0243254 A1 | 12/2004 | Gould et al. | |
| 2005/0228795 A1* | 10/2005 | Shuster | 707/10 |
| 2006/0085741 A1* | 4/2006 | Weiner et al. | 715/517 |
| 2006/0282483 A1* | 12/2006 | Hachio et al. | 707/204 |
| 2007/0106684 A1 | 5/2007 | Gould et al. | |
| 2007/0226204 A1* | 9/2007 | Feldman | 707/5 |

OTHER PUBLICATIONS

Johnson et al., "Tree-Maps: A Space-Filling Approach to the Visualization of Hierarchical Information Structures", IEEE Conference on Oct. 22-25, 1991, pp. 284-291.

Office Action of Sep. 28, 2006 in U.S. Appl. No. 10/822,155, 8 pages.

Response to Office Action of Sep. 28, 2006 in U.S. Appl. No. 10/822,155, 14 pages, dated Jan. 26, 2007.

Office Action of May 21, 2008 in U.S. Appl. No. 10/822,155, 8 pages.

Response to Office Action of May 21, 2008 in U.S. Appl. No. 10/822,155, 18 pages, dated Jul. 21, 2008.

Response to Office Action of Jul. 25, 2008 in U.S. Appl. No. 11/514,373, 22 pages, dated Oct. 24, 2008.

Notice of Allowance of Jul. 31, 2008 in U.S. Appl. No. 10/822,155, 10 pages.

Marc H. Brown and Robert A. Shillneri: "A New Paradigm for Browsing the Web"; CHI '95 Proceedings; 3 pages.

* cited by examiner

Figure 7

Prior art

| Second Level 302 | First Level 304 | URL 306 | 300 |
|---|---|---|---|
| acme 312 | com 314 | 1.2.3.141 316 | 310 |
| monkey 322 | com 324 | 101.11.23.121 326 | 320 |
| uspto 332 | gov 334 | 121.101.1.5 336 | 330 |
| ... | ... | ... | ... |

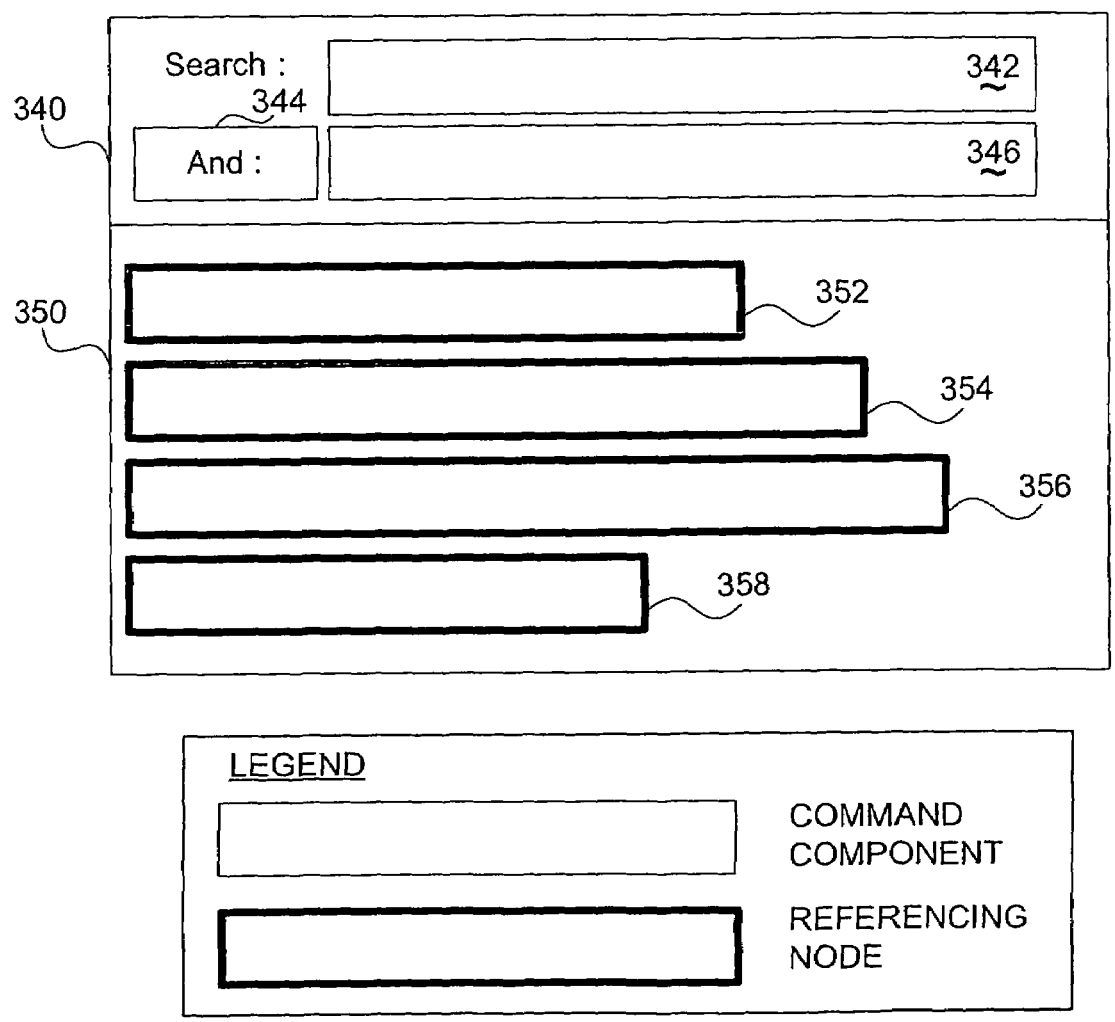

Figure 8B
Prior art
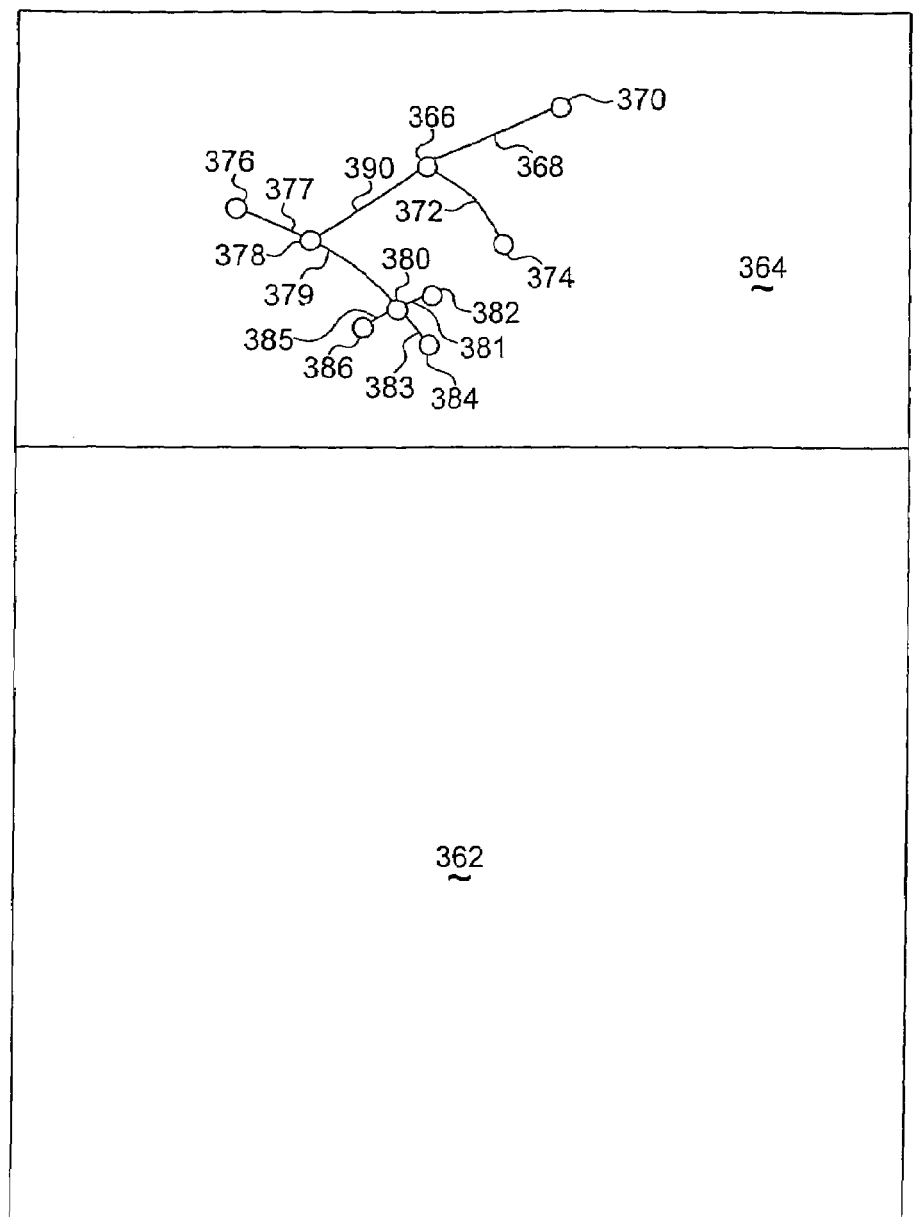
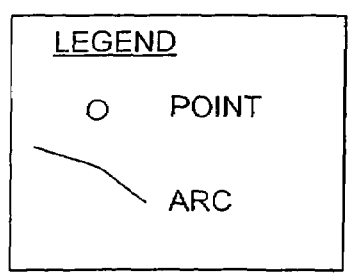

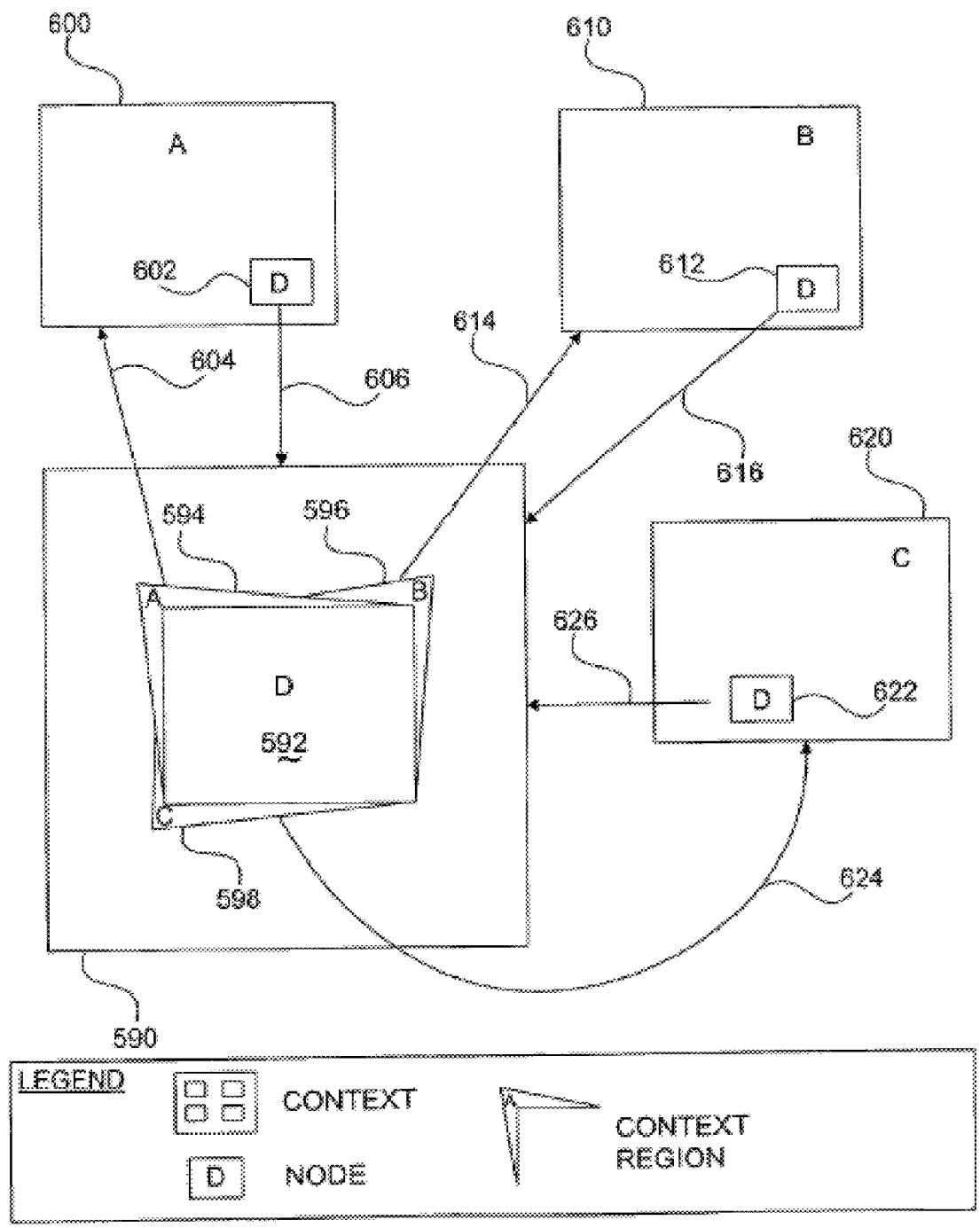
Figure 15
Amended

Figure 21
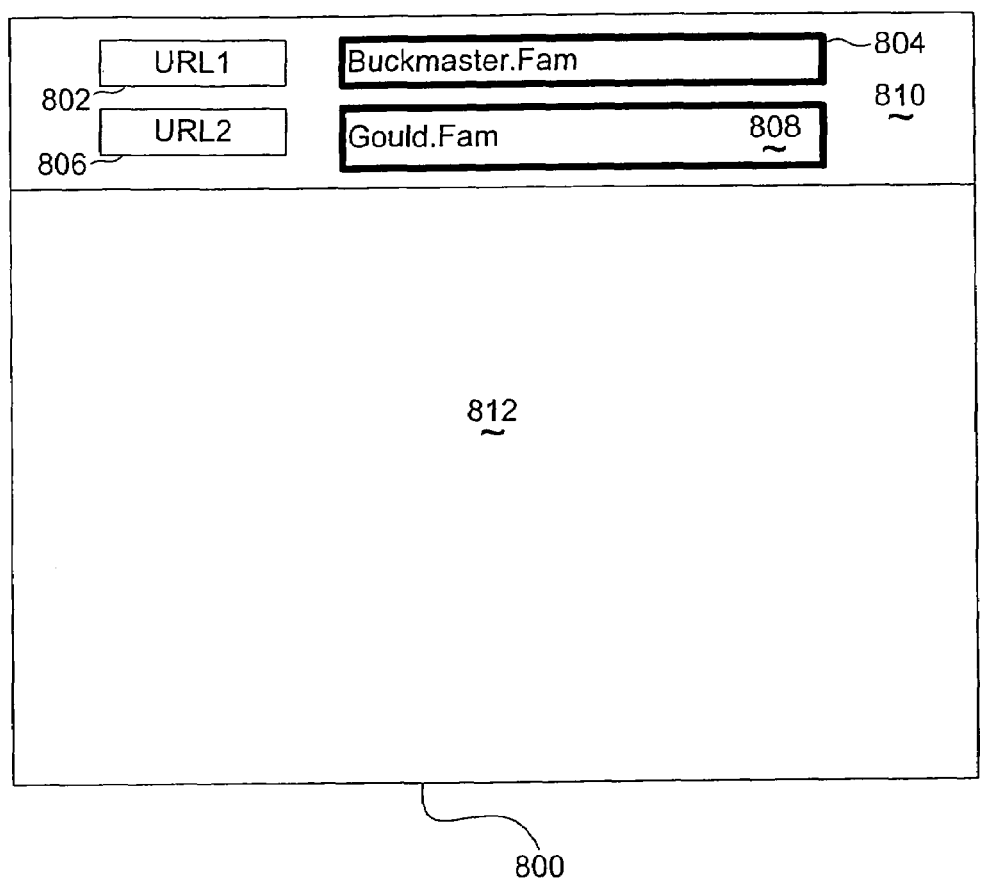
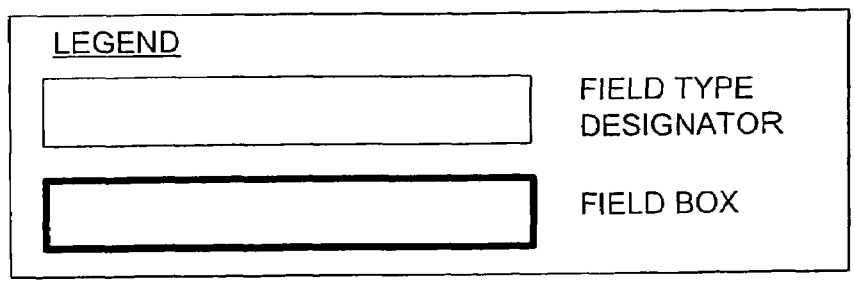

Figure 23
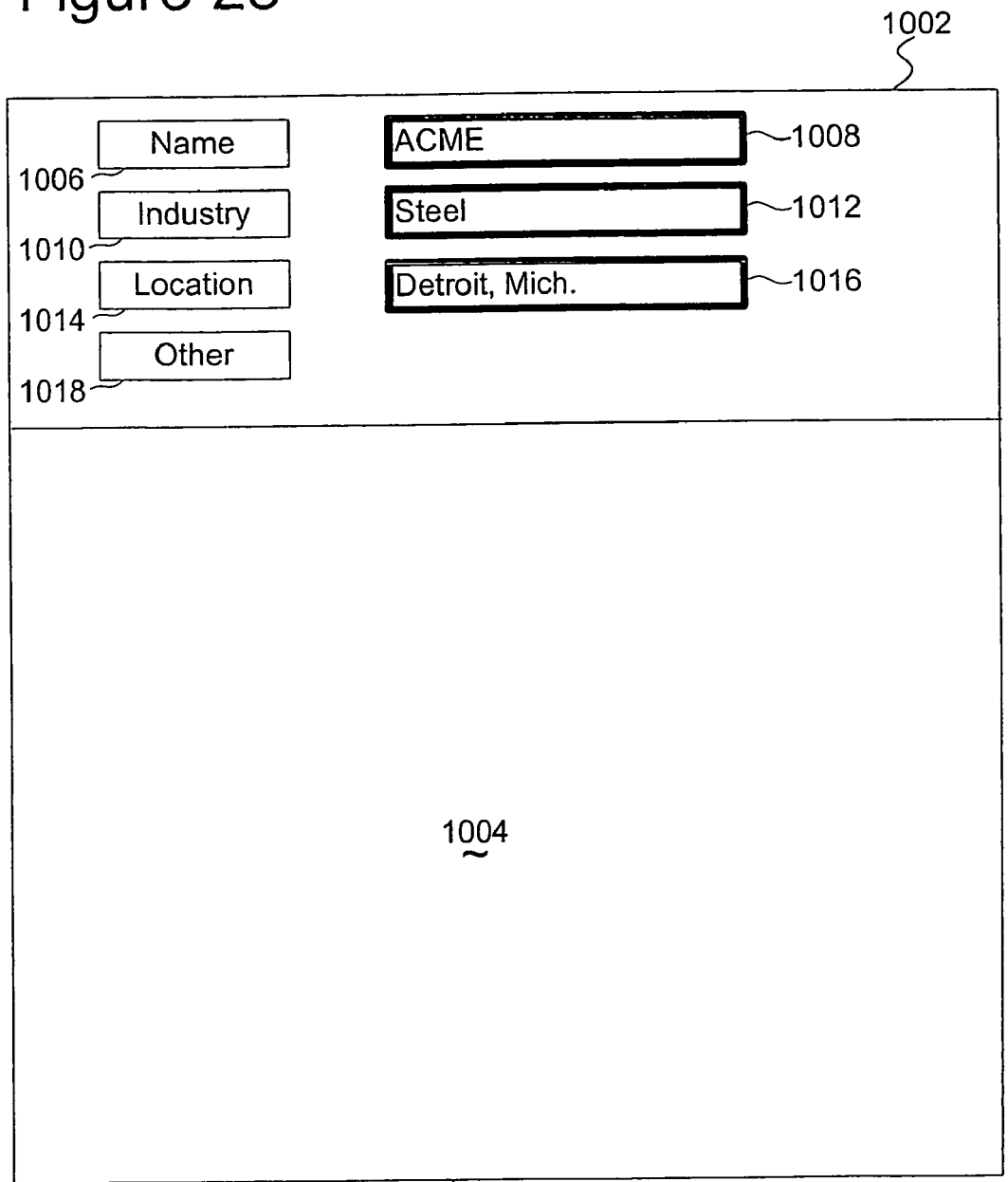
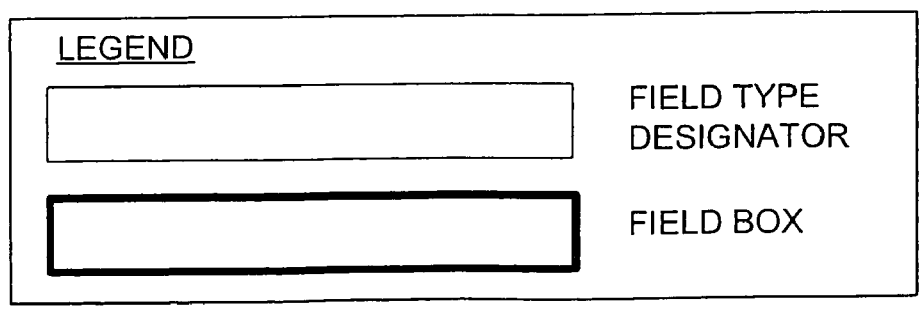

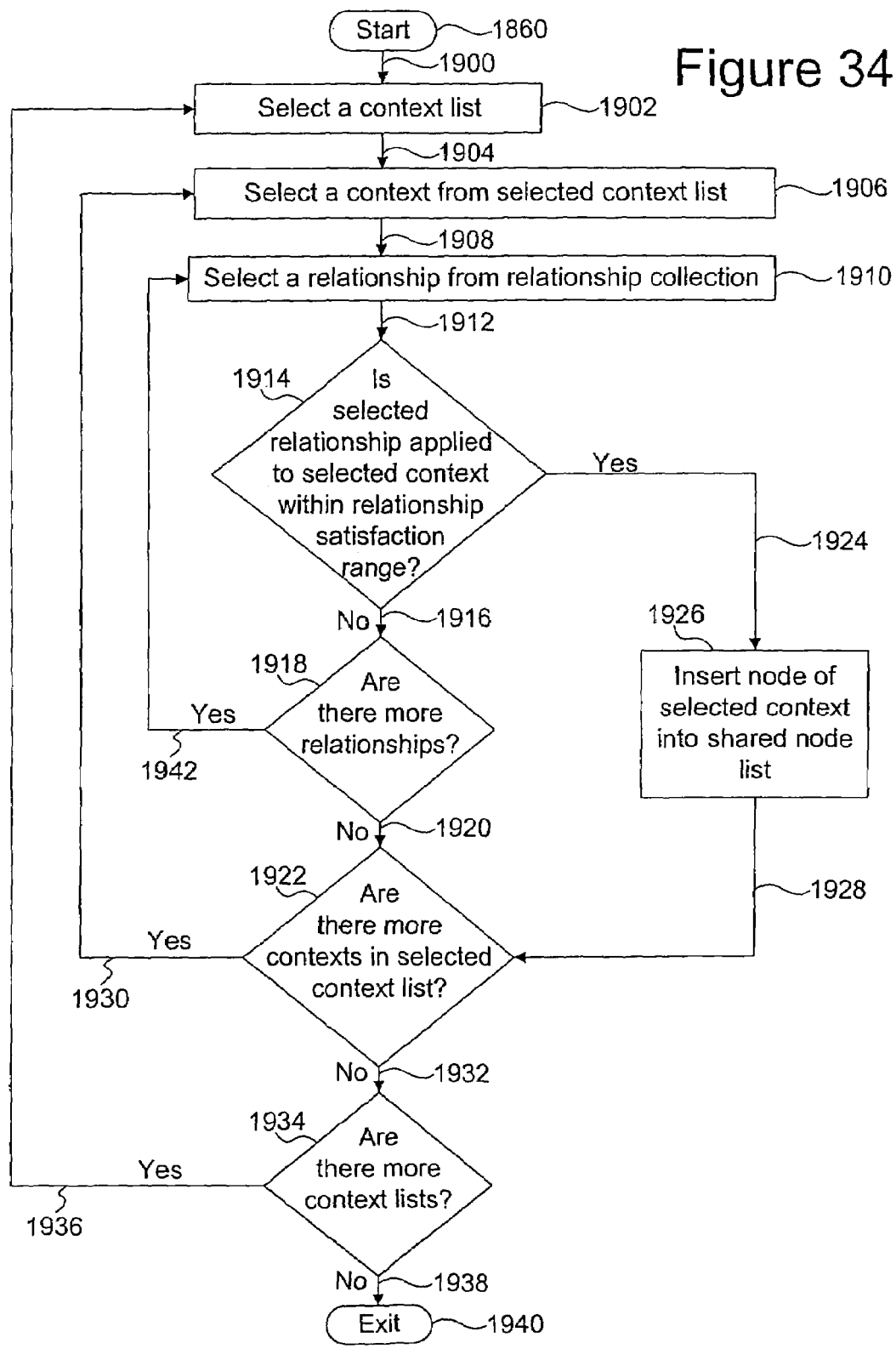

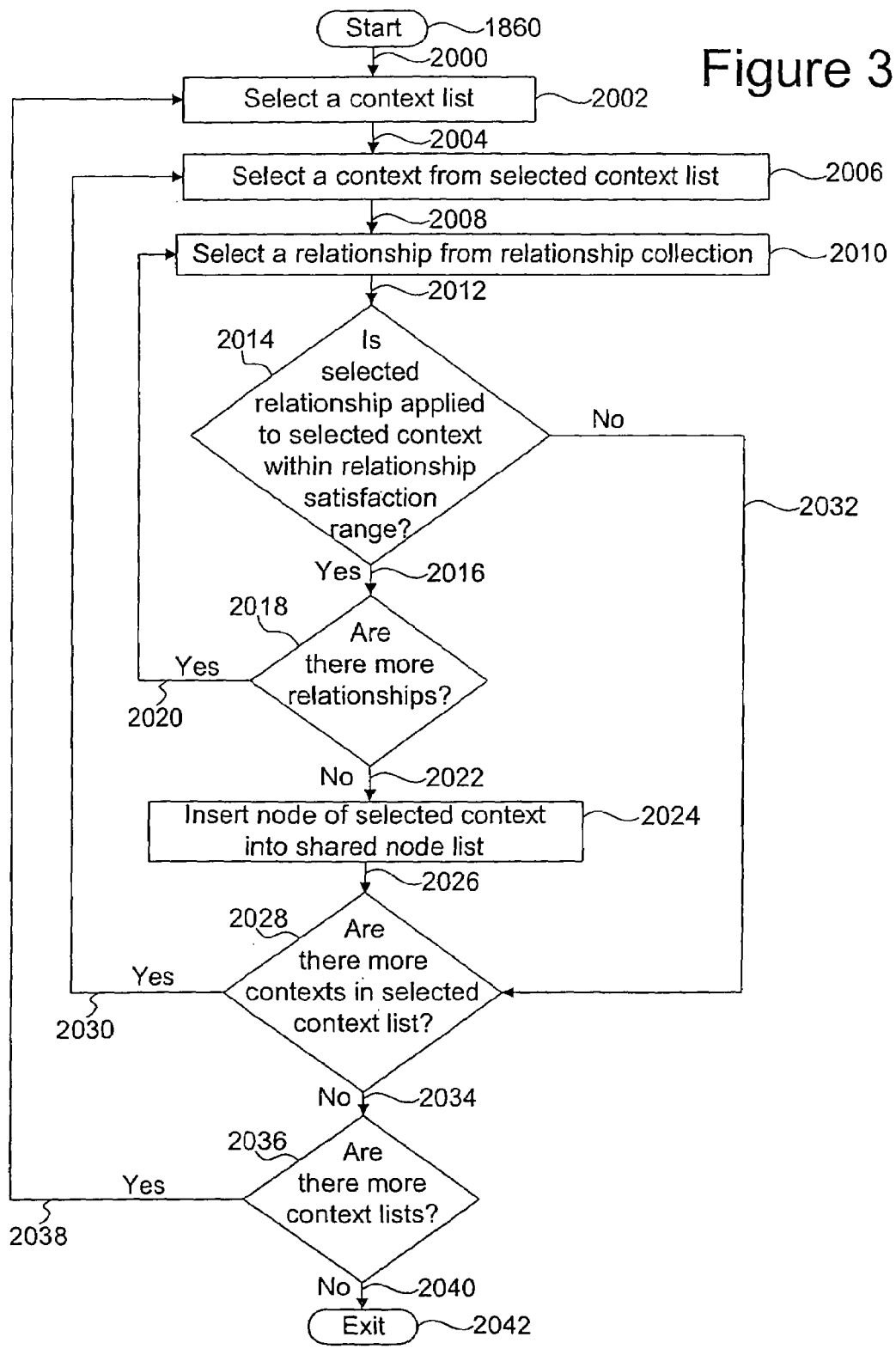

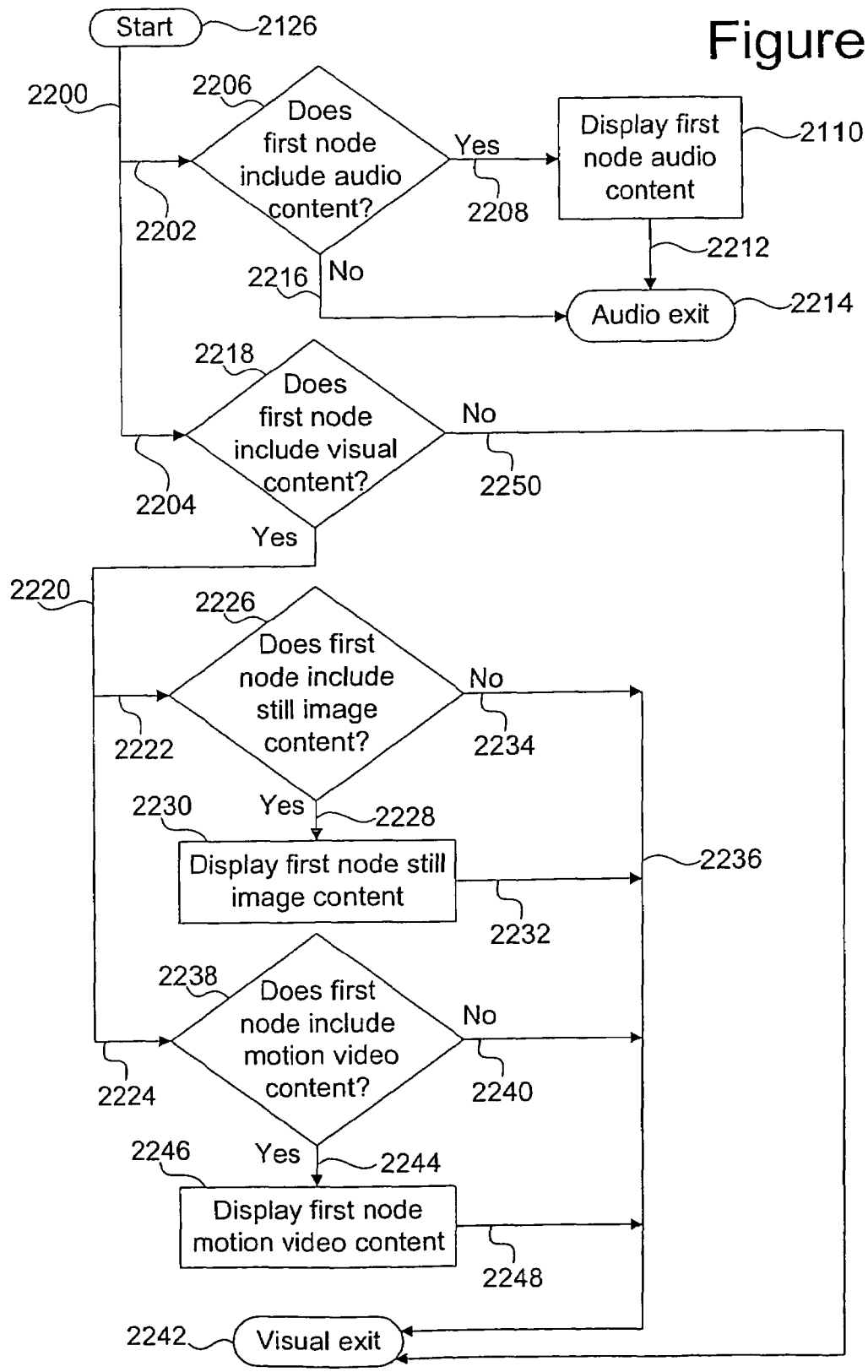

US 7,668,827 B2

DISPLAY INTERFACE FOR NAVIGATING SEARCH RESULTS

This application is a continuation of U.S. patent application Ser. No. 10/822,155, entitled "Poly Vectoral Reverse Navigation", filed Apr. 8, 2004, now U.S. Pat. No. 7,461,426 which is a continuation of U.S. patent application Ser. No. 10/268,109, entitled "Poly Vectoral Reverse Navigation", filed Oct. 8, 2002, now U.S. Pat. No. 6,745,201, which is a continuation of U.S. patent application Ser. No. 09/433,614, entitled "Poly Vectoral Reverse Navigation", filed Nov. 2, 1999, now U.S. Pat. No. 6,505,209.

BACKGROUND OF INVENTION

This invention relates to the selection of a first node which may be a file and references to that first node and the display of the first node and its references. This invention relates to address generation such as found on internet domain name servers. This invention relates to the display and navigation of context lists and relationships between contexts. This invention relates to hypergraph viewing and navigation.

FIG. 1 illustrates a prior art computer comprising one or more enclosures 10, housing a display device 12, selector device 14, and communication 16 between selector device and system, keyboard 20 and communication 22 between keyboard and system as well as door 24 for removable media. Enclosure 10 is shown herein with minimal detail by way of illustration. In practice, prior art system enclosures 10 relevant to this invention include but are not limited to television-style cases, desktop computer enclosures, notebook computer enclosures, hand held computer enclosures and rack-mounted computer enclosures. Many of these enclosures 10 incorporate speakers with them, in some instances, being perceived separate from the enclosure 10. Note that there are a number of systems containing more than one enclosure 10, as illustrated, such as a number of desktop computers, televisions with set top boxes and often, additional removable media interfaces such as DVD players. Prior art servers are often rack-mounted and in many circumstances, possess minimal display device 12, selector device 14 and keyboard 20 capabilities. Such minimal display device 12, selector device 14 and keyboard 20 capabilities may for instance be shared between several servers mounted in one rack.

Relevant prior art display devices 12 are also widely varied in form and specifics of operation. Relevant prior art display devices 12 may present black and white or color images. Relevant prior art display devices 12 may support either a vector or raster format. Relevant prior art display devices 12 may present images in either a 2-D, 3-D or multi-dimensional presentation view or collection of views.

Relevant embodiments of selector device 14 include but are not limited to contemporary television channel selectors, home entertainment center remote controls, computer pointing devices including but not limited to 3-D and 2-D mouse-style pointers, pen tablets, track balls, touch pads, key pads and joysticks. As illustrated in FIG. 1, the selector device communicates via physical transport mechanism 16 with an interface housed in enclosure 10. Relevant physical transport mechanisms 16 include but are not limited to infra-red, micro-wave and other similar wireless transport layers, as well as wires and optical fiber. The mechanism by which communication is carried out based upon the specific physical transport mechanism employed is not relevant to this invention and will not be discussed for that reason.

Keyboards 20 may be attached to various relevant, prior art systems. Keyboards 20 may house touch pads and mouse sticks which in certain cases are the relevant selector device 14 of that system.

FIG. 2 displays a system block diagram of a prior art computer. The units (12, 14, 20 and 54) on the left side and bottom of this figure all have a major role in the input and output flows processed and are controlled by the second column of units (46, 38, 42 and 58), respectively. The data transport mechanisms between units (12, 14, 20 and 54) and units (46, 38, 42 and 58) are represented by arrows (52, 16, 22 and 56), respectively. These units interact with each other and an overall control circuit labeled digital controller 50 via arrows representing buses (48, 44, 40, 60). Additionally, units 30 and 34 interact with digital controller 50 as represented by arrows 32 and 36, respectively. Digital controller 50 in turn has RAM and Nonvolatile memory, which it controls and uses to direct the overall operation of relevant prior art systems via buses.

Relevant prior art display devices 12 may present black and white or color images in either a vector or raster format representing images in either a 2-D, 3-D or multi-dimensional presentation view or collection of views. Relevant display data transport 52 includes but is not limited to NTSC, PAL or various HDTV television protocols of either analog or digital formats, as well as digital and analog RGB and various flat panel display interface protocols as are often used with computer displays. Many systems today possess a specialized display interface 46, which often incorporates one or more temporary frame buffers and MPEG decoding acceleration technology as well as acceleration technology for a variety of graphics operation. The communication mechanism 48 by which these units interact with the rest of an exemplary prior art system include but are not limited to microcomputer busses such as PCI and AGP as well as dedicated communication paths. Display devices 12 comprise traditional display devices and force feedback tactile and auditory display devices.

The selector device 14, selector device communication mechanism 16 and selector interface 38 have been discussed above. The communication between the selector interface 38 and the rest of the system is denoted by arrow 44. Embodiments of arrow 44 include but are not limited to addressable interfaces on computer busses including but not limited to ISA, PCI and USB.

Relevant, prior art removable media interface 34 embodiments include but are not limited to optical disk players and electromagnetic disk players of a removable media. These removable media interfaces 34 embodiments further include but are not limited to CD ROM, MPEG and DVD players. Such removable media interface 34 embodiments may further include the ability to write to the storage media as well as play the storage media. Relevant removable media interface 34 embodiments include but are not limited to various SCSI controllers, specialized optical disk controllers, specialized hard disk controllers and RAID disk array controllers. Removable media interface 34 embodiments may further include but are not limited to various continuous play media compression decoders: MPEG decoders and DVD decoders. Relevant prior art communications mechanisms 36 include but are not limited to various SCSI, RAID, ISA and EISA interfaces.

Note that in relevant prior art systems, there may be more than one, potentially distinct, removable media interface 34 with potentially distinct interfaces and communication paths 36. One removable media interface 34 might support a writeable CD ROM using a SCSI controller as well as a second DVD-ROM player with its own cabling and player interface 34.

Additionally mass storage 30 with communication coupling to digital controller 50 represented by arrow 32 may possess a similar range of operational characteristics: Mass storage 30 embodiments often possess a file management system afforded by operating systems such as UNIX, LINUX, Microsoft Windows™, MacOS™, among others. Mass storage 30 embodiments include but are not limited various electro-magnetically encoded media as well optically encoded media. Mass storage 30 embodiments include but are not limited read-only, plus write-once and read often and read-write media. Mass storage 30 embodiments include but are not limited to various SCSI controllers, specialized optical disk controllers, specialized hard disk controllers and RAID disk array controllers. Removable media interface 34 embodiments may further include but are not limited to various continuous play media compression decoders: MPEG decoders and DVD decoders. Relevant prior art communications mechanisms 32 include but are not limited to various SCSI, RAID, ISA and EISA interfaces.

Another relevant source of continuous play media content is provided via external environment 54 communicating with external interface 58 via arrow 56. One relevant external interface 58 is a radio frequency (RF) tuner. Relevant RF tuners 58 include but are not limited to demodulators and/or modulators for various broadcast protocols such as Frequency Modulation (FM), Frequency Division Multiple Access (FDMA), Time Division Multiple Access (TDMA), various spread spectrum protocols, Wavelength Division Multiple Access and wavelet division multiple access. Relevant spread spectrum protocols further include but are not limited to Direct Sequence, Frequency Hopping, Time Hopping and Wideband CDMA. These relevant RF tuners may be connected 56 by wireline or wireless physical transport layers. Relevant wireline physical transports include but are limited to twisted pair, coaxial cable and various optical fiber mechanisms. Relevant wireless physical transports 56 include contemporary broadcast television, High Definition TV (HDTV), as well as various radio frequency, microwave and infra red schemes which may well incorporate an antenna, sensor or array of antennas or sensors.

Another relevant external interface 58 is a modem. Relevant modems include but are not limited to telephone line modems incorporating various transceiver rates which may not be the same for reception as for transmission, as well as various DSL, ADSL, XDSL, ISBN, Ethernet, Token Ring and ATM interfaces. Physical transport layer 56 for modems include but are not limited to wire line and wireless transport layers. Wire line physical transport layers 56 include but are not limited to telephone lines, twisted pair wire lines, coaxial cabling and various optical fiber technologies. Wireless transport layers 56 include but are not limited to directional and non-directional radio, microwave, infrared and optical schemes.

The external environment 54 may be physically located a substantial distance away from the enclosure 10. The external environment 54 is often embodied in many circumstances within a server supporting a network of user systems via interconnections 56 of these external interfaces 58. Such networks may well support TCP/IP thereby enabling support for the Internet. Such networks may further support one or more Intranets. Such networks may further support one or more Extranets.

Note that in many relevant prior art systems, there is more than one kind of external environment 54 and external interface 58 with potentially different communication paths 56. A settop box might possess both a RF tuner using an antenna as well as an optical fiber interface to a cable television provider. A notebook computer might well have both a telephone line modem and an Ethernet LAN interface.

Relevant prior art digital controller 50 embodiments include but are not limited to one or more of the following: general purpose microprocessors, Digital Signal Processors (DSPs), parallel processors, embedded controllers and special purpose system controllers. General purpose microprocessors include but are not limited to various word width Complex Instruction Set Computers (CISC) and Reduced Instruction Set Computers (RISC). DSPs include but are not limited to various word width computers employing instruction sets allowing at least one add/subtract operation as well as at least one operation comparable to multiplication to be performed in a single instruction cycle. Parallel processors include but are not limited to Single Instruction Multiple Datapath (SIMD), Multiple Instruction Multiple Datapath (MIMD), and hybrid SIMD/MIMD organizations of either uniform or non-uniform processors. Uniform processor parallel processors employ essentially the same processor uniformly. Non-uniform processor parallel processors do not employ essentially the same processor throughout. Embedded controllers often incorporate either one or more microprocessors or DSPs along with additional circuitry performing specialized data processing, which may include but is not limited to MPEG stream partitioning and/or decoding, copy protection processing, decryption, authentication and block data error detection and correction. Special purpose system controllers include but are not limited to various implementations as Programmable Logic Arrays (PLAs), Complex Programmable Logic Devices (CPLDs), Field Programmable Gate Arrays (FPGAs), Application Specific Integrated Circuits (ASICs) and Application Specific Standard Products (ASSPs).

Relevant prior art digital controllers 50 often possess local memory resources in the form of RAM and nonvolatile memory, interfaced via busses. The RAM may include but is not limited to various forms of RAM and one or more caching banks of RAM. Relevant prior art digital controller 50 embodiments may include but are not limited to one or more of memory caches physically proximate to and possibly contained within the digital controller 50 package or packages. Memory caching may include but is not limited to separate caching of memory and data. Memory caching may further include but is not limited to multiple layers of cache structures. Distinct processors within the digital controller 50 may further possess distinct caches as well as further localized memory which may in turn include RAM and/or nonvolatile memory. Relevant prior art nonvolatile memory may include but is not limited to boot ROMs and flash memory circuits which may further emulate disk drives with a form of file management system. Such nonvolatile memory embodiments may be used to initialize the system as well as provide security and accounting information or store content.

FIG. 3 displays a prior art file system configuration showing references as hard aliases of a node 114. In such configurations, there is an assumption of a root 100 for the file system. Arrows 102, 104 and 106 indicate directory paths to file folders 108, 110 and 112, respectively. File folders 108, 110 and 112 in turn contain nodes 114, 126 and 132, respectively. Node 114 includes 122 file 116 further including content 120, which is addressed by the file management system as 118, specifying a path and filename as "Path1/file1". Note that in many file management systems, 122 is a data structure known variously as a descriptor. Node 126 has a descriptor 128, which is a soft alias to node 114. Node 132 has a descriptor 134, which is a soft alias to node 114. Access of nodes 126 and/or 132 will be indirect accesses of node 114. When a node is accessed, the access immediately proceeds to the node 114, which accesses the file 116 and the path and filename at 126 or 132 is lost. This mechanism has been used extensively in UNIX-style file management systems. It has been used advantageously to develop extensive software systems such as compilers and VLSI simulation and Computer Aided Design tools and environments.

There is however a persistent problem in such systems: there is no commonly available mechanism by which someone can find all the references to a given node. This can lead to quite inconvenient situations when there is an unknown reference node causing problems in the software environment. By way of example, if there is an incorrect reference to a 3 input nand gate model, rather than a four input nand gate model in a behavioral simulation, it can be quite expensive to track down the faulty reference.

There is another problem inherent in this situation, which is subtle but which has wide-ranging consequences. To discuss the problem requires development of some terms and a look at part of the history of computing. A standard conceptual tool in computer science is the graph, by which is meant a total collection of "points" and a collection of "arcs", each connecting a first point and a second point. A directed graph is a graph in which the arcs are arrows from a first point to a second point. In an undirected graph, an arc connecting point 1 to point 2 is the same as the same as an arc connecting point 2 to point 1. A path of a graph is an ordered collection of arcs $1, 2, \ldots, A_{n-1}, A_n$ where the first point of 2 is the second point of 1, etc, till the first point of $A_n$ is the second point of $A_{n-1}$. A graph has a cycle if there are two points possessing two distinct paths between those two points, or alternatively, there is a path where the first point of the first arc of the path is the second point of the last arc in the path. An acyclic graph is a graph containing no cycles. A graph is connected if for any two points of the graph, there is a path between those two points. A tree is a connected, acyclic graph. A tree can be seen as having a root point from which all other points in the tree are connected by arcs.

Computer science has found these terms to be extremely useful in providing a basic language about which to conceptualize a number of important mechanisms used in computing for years. File management systems have been consistently portrayed in operating systems such as UNIX, MSDOS (now Windows) and MacOS (which incorporates a form of UNIX) as hierarchical directory structures. These hierarchical directory structures are acyclic graphs, trees, proceeding from a specific root point (directory). This was and is a major feature of UNIX as well as MSDOS (now Windows) and MacOS. The problem with this hierarchical portrayal of file systems is that hard aliases often fail to conform with the model. Hard aliases essentially create cycles in the graph of a file system. Such a portrayal of a file system as a cyclic graph runs counter to the standard teachings on file management systems as seen in UNIX, MSDOS, Windows and MacOS. The discussion of FIG. 3 and the following prior art figures will document situations where users want to see their file structures in the above-mentioned operating systems in ways these operating systems do not even conceptually permit. A standard perspective on file systems (in particular, UNIX file systems) is to be found in "Chapter 2:The File System", on pages 41-70, *The UNIX Programming Environment*, by Brian W. Kernighan and Rob Pike, © 1984 Bell Telephone Laboratories, Incorporated, published by Prentice-Hall, Inc.

FIG. 4 displays a prior art file system configuration showing references to soft aliases of a node 114. As in FIG. 1, there is an assumption of a root 100 for the file system. Arrows 102, 104 and 106 indicate directory paths to file folders 108, 110 and 112, respectively. File folders 108, 110 and 112 in turn contain nodes 114, 150 and 170, respectively. Node 114 includes file 116 further including through descriptor 122, content 120, which is addressed by the file management system as 118, specifying a path and filename as "Path1/file1". Node 150 includes file 152 further including through descriptor 158, content 156, which is addressed by the file management system as 154, specifying a path and filename as "Path2/file2". Node 170 includes file 172 further including through descriptor 178, content 176, which is addressed by the file management system as 174, specifying a path and filename as "Path3/file3". Descriptors 158 and 178 act as soft aliases to node 114, essentially mirroring the contents at their respective locations in the file name system. The advantage this brings is the ability to retain the local path and file name at nodes 150 and 170.

The disadvantage is the difficulty discovering whether nodes 150 and 170 are the sources of their file contents, or aliases of it. The persistent problem discussed above also shows up in such system configurations: there is no commonly available mechanism by which someone can find all the soft and hard references to a given node 114. This can lead to quite inconvenient situations when there is an unknown reference node causing problems in the software environment. By way of example, if there is an incorrect reference to a 3 input nand gate model, rather than a four input nand gate model in a behavioral simulation, it can be quite expensive to track down the faulty reference.

Note that in this situation, we again encounter a cyclic graph, when the file management system is "supposed" to be a directory tree. File management systems have been consistently portrayed in operating systems such as UNIX, MSDOS (now Windows) and MacOS (which incorporates a form of UNIX) as hierarchical directory structures. These hierarchical directory structures are connected acyclic graphs, trees, each proceeding from a specific root point (directory). This was and is a major feature of UNIX as well as MSDOS (now Windows) and MacOS. The problem with this hierarchical portrayal of file systems is that soft aliases often fail to conform with the model. Soft aliases essentially create cycles in the graph of a file system. Such a portrayal of a file system as a cyclic graph runs counter to the standard teachings on file management systems as seen in UNIX, MSDOS, Windows and MacOS. The users again want to see their file structures in the above-mentioned operating systems in a manner these operating systems do not even conceptually permit.

FIG. 5 displays a prior art file system configuration showing references essentially containing the content of a node 114. As in FIG. 1, there is an assumption of a root 100 for the file system. Arrows 102, 104 and 106 indicate directory paths to file folders 108, 110 and 112, respectively. File folders 108, 110 and 112 in turn contain nodes 114, 190 and 210, respectively. Node 114 includes through descriptor 122 file 116 further including content 120, which is addressed by the file management system as 118, specifying a path and filename as "Path1/file1". Node 190 includes file 192 further including through descriptor 198, content 196, which is addressed by the file management system as 194, specifying a path and filename as "Path2/file4". Node 210 includes file 212 further including through descriptor 218, content 216, which is addressed by the file management system as 214, specifying a path and filename as "Path3/file5".

In the portrayed situation, the content 120 is essentially contained in content 196, as well as the content 120 is essentially contained in content 216. In a first situation, content 120 is essentially copied as content 196. One example occurs when content 120 is exactly content 196. A file may have been exactly copied from a remote server to the local system in order to minimize network traffic. Such often happens in communication intensive software tasks, such as behavioral electronic simulations. In another exemplary situation, the content 120 is essentially the same as content 196. Consider that file 116 and file 192 may be word-processor versions of the same document, only differing in a type font setting. File 116 and file 192 may be graphics file versions of the same picture, only differing in a color scheme selection, such as differing shades of blue. In yet another exemplary situation, content 120 is essentially incorporated into the content 216. File 116 may be an earlier version of file 210. Alternatively, content 120 may have been used as a background in content 216. This often occurs in graphical applications: A view 120 has other objects superimposed upon it to create content 216. Additionally, content 120 may be clipped to a sub-image, which is then incorporated into a large image to create content 216. Such operations have been seen repeatedly in "clipping out" a face from a photo to incorporate it into a different background. Note that content 120 may alternatively be an audio sequence and content 210 may be an audio or audio-video sequence. Note that the above examples of image data include but are not limited to both still frame, motion video and integrated motion video and audio. In each of these situations, it is very difficult to create the collection of which nodes essentially reference node 114 with conventional tools.

Note that essential containment again often creates cyclic graphs traversing a file system. The cyclic graph is encountered, contradicting the file management system, which is "supposed" to be a directory tree. File management systems have been consistently portrayed in operating systems such as UNIX, MSDOS (now Windows) and MacOS (which incorporates a form of UNIX) as hierarchical directory structures. These hierarchical directory structures are connected acyclic graphs, trees, proceeding from a specific root point (directory). This was and is a major feature of UNIX as well as MSDOS (now Windows) and MacOS. The problem with this hierarchical portrayal of file systems is that hard aliases often fail to conform with the model. Hard aliases essentially create cycles in the graph of the file system. Such a portrayal of a file system as a cyclic graph runs counter to the standard teachings on file management systems as seen in UNIX, MSDOS, Windows and MacOS. The users want to see their file structures in the above-mentioned operating systems in a manner these operating systems do not even conceptually permit.

Another situation illustrating this involves the use of archive files. Archive files include but are not limited to files containing compressed versions of the content of other files. Often a library with the content of multiple files is to be found in an archive file. Archive file technology is often used to build intermediate versions of software program components prior to the linkage editor phase of program generations, as well as in the form of "dll" (Dynamic Link Libraries) in the Windows systems. Archive file technology is also used to compress information to be transmitted or placed on some form of portable media, such as floppy disk, CD ROM, etc. In such cases, there is a file which essentially contains the content of one or more other files, again causing arrows from one or more points throughout a file system directory tree to create cycles in the graph. In essence, people repeatedly break the acyclic graph-model of a hierarchical directory structure in the process of using their computers. It is a problem that the standard hierarchical file system model does not account for.

Archival files also reveal another subtle but very significant problem which requires development of some terminology. Hypergraphs are defined as a total collection of points and a collection of hyper-arcs. Each hyper-arc is composed of at least two points. By way of example, assume a first hyper-arc composed of PT1, PT2 and PT3; a second hyper-arc composed of PT2, PT3 and PT1. The first hyper-arc is essentially equal to the second hyper-arc. A directed hypergraph is a hypergraph in which each the points of each hyper-arc are ordered. Assume now that the point ordering of the first and second hyper-arc were as portrayed, then the first hyper-arc would not be essentially equal to the second hyper-arc in this example.

These terms, graphs, trees, acyclic graphs, cycle graphs and hypergraphs have been in use amongst parts of the mathematical and computing community since at least the 1910's and 1970's. Hypergraphs include graphs. There has been a consistent teaching toward trees, away from graphs in most instances, and very much away from hypergraphs. While hypergraphs are more general than graphs and trees, their discussion outside of limited portions of these communities has not been widespread, even though they provide the conceptual tools to unify at least the problems discussed above and those outlined in what follows.

A standard approach to graph algorithms in computer science is to be found in *Graph Algorithms* by Shimon Even, © 1979 Computer Science Press, Inc., ISBN 0-914894-21-8. A less common viewpoint regarding hypergraphs can be found in *Combinatorics: set systems, hypergraphs, families of vectors and combinatorial probability*, by Bela Bollobas, © 1986, Cambridge University Press, ISBN 0-521-33703-8. In this work, particularly the preface (pages xi-xii) and the notational introduction (pages 1-3), graphs are defined as specialized hypergraphs, and the tendency to minimize discussion hypergraphs is mentioned.

There is a further difficulty revealed in considering FIG. 5: consider the situation of copyrighted image material 120 being incorporated into other images. Assume that image material 120 possesses an embedded copyright signature. There are several software tools which embed copyright signatures into content material 120 immune to color changes and which survive the clipping out of relatively small pieces of the material 120, such as a face. However, there are no tools available which will construct a context list of nodes essentially referencing this material based upon detecting the copyright signature. Note that many creators of content must now resort to labor intensive mechanisms to search for copyright infringing material. In certain situations, paths 104 and 106 represent virtual paths in a distributed network such as the Internet. In certain situations, paths 104 and 106 represent paths on a removable media such as a CD ROM or DVD ROM. Note further that the content 120 may be still frame and content 210 may be motion video, or vice versa.

Note that in this situation, we again encounter a cyclic graph, when the file management system is "supposed" to be a directory tree. File management systems have been consistently portrayed in operating systems such as UNIX, MSDOS (now Windows) and MacOS (which incorporates a form of UNIX) as hierarchical directory structures. These hierarchical directory structures are acyclic graphs, trees, proceeding from a specific root point (directory). This was and is a major feature of UNIX as well as MSDOS (now Windows) and MacOS. The problem with this hierarchical portrayal of file systems is that soft aliases often fail to conform with the model. Soft aliases essentially create cycles in the graph of a file system. Such a portrayal of a file system as a cyclic graph runs counter to the standard teachings on file management systems as seen in UNIX, MSDOS, Windows and MacOS. The users want to see their file structures in the above-mentioned operating systems in a manner these operating systems do not even conceptually permit.

FIG. 6 displays a prior art file system configuration showing references to a revision controlled source 222. As in FIG. 1, there is an assumption of a root 100 for the file system. Arrows 102, 104 and 106 indicate directory paths to file folders 108, 110 and 112, respectively. File folders 108, 110 and 112 in turn contain nodes 230, 250 and 270, respectively. Node 230 includes file 232 further including through descriptor 238, content 236, which is addressed by the file management system as 234, specifying a path and filename as "Path1/file b". Node 250 includes file 252 further including through descriptor 258, content 256, which is addressed by the file management system as 254, specifying a path and filename as "Path2/file 7". Node 270 includes file 272 further including through descriptor 278, content 276, which is addressed by the file management system as 274, specifying a path and filename as "Path3/file 8".

In these configurations, there is a separate source of content at node 222, coupled to the regular file management system as indicated by arrow 224. Content 236, 256 and 276 is essentially maintained from node 222. Changing the contents of node 222 will automatically force the propagation of those changes to nodes 230, 250 and 270. The advantage here is that one can update the contents of these representations by modifying just one node. The persistent problem is determining from a node such as 230, which are the other nodes referencing the same content, and where the source of that content may be found.

Note that in this situation, we again encounter a cyclic graph, when the file management system is "supposed" to be a directory tree. File management systems have been consistently portrayed in operating systems such as UNIX, MSDOS (now Windows) and MacOS (which incorporates a form of UNIX) as hierarchical directory structures. These hierarchical directory structures are acyclic graphs, trees, proceeding from a specific root point (directory). This was and is a major feature of UNIX as well as MSDOS (now Windows) and MacOS. The problem with this hierarchical portrayal of file systems is that soft aliases often fail to conform with the model. Soft aliases essentially create cycles in the graph of a file system. Such a portrayal of a file system as a cyclic graph runs counter to the standard teachings on file management systems as seen in UNIX, MSDOS, Windows and MacOS. The users want to see their file structures in the above-mentioned operating systems in a manner these operating systems do not even conceptually permit.

FIG. 7 displays a prior art domain name lookup table 300. A particular server domain has exactly one entry in such a table, represented as a row. Each row is composed of component entries labeled by way of example as second level 302, first level 304, and URL 306 as shown in row 300. Each server has a unique URL composed of 4 numbers separated by periods. Each of these four numbers ranges from 0 to 255. Each URL may further have a 16 bit unsigned decimal integer associated with it, called a port address. The URL port numbers have not been shown to simplify the discussion. Each level of the domain name is a collection of characters, usually alpha-numeric which follow a set of additional syntactic rules (which are not the subject of this invention, and will be left silent to simplify the discussion). A specific domain name, such as "acme.com" could then be represented by a row of entries 310, where "acme" is the second level entry 312, "com" is the first level entry 314, and "1.2.3.141" is the URL entry 316. A second domain name, such as "monkey.com" could then be represented by a row of entries 320, where "monkey" is the second level entry 322, "com" is the first level entry 324, and "101.11.23.121" is the URL entry 326. A third domain name, such as "uspto.gov" could then be represented by a row of entries 330, where "uspto" is the second level entry 332, "gov" is the first level entry 334, and "121.101.1.5" is the URL entry 336.

This system has proven itself to be of exemplary utility, supporting an unprecedented increase in communication throughout the world. The four component URL numbering scheme can support addressing up to 4 billion servers, which is almost as many servers as there are people in the world. With the additional 16 bit port addressing, the use of firewalls, etc. there is enough addressing space to accommodate service for many years to come. There are however, some uncomfortable issues regarding this scheme. There can be only one "acme.com", but there are numerous acme companies in the United States. Similarly, suppose several families named "Smith" each want their own web-site. There is no readily available mechanism by which these name usage collisions can be effectively sorted out. While in general Internet and the World Wide Web have proven themselves to be quite open to experimental changes, this is one area where this is not true.

FIG. 8A displays a prior art search engine interface. Such search engines are found in web sites such as the US PTO patent database, on CD ROM product catalogs and datasheets, as well as many other environments. The details vary widely, but the overall discussion and basic features described herein or variants thereof are found in these applications. There are often two components, a search command component 340 and a search result component 350. The search command component 340 possesses a first command component 342, with an optional operator component 344 and optional command component 346. There are often additional controls to reinitialize the search buffer, start the search, cancel the search, as well as possibly other controls. Once the search has been performed the search result component 350 may contain one or more referencing nodes as illustrated by boxes 352, 354, 356 and 358. Each of these boxes may have some form of salience metric associated with the match performed in accordance with the search command(s) of the search command component 340.

Salience is a term used hereinafter. In a number of circumstances, such as web-based searches, the term is related to "relevance" metrics. These forms of salience metrics are often based upon frequency of which a word or phrase is found in a document. Salience metrics can represent a sense of distance between two such words or phrases, or how close such a word or phrase is to the beginning of a web page document.

This relatively simple interface has been a breakthrough for locating information in the ever-increasing complexity of our times. It has helped people, without ever leaving their home or office, to find and retrieve information from widely diverse sources all over the world in a small fraction of the time it previously took to just get to the local library. Its operation can be frustrating. A search for common name or surname may return thousands of entries, often with little or no obvious way to reduce the number of results in a coherent fashion.

There is a further problem inherent in existing, user friendly interfaces to databases. Salience metrics in a database context can refer to measure of satisfaction of some relationship. Consider a financial database, by way of example. A first relationship in the financial database may be the percentage of income paid for state taxes of a given state by a taxable entity. A second relationship may be the percentage of income paid for national taxes by a taxable entity. A third relationship may be the amount of state income tax to be paid by a taxable entity. A fourth relationship may be the amount of national income tax to be paid by a taxable entity. A fifth relationship may be the age and filing status by the taxable entity. A reasonable query of such a database might well include a specific range of percentage state income tax, a specific range of amounts of state income tax and a specific percentage national income tax for a specific combination of age and small business entity.

Such flexible and complex queries are possible with computer programming tools such as Visual Basic, C, C++ and COBOL, to name just a few of the many languages used in such tasks. However, such tools are outside the range of convenience most users of computers can and will tolerate. Further, there is a significant effort necessary to learn such tools and then to debug such programmed interfaces. What is needed is a flexible user interface, which allows the user to perform such queries in a more humanly efficient and painless fashion.

There is an additional, though subtle problem inherent in the standard teachings regarding the portrayal of data in databases. Consider part of the data structure of a patent in the Patent and Trademark Office's patent database. Each patent incorporates a patent number, issue date, filing date, its parentage in terms of being a continuation, divisional, continuation-in-part of a previously filed U.S. patent, which is referenced by its patent number, as well as the inventor list, possibly an assignee, primary examiner and a classification search list. Such an entity is best seen as a hypergraph embedded in a larger hypergraph, such as the database in its entirety or all patents issued on a given day.

Relationships involving multiple attributes, which operations upon many databases often require are not accessible through a graph paradigm. The context of such relationship is often an ordered n-tuple of attributes, where n is often greater than 2. A hyper-arc composed of n ordered attributes is a natural way to portray the entities upon which such relationships act.

The evolution of relationships in computer science and mathematical logic can be seen in considering the definition of relation found on pages 138-139 of *The elements of mathematical logic*, by Paul Rosenbloom, © 1950 Dover Publications, Inc. The definition is of a subset of a Cartesian cross product of a set with itself. Such a definition was sufficient to handle comparison relationships such as =, > and < as required for integer arithmetic. By the late 1960's and early 1970's, a much more sophisticated definition can be seen on page 11 of *Saturated Model Theory*, by Gerald E. Sachs, © 1972 W. A. Benjamin, Inc. ISBN 0-805-38380-8. In this definition, a relationship operates on an n-dimensional cross product of potentially different sets. Such a definition is capable of describing the relationships involved in many database activities, although that capability is silent in the text. The interaction between databases and logic matures by the late 1970's, in part due to the development of logic programming languages such as Prolog. This can be seen by examining "Chapter 1: Introduction", pages 1-21, *Logic for Problem Solving*, by Robert Kowalski, © 1979, Elsevier Science Publishing Co., Inc. $3^{rd}$ printing, 1983 (paperback), ISBN 0-444-00368-1. Note that relationships are acting on elements of these n-dimensional cross products of potentially different sets. Further note the discussion is focused exclusively on graphs and trees. There is no way to visualize these relationships as geometric entities. This limitation persists to this day.

FIG. 8B displays a prior art graph based content viewer 360 containing a content viewing component 362 and a graph viewing/navigation component 364. An acyclic graph is displayed in region 364 composed of points 366, 370, 374, 376, 378, 380, 382, 384 and 386, as well as arcs 368, 372, 377, 379, 381, 383, 385, and 390 connecting pairs of these points. Each point is associated with content, which when the point is selected, is displayed in region 362. In certain prior art systems, the portrayal of the graph in region 364 provides more detail to the nearest-graph neighboring points and arcs using an approach known as a "fish-eye" or hyperbolic view. These content viewers have been seen in embodiments out of Xerox PARC such as the hyperbolic browser and visual thesaurus. In each case, the content viewer is presented with an acyclic graph with each point associated with content, such as displayed in this figure. Further, these prior art viewers require an acyclic graph. These viewers teach away from the portrayal of graphs with cycles, much less hypergraphs. This can be seen by examining the document "A Focus+Context Technique Based on Hyperbolic Geometry for Visualizing Large Hierarchies." By John Lamping, Ramana Rao and Peter Pirolli, © ACM, found on Jan 11, 1999 at the following web-address:
http://www.acm.org/sigchi/chi95/proceedings/papers/jl_b-dy.html.

FIG. 9 displays a prior art file manager user interface 400. In this example, the interface is composed of a directory tree view 402, a file list viewer 404, and a file snapshot viewer 406. The file list viewer 404, shows the content a currently selected node in the file directory structure as viewed in 402. Directory tree viewers 402 typically represent a node as a horizontal component in the display. By way of example, the root of the directory tree being viewed is denoted by the items 410, 412 and 414. Item 410 shows that this node is a directory with file contents through the symbol "+" in the center of the box. Item 414 displays the node name, in this case "ROOT". Item 416 indicates the extent of containment of the node "ROOT". Items 420, 422, 424 and 426 indicate the node "Speeches", which is a sub-directory under "ROOT". Items 430, 432, 434 and 436 indicate a specific file named "Gettysburg.doc", which is contained in "Speeches", which is further contained in "ROOT". Items 440, 442, 444 and 446 indicate a specific file named "I have a dream.doc", which is contained in "Speeches", which is further contained in "ROOT". Note that the filename has been truncated here, in comparison to its representation in 404. Items 450, 452, 454 and 456 indicate an unnamed node, which is a sub-directory under "ROOT". Items 460, 462, 464 and 456 indicate a specific unnamed file, which is contained in directory 456 which is further contained in "ROOT". Items 470, 472, 474 and 476 indicate a specific unnamed file, which is contained in 456, which is further contained in "ROOT". In this example, the node 426 is selected, which contains files "GETTSYBURG.DOC" and "IHAVEADREAM.DOC". These two files are shown in the file list viewer 404 as 436 and 446. These same files are represented in the directory tree viewer 402 as 436 and 446. The user has further selected "GETTSYBURG.DOC" 436, so that file snapshot viewer 406 shows "Four Score and seven years ago, . . . ", which is the start of that speech.

This user interface is in widespread application in all of the operating systems mentioned above, in applications such as word processing, spreadsheets, integrated development environments for software, electronics design and image processing. It has however, a consistent frustration for users. Such user interfaces cannot reveal which nodes essentially reference a given node. This regularly leads to a large amount of effort being needed to track down the references by hand.

Note again that the operating system paradigm of a hierarchical directory structure, with its directory tree does not conceptually permit cycle graphs, where the cycles are formed from files essentially referenced by other files.

The frustration has only grown in significance as time has passed. Today there is a major effort underway by providers of creative content such as pictures, music, motion videos, etc. to uphold copyright protection. This has lead to the development of copyright signature embedding mechanisms for visual data, such as still frames. Determining if a node of content has been essentially incorporated into another content becomes the task of finding the copyright signature. The task of automatically searching a tree of nodes becomes that much more significant.

The issue of essential containment, whether through incorporation of an image modified from its node of origin, or a file compressed and incorporated into a larger file, again opens the user to thinking in terms of hypergraphs. And again, the operating systems and the standard user interface paradigm of a hierarchical file directory system expressed consistently as a directory tree teaches away and discourages such thoughts.

FIG. 10 displays a prior art file manager user interface seen as a web page 480. Such interfaces are found on all of the operating systems mentioned above. They are often composed of a path and filename designating box 482. They also contain a region 484 which displays the contents of the node whose path and filename are represented in box 482. By way of example, four items are shown contained in this node, 486, 488, 490 and 492. Items 486, 488 and 490 are shown as similarly shaped icons. Note that in most of these interfaces, there must be some visibly distinguishing characteristic to identify these items as separate nodes. Item 492 is shown as a different icon. Note that icons may further incorporate a text label as shown with item 494, which is associated with item 492. Item 492s is shown as an icon commonly used to designate a sub-directory of the current node.

This user interface is found in all the above-mentioned operating systems and in many applications. It also has a consistent frustration for users. Such user interfaces cannot reveal which nodes essentially reference a given node. This regularly leads to a large amount of effort being needed to track down the references by hand.

The frustration similarly has only grown in significance as time has passed. Today there is a major effort underway by providers of creative content such as pictures, music, motion videos, etc. to uphold copyright protection. This has lead to the development of copyright signature embedding mechanisms for visual data, such as still frames. Determining if a node of content has been essentially incorporated into another content becomes the task of finding the copyright signature. The task of automatically searching a tree of nodes becomes that much more significant.

Note again that the paradigm of a directory tree structure runs counter to what these users are trying to do. These essentially referenced files effectively create cycles in the file system graph from the user's standpoint. These operating systems (UNIX, MSDOS, Windows and MacOS) teach away from these cyclic graph structures.

Essential references based upon "essentially being contained", open the door to the user thinking in terms of hypergraphs, where the essentially containing files represent the hyper-arcs and the points of the hypergraph are the files essentially referenced. Note that this is again something these very common operating systems do not conceptually permit.

FIG. 11 displays a prior art web browser 500. What is displayed is a fairly typical view of hypertext content found at a web-site address shown in 502. There has been no portrayal of the numerous other features of these interfaces, such as menu bars, because they are not central to this discussion. For the sake of uniformity of exposition, various web-sites will be composed of nodes, such as their home page. The node viewer 504 shows a combination of hyperlinks to other nodes 508, 512, and 514. Node viewer 504 also contains text lines 510 and image data 506. Image data 506 may be still frame or change over time. Text data, which is displayed, such as contained in html files, will be considered image data hereinafter. Image data, which changes over time, will be considered motion video hereinafter.

This user interface is in widespread application in all of the operating systems mentioned above. It also has a consistent frustration for users. Such user interfaces cannot reveal which nodes essentially reference a given node. This regularly leads to a large amount of effort being needed to track down the references by hand.

The frustration similarly has only grown in significance as time has passed. Today there is a major effort underway by providers of creative content such as pictures, music, motion videos, etc. to uphold copyright protection. This has lead to the development of copyright signature embedding mechanisms for visual data, such as still frames. Determining if a node of content has been essentially incorporated into another content becomes the task of finding the copyright signature. The task of automatically searching a collection of nodes (perhaps distributed across a directory structure or across a network) becomes that much more significant.

Note again that the paradigm of a directory tree structure runs counter to what these users are trying to do. These essentially referenced files effectively create cycles in the file system graph from the user's standpoint. These operating systems (UNIX, MSDOS-Windows and MacOS) teach away from these cyclic graph structures.

Essential references based upon "essentially being contained", open the door to the user thinking in terms of hypergraphs, where the essentially containing files represent the hyper-arcs and the points of the hypergraph are the files essentially referenced. Note that this is again something these very common operating systems do not conceptually permit.

SUMMARY OF INVENTION

This invention includes a method of navigating a collection of nodes by selecting a first node, generating a context list and displaying first node and context list. Each context of the context collection includes a second node essentially referencing the first node.

This method advantageously provides a mechanism to determine all contexts essentially referencing a first node in a number of useful manners. The reference may be an alias within a file system. The reference may possess identical content.

The reference may further essentially contain the same content. The content of the second node can be determined to essentially contain the first node content by finding an embedded copyright signature in the second node content which is the same as the copyright signature of the first node content. This is useful in determining which nodes in a file-based system or web-site contain copyright infringing material.

This method also advantageously provides for traversal of referencing contexts, allowing the selection of a context, making the second node of a selected context, the new first node.

Another aspect of the invention includes a computer program embodied on a computer readable medium for navigating a collection of nodes, comprising code for selecting a first node, code for generating a context list, code for displaying content of the first node and context list. Each context of the context collection includes a second node essentially referencing the first node.

This computer program advantageously provides code to determine all contexts essentially referencing a first node in a number of useful manners. The reference may be an alias within a file system. The reference may further possess identical content.

The reference may further essentially contain the same content. Code to determine whether the second node content essentially contains the first node content can look for an embedded copyright signature in the second node content which the same as the copyright signature of the first node content. This is useful in determining which nodes in a file-based system or web-site contain copyright infringing material.

The computer program also advantageously provides for traversal of referencing contexts, allowing the selection of a context, making the second node of a selected context, the new first node.

Certain embodiments advantageously provide computer programs for local and distributed processing of the various operations including support of client-server implementations in certain embodiments.

Another aspect of the invention includes a method of generating an address from a collection of contexts containing steps of receiving a selected attribute collection and generating the address. Each context includes a resolution address and an attribute collection. Each of the attribute collections contains at least one attribute. Whenever the attribute collection of a first context of the context collection is essentially the same as the selected attribute collection, the resolution address of the first context is selected as the generated address.

For each first and second, different context contained in the context collection, the resolution address of the first context is different from the resolution address of the second context. Further, for each first and second, different context contained in the context collection, the attribute collection of the first context is not essentially the same as the attribute collection of the second context.

This aspect of the invention advantageously provides for distinct attribute collections for each distinct resolution address. The invention provides a method of selecting at most one resolution address based upon a selected attribute collection being compared to the attribute collection of contexts of the context collection. The resolution address can be a network address, or more particularly, a TCPIP (Internet) address. The resolution address may further contain a root path. The resolution address may further contain a homepage.

The attribute comparison is that of being essentially the same. In certain embodiments, each context attribute collection contains a first attribute, which is comprised of two sub-attributes. Two first attributes are essentially the same if they possess the same sub-attributes, in some order, first to first and second to second, or alternatively, first to second and second to first. This allows for multiple sub-attributes to be compared irrespective of ordering, which is substantially more flexible than standard network addressing schemes of today, which require exact matching of correspondingly ordered components. This aspect of the invention provides for a significant improvement in the flexibility of organizing address resolution in networks, particularly the Internet.

Another aspect of the invention includes computer programs generating an address from a collection of contexts containing steps of maintaining a context collection, receiving a selected attribute collection and generating the address. Each context includes a resolution address and an attribute collection comprising at least one attribute. Whenever the attribute collection of the context is essentially the same as the selected attribute collection, the resolution address of that context of the context collection is selected as the generated address.

For each first context and second, different context both contained in the context collection, the resolution address of the first context is different from the resolution address of the second context. Further, for each first and second, different context contained in the context collection, the attribute collection of the first context is not essentially the same as the attribute collection of the second context.

This aspect of the invention advantageously provides computer programs for distinct attribute collections for each distinct resolution address. The invention provides a method of selecting at most one resolution address based upon a selected attribute collection being compared to the attribute collection of contexts of the context collection. The resolution address can be a network address, or more particularly, a TCPIP (Internet) address. The resolution address may further contain a root path. The resolution address may further contain a homepage.

The attribute comparison is that of being essentially the same. In certain embodiments, each context attribute collection contains a first attribute, which is comprised of two sub-attributes. Two first attributes are essentially the same if they possess the same sub-attributes, in some order, first to first and second to second, or alternatively, first to second and second to first. This allows for multiple sub-attributes to be compared irrespective of ordering, which is substantially more flexible than standard network addressing schemes of today, which require exact matching of correspondingly ordered components. This aspect of the invention provides for a significant improvement in the flexibility of organizing address resolution in networks, particularly the Internet.

Another aspect of the invention includes a method of navigating a plurality of context lists and a collection of relationships, comprising steps of generating a shared node list and displaying the shared node list. Each context list includes at least one context. Each context includes a node. Each relationship is applied to the contexts of at least one of the context lists. The generation of the shared node list uses the relationship collection and the plurality of context lists.

This method advantageously provides a much more flexible, friendly interface to search various combinations of relationships and context lists. In certain embodiments, relationships applied to contexts result in either satisfying or not satisfying the relationship, and the shared node list is generated from contexts where at least one relationship is satisfied. In further embodiments, the shared node list is generated from contexts where all the relationships are satisfied. In certain further embodiments, a satisfaction choice is associated with each relationship and the shared node list is generated from contexts where satisfaction of each relationship applied to the contexts matches the satisfaction choice of that relationship. This supports complete exploration of contexts satisfying any chosen boolean combination of the relationships.

In other embodiments, relationships applied to contexts advantageously result in a salience belonging to an associated salience range for the relationship. Such salience ranges are advantageous in examining the results of large database searches and the results of World Wide Web searches. In certain further embodiments, the associated salience range of a relationship includes a numeric range. In further embodiments, that numeric range includes the interval from 0 to 1. In further embodiments, the associated salience range includes integral percentages. In certain embodiments, there is a satisfaction range associated with the relationship, which is contained in the associated salience range. In certain further embodiments, the generation of shared nodes incorporates nodes where at least one relationship when applied to the node's context has a salience belonging to the associated satisfaction range of that relationship. In certain further embodiments, the generation of shared nodes incorporates nodes where all relationships when applied to the node's context have a salience belonging to the associated satisfaction range. These embodiments support a much more flexible and detailed examination of search results from one or more relationships.

Another aspect of the invention includes a computer program embodied on a computer readable medium for navigating a plurality of context lists and a collection of relationships. Each context list includes at least one context. Each context includes a node. Each relationship is applied to the contexts of at least one of the context lists. The program comprises code for generating a shared node list and code for displaying the shared node list. The code for generating a shared node list uses the relationship collection and the plurality of context lists.

This aspect of the invention advantageously provides computer programs with a much more flexible, friendly interface to search various combinations of relationships and context lists. In certain embodiments, relationships applied to contexts result in either satisfying or not satisfying the relationship, and the shared node list is generated from contexts where at least one relationship is satisfied. In further embodiments, the shared node list is generated from contexts where all the relationships are satisfied. In certain further embodiments, a satisfaction choice is associated with each relationship and the shared node list is generated from contexts where satisfaction of each relationship applied to the contexts matches the satisfaction choice of that relationship. This supports complete exploration of contexts satisfying any chosen boolean combination of the relationships.

In other embodiment computer programs, relationships applied to contexts advantageously result in a salience belonging to an associated salience range for the relationship. Such salience ranges are advantageous in examining the results of large database searches and the results of World Wide Web searches. In certain further embodiments, the associated salience range of a relationship includes a numeric range. In further embodiments, that numeric range includes the interval from 0 to 1. In further embodiments, the associated salience range includes the integral percentages. In certain of these embodiments, there is a satisfaction range associated with the relationship, which is contained in the associated salience range. In certain further embodiments, the generation of shared nodes incorporates nodes where at least one relationship when applied to the node's context has a salience belonging to the associated satisfaction range of that relationship. In certain further embodiments, the generation of shared nodes incorporates nodes where all relationships when applied to the node's context have a salience belonging to the associated satisfaction range. These embodiments support a much more flexible and detailed examination of search results from one or more relationships.

Certain embodiments advantageously provide computer programs for local and distributed processing of the various operations including support of client-server implementations in certain embodiments.

Another aspect of the invention includes a method of navigating a hypergraph. The hypergraph includes at least one context list. Each context list contains at least one context. Each context includes a node. The method includes steps of selecting a first context list of the context lists, selecting a first context of the first context list, and displaying the node of the first context of the first context list.

This aspect of the invention provides a method to traverse and display nodes of hypergraphs, a significant generalization of graphs. There are no known methods of displaying hypergraph context nodes. Certain embodiments of the invention provide for directed hypergraphs, with ordered context lists. Certain embodiments support display of the first context. Other embodiments support display of the first context list. Other embodiments support the display of the plurality of context lists.

Another aspect of the invention includes a computer program embodied on a computer readable medium for navigating a hypergraph. The hypergraph includes at least one context list. Each context list contains at least one context. Each context includes a node. The program includes code for selecting a first context list of the context lists, code for selecting a first context of the first context list and code for displaying the node of the first context of the first context list.

This aspect of the invention provides computer programs to traverse and display nodes of hypergraphs, a significant generalization of graphs. There are no known methods of displaying hypergraph context nodes. Certain embodiments of the invention provide for directed hypergraphs, with ordered context lists. Certain embodiments support display of the first context. Other embodiments support display of the first context list. Other embodiments support the display of the plurality of context lists.

Certain embodiments advantageously provide computer programs for local and distributed processing of the various operations including support of client-server implementations in certain embodiments.

These and other advantages of the present invention will become apparent upon reading the following detailed descriptions and studying the various figures of the drawings.

BRIEF DESCRIPTION OF THE DRAWINGS

FIG. 7 displays a prior art domain name lookup table;

FIG. 8A displays a prior art search engine interface;

FIG. 8B displays a prior art acyclic graph based content viewer;

FIG. 15 is a portrayal of the user perspective on traversal of contexts in accordance with one embodiment;

FIG. 21 portrays a symmetric parameter domain name viewer in accordance with an embodiment;

FIG. 23 portrays a symmetric parameter domain name viewer of a trademark space in accordance with an embodiment;

FIG. 34 is a detail flowchart for operation 1860 of FIG. 33 in accordance with an embodiment;

FIG. 35 is a detail flowchart for operation 1860 of FIG. 33 in accordance with an alternative embodiment;

FIG. 37 is a detail flowchart for operation 2136 of FIG. 36B in accordance with an embodiment;

DETAILED DESCRIPTION OF THE EMBODIMENTS

Figure 1:
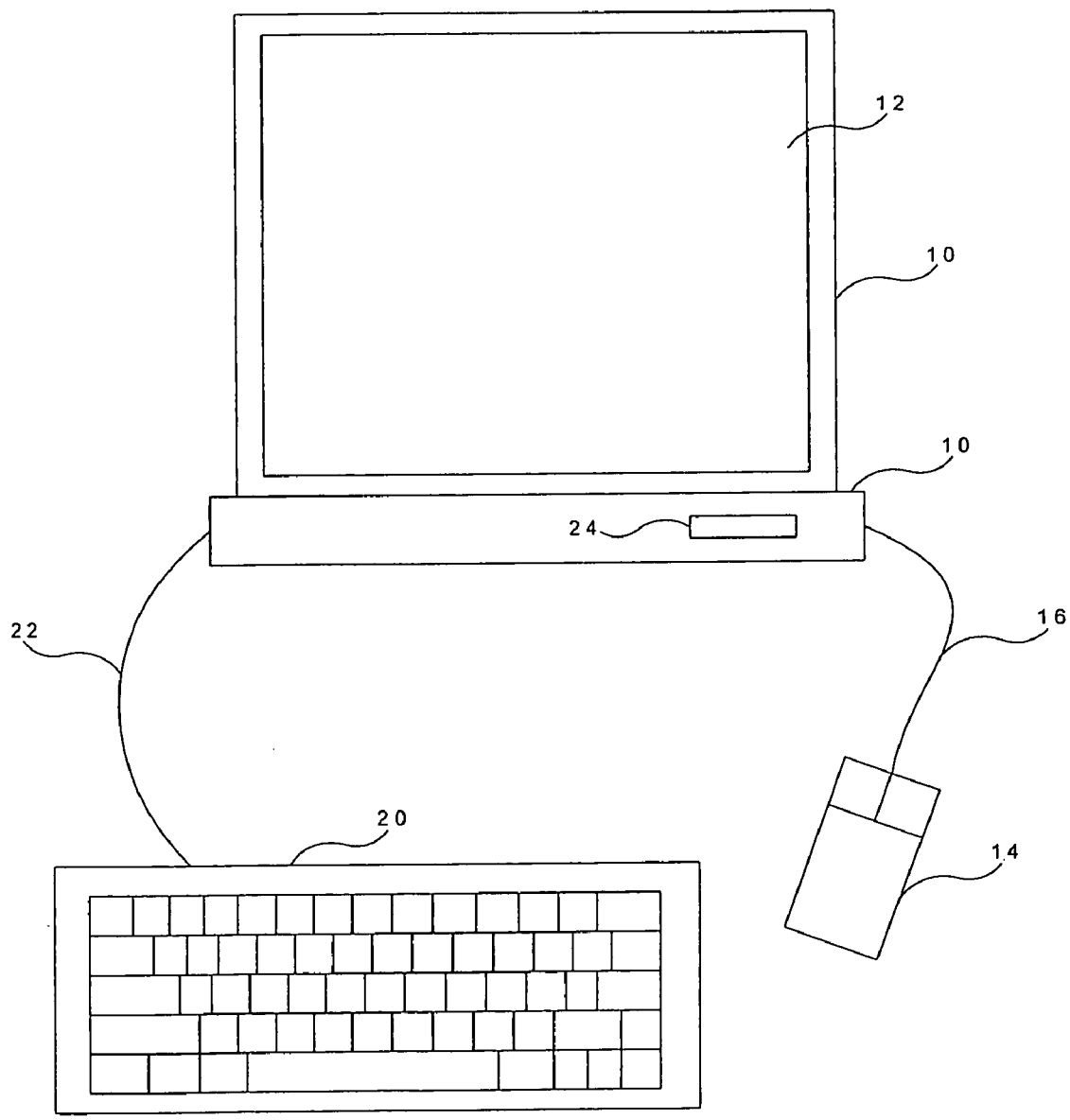
FIG. 1 illustrates a prior art computer.
Figure 2:
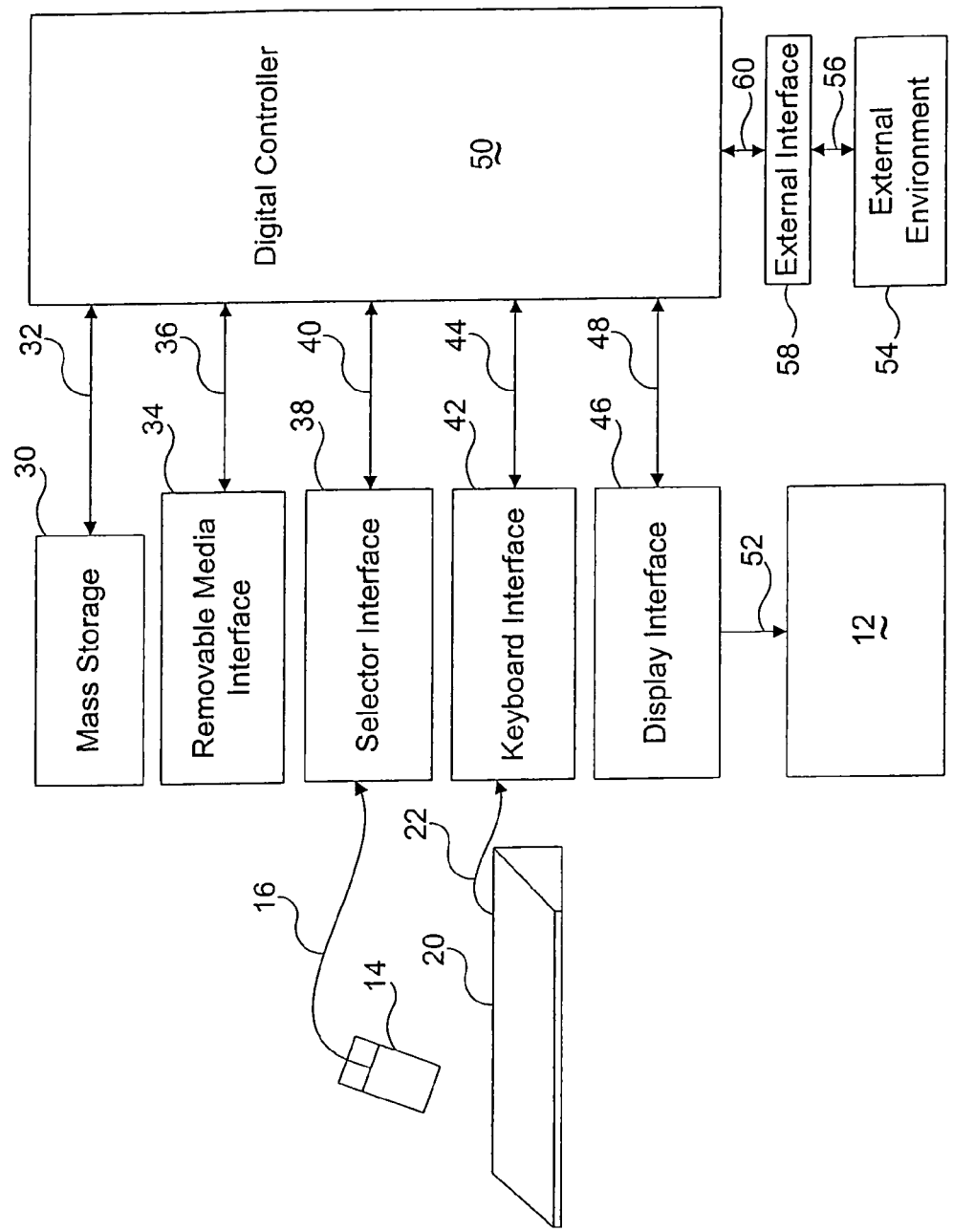
FIG. 2 displays a system block diagram of a prior art computer.
Figure 3:
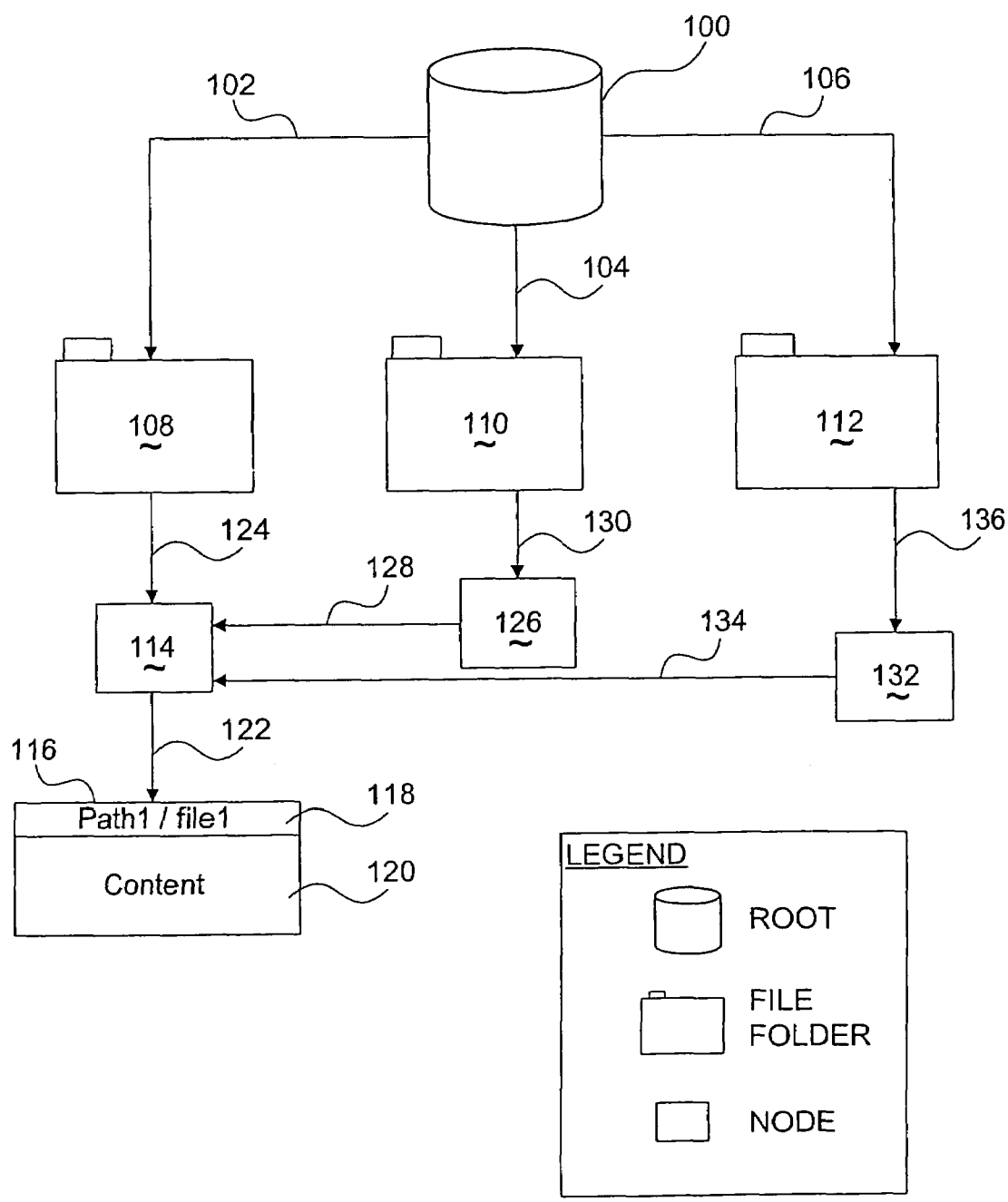
FIG. 3 displays a prior art file system configuration showing references as hard aliases of a node.
Figure 4:
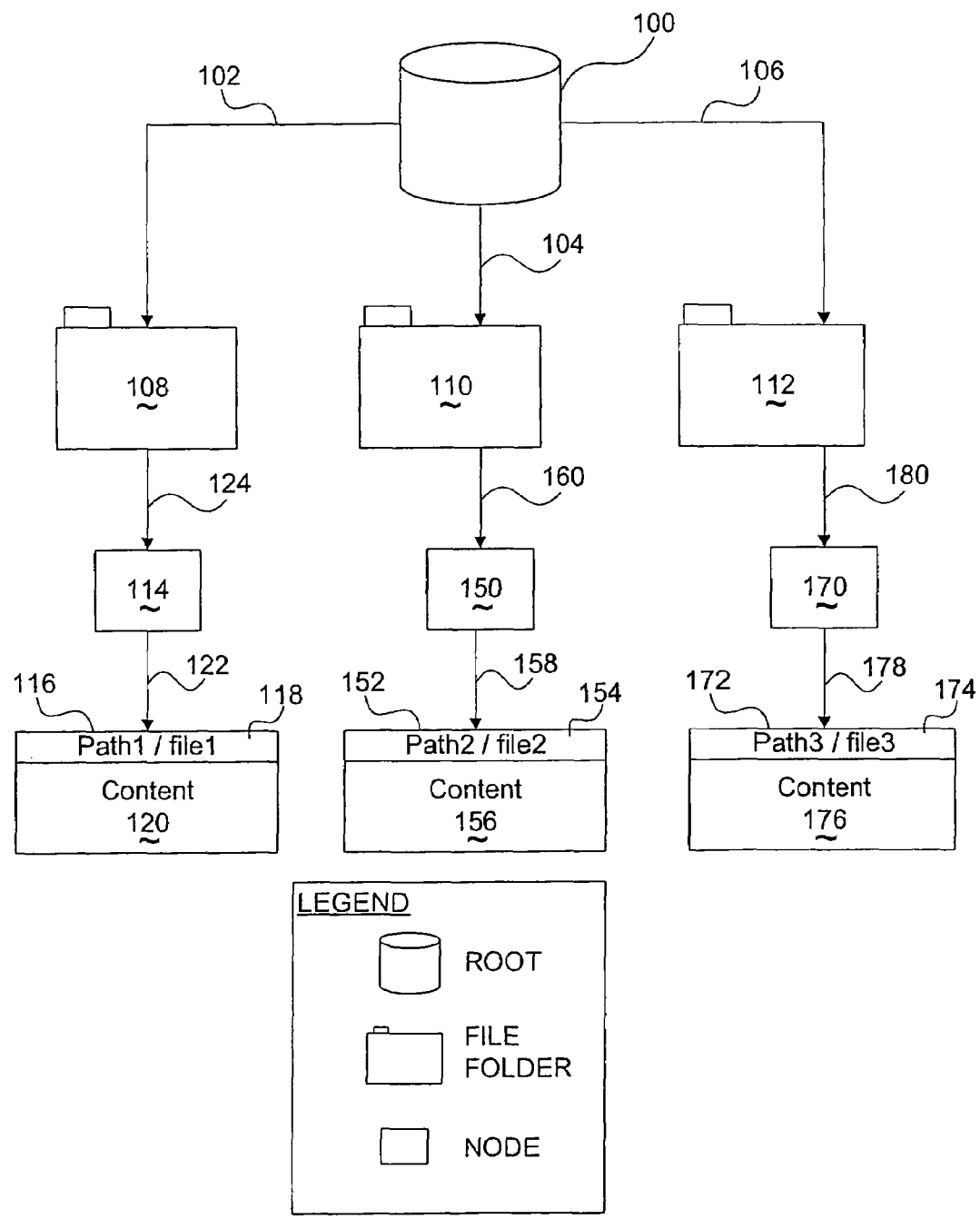
FIG. 4 displays a prior art file system configuration showing references as soft aliases of a node.
Figure 5:
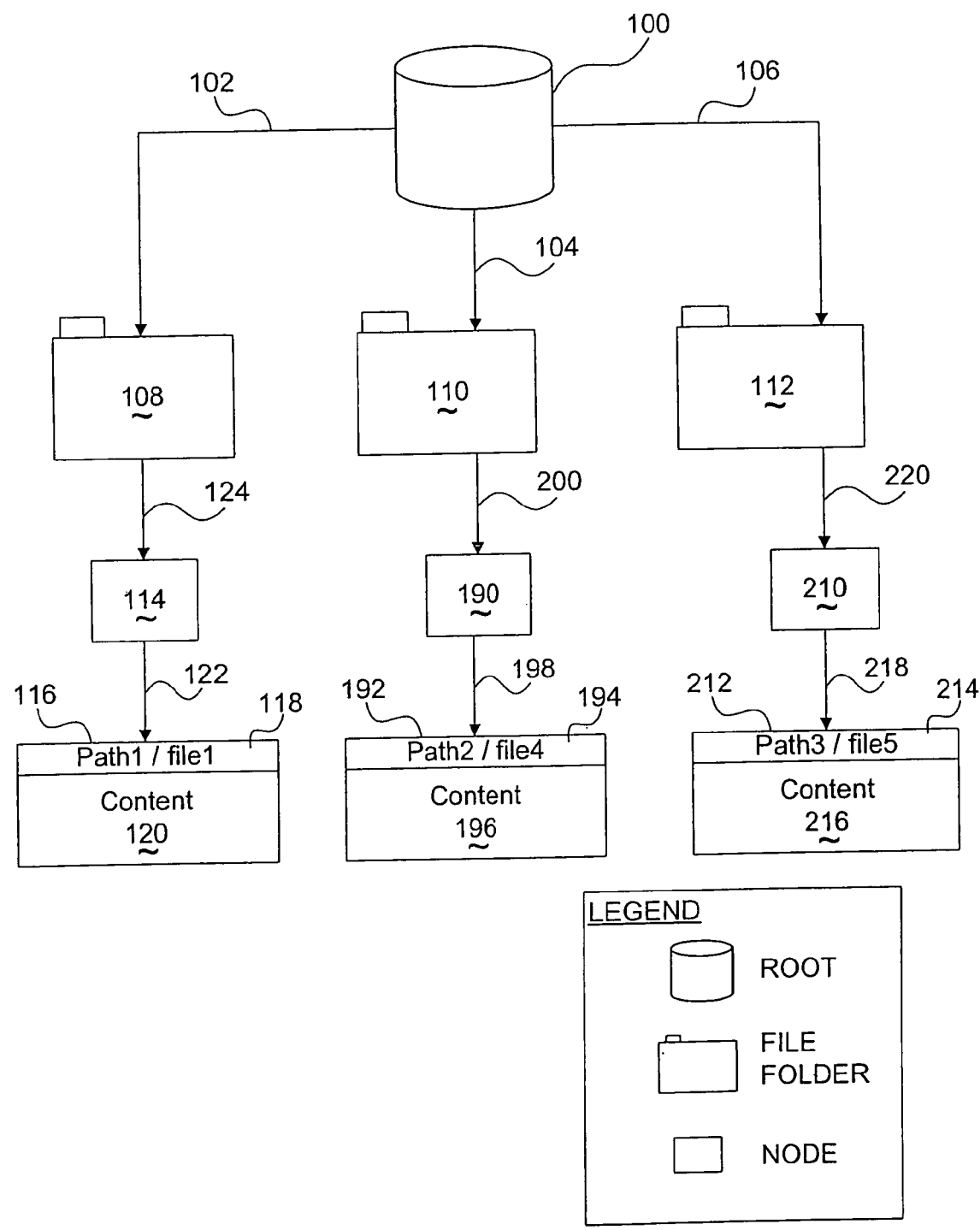
FIG. 5 displays a prior art file system configuration showing references essentially containing the content of a node.
Figure 6:
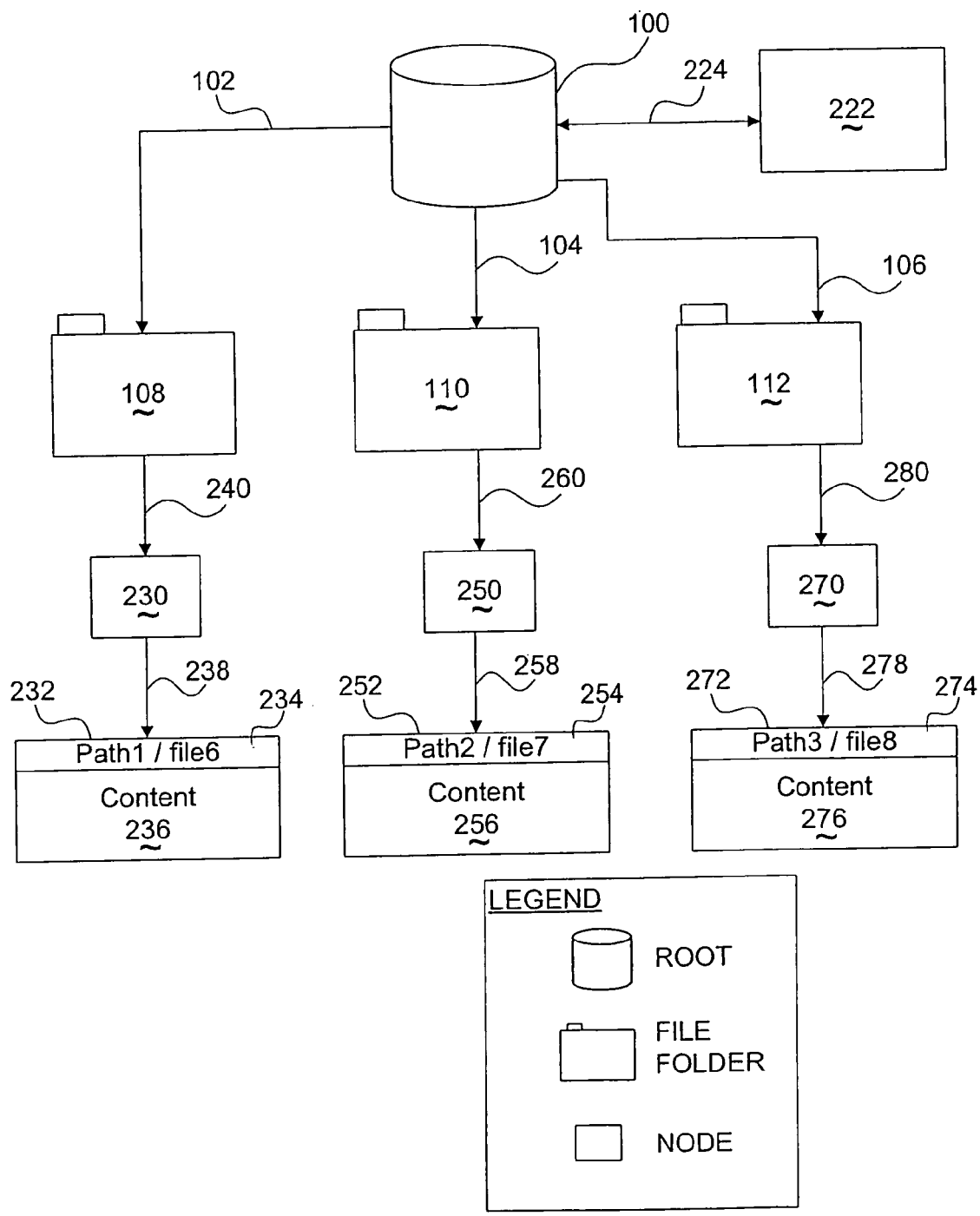
FIG. 6 displays a prior art file system configuration showing references to a revision controlled source database.
Figure 9:
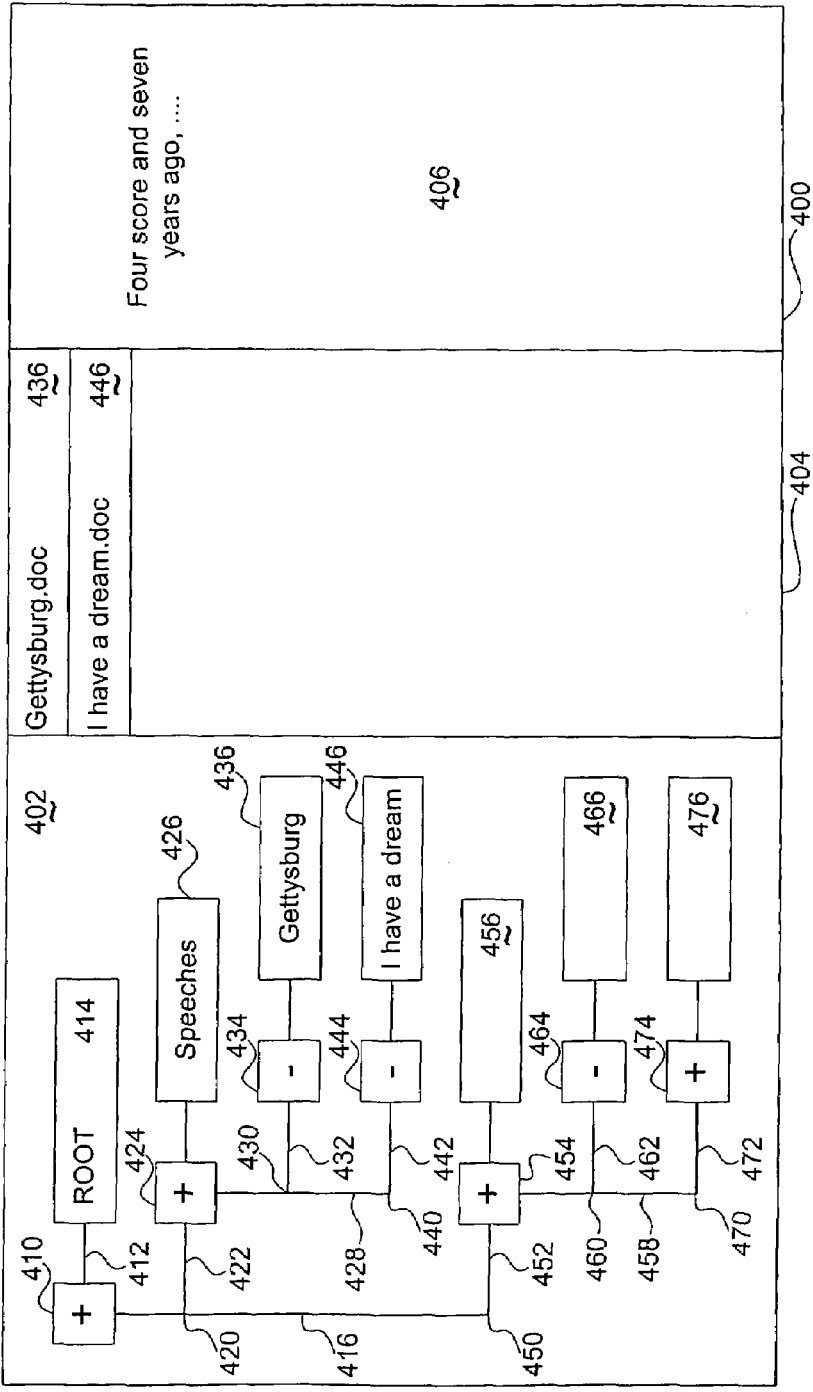
FIG. 9 displays a prior art file manager user interface.
Figure 10:
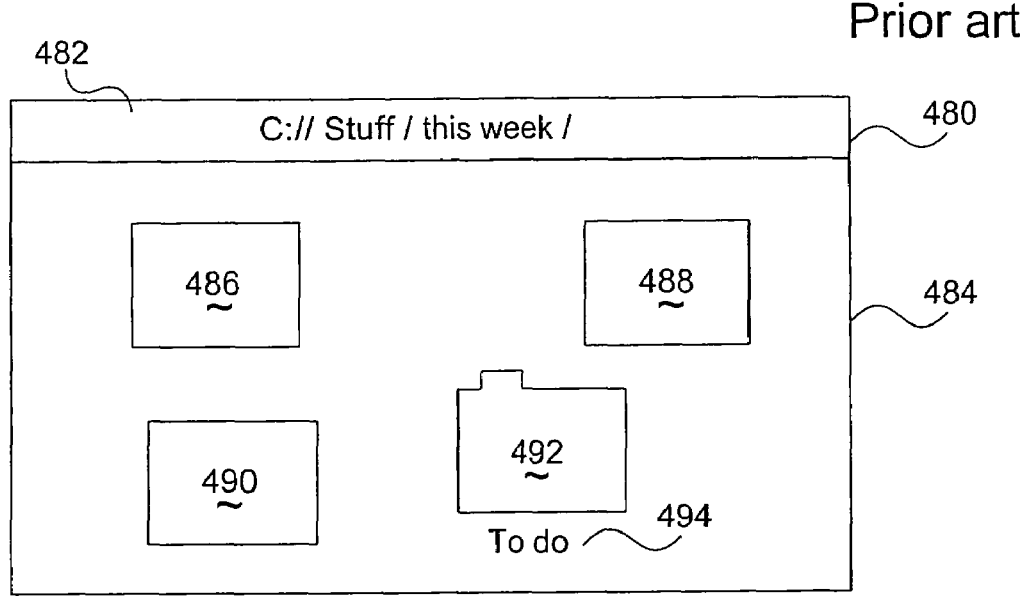
FIG. 10 displays a prior art file manager user interface seen as a web page.
Figure 11:
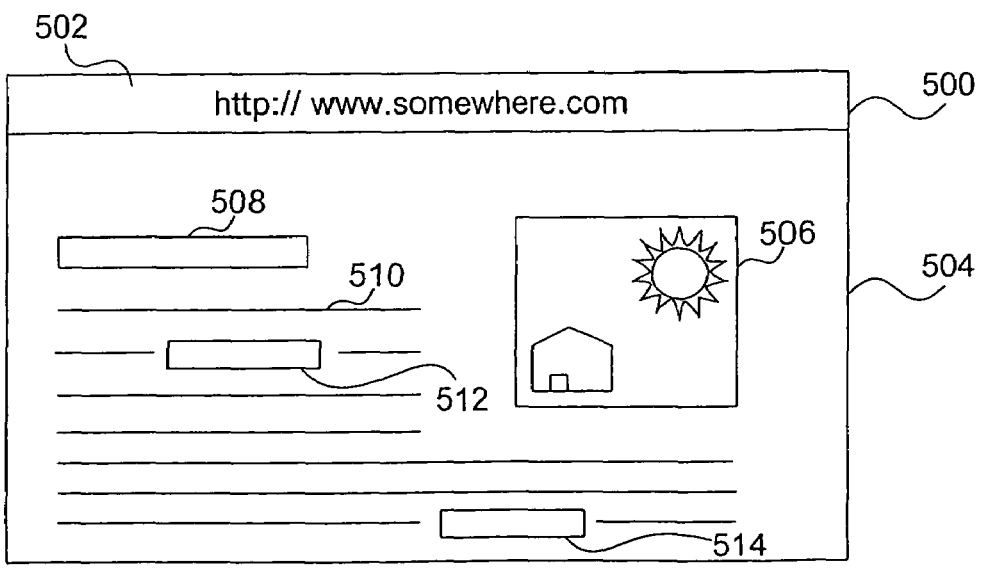
FIG. 11 displays a prior art web browser.
Figure 12:
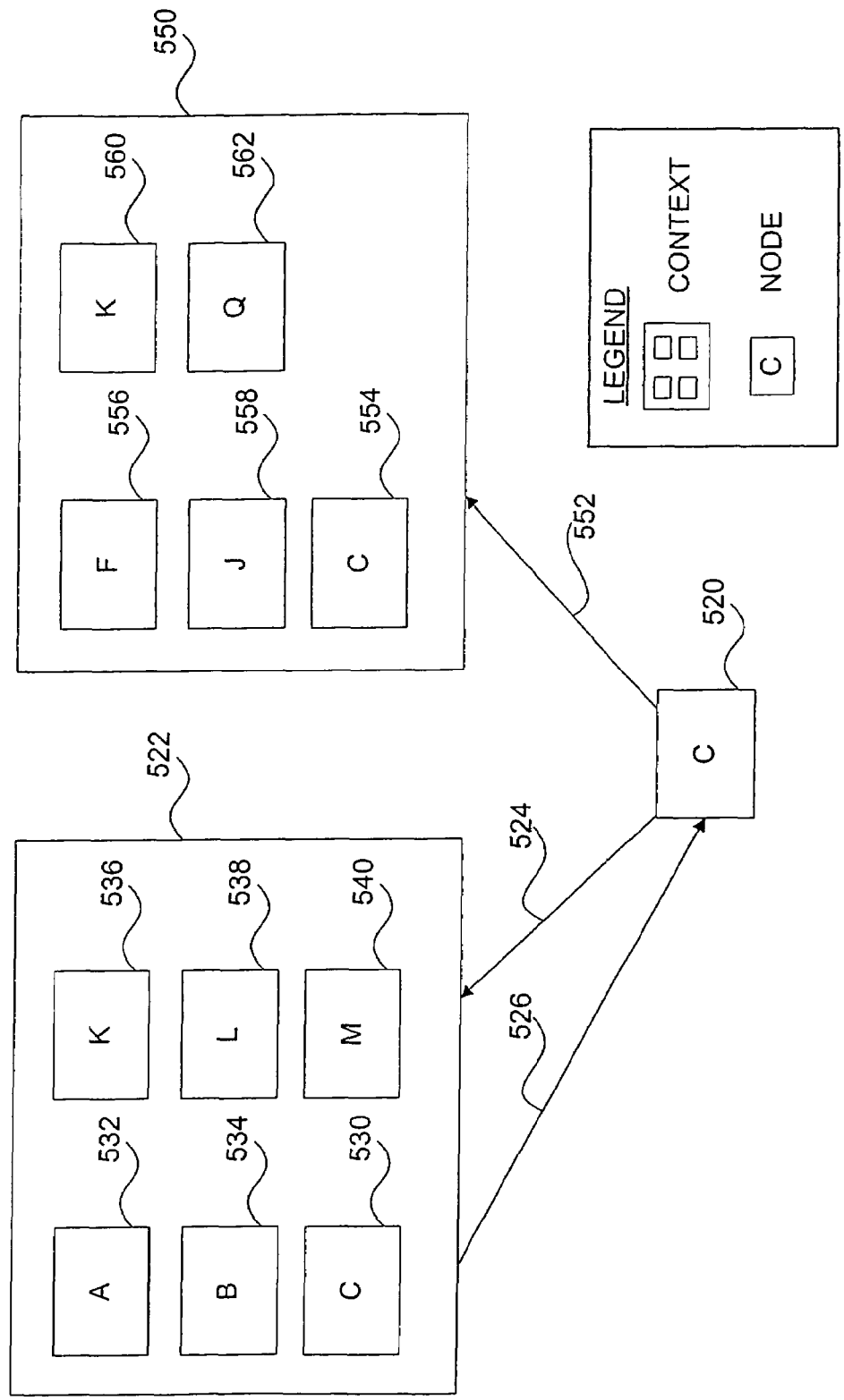
FIG. 12 portrays two contexts of a first node in accordance with one embodiment.

FIGS. 1 through 11 were discussed previously with reference to the prior related art. FIG. 12 portrays two contexts 522 and 550 of a first node 520 in accordance with one embodiment. Arrows 524 and 552 connect from node 520 to the contexts 522 and 550, respectively. Arrow 526 connects from context 522 to node 520. Node 520 is shown as a box containing the letter "C".

Context 522 is shown as a box further containing boxes labeled 530, 532, 534, 536, 538 and 540. Box 530 is shown containing the letter "C". Box 532 is shown containing the letter "A". Box 534 is shown containing the letter "B". Box 536 is shown containing the letter "K". Box 538 is shown containing the letter "L". Box 540 is shown containing the letter "M".

Context 550 is shown as a box further containing boxes labeled 554, 556, 558, 560 and 562. Box 554 is shown containing the letter "C". Box 556 is shown containing the letter "F". Box 558 is shown containing the letter "J". Box 560 is shown containing the letter "K". Box 562 is shown containing the letter "Q".

In accordance with several embodiments of the invention, node 520 is essentially referenced by nodes 530 and 554 in contexts 522 and 550, respectively. Both contexts include nodes other than node 530 and 554. Note that other context may not necessarily have any additional nodes.

In one embodiment of the invention, node 520 is a file with contents "C" with aliases 530 and 554 in context directories 522 and 550, respectively. Both contexts include nodes other than node 530 and 554.

In a second embodiment of the invention, node 520 is a file with contents "C" which have been copied to nodes 530 and 554 in context directories 522 and 550, respectively.

In a third embodiment of the invention, node 520 is a node (file) with contents "C" which have been concatenated into nodes (files) 530 and 554 in contexts (directories) 522 and 550, respectively.

Examples of essentially referencing a node include but are not limited to the use of "#include" statements in the C programming language. In a fourth embodiment of the invention, node 520 is a node (file) is incorporated in this manner into nodes (files) 530 and 554 in contexts (directories) 522 and 550, respectively.

Examples of essentially referencing a node include essentially containing the content of a node, as in compression files for text or images. In a fifth embodiment of the invention, node 520 is a node (file) is incorporated in this manner into nodes (files) 530 and 554 in contexts (directories) 522 and 550, respectively.

Examples of essentially referencing a node include but are not limited to incorporation of one or more discernible graphical elements from node 520 into the content of nodes 530 and 554. In a sixth embodiment of the invention, node 520 is a node (file) with contents "C" incorporated in this manner into nodes (files) 530 and 554 in contexts (directories) 522 and 550, respectively.

A further embodiment of the invention utilizes a copyright signature embedded into the content node 520. Contexts 522 and 550 are determined to essentially contain node 520 when the copyright signature of the content of 520 is detectable in one or more of the nodes of context 522 and 550.

Note that in all these embodiments, arrows 524 and 552 go from node 520 to both contexts 522 and 550. In certain embodiments of the invention, these arrows represent at least an initial referencing of the content of node 520 in nodes of context 522 and 550. Such circumstances include but are not limited to the contents of nodes 520 being essentially contained in node 554.

In certain embodiments of the invention, arrows 524 and 552 represent the automatic updating of the contents referencing nodes of context 522 and 550. Such circumstances include but are not limited to node 520 referenced by node 530 as a soft alias and node 520 referenced by node 554 as a hard alias. In such circumstances, the arrow 526 from context 522 to node 520 may be interpreted to include but not be limited to modifications of the content of node 530 may cause alterations in the content of node 520.

In certain embodiments, items 522 and 550 may be viewed as hyper-arcs sharing common points, the nodes C and K, with the collection of 522 and 550 being seen as a hypergraph possessing a total collection of points A, B, C, F, J, K, L, M and Q. Item 522 may represent the home directory of item C as seen by box 530 and arrows 524 and 526. Item 550 may represent a file essentially containing a copy of node C as represented by arrow 552 and box 554.

In certain alternative embodiments, items 522 and 550 may be viewed as context lists. Context lists 522 and 550 sharing common points, the contexts C and K. Context lists 522 and 550 may be seen as hyper-arc, with the collection of 522 and 550 being seen as a hypergraph. The hypergraph possesses a total collection of points A, B, C, F, J, K, L, M and Q, which may be further viewed as contexts, each possessing a node. Item 522 may represent the home directory of item C as seen by box 530 and arrows 524 and 526. Item 550 may represent a file essentially containing a copy of node C as represented by arrow 552 and box 554.

Figure 13:
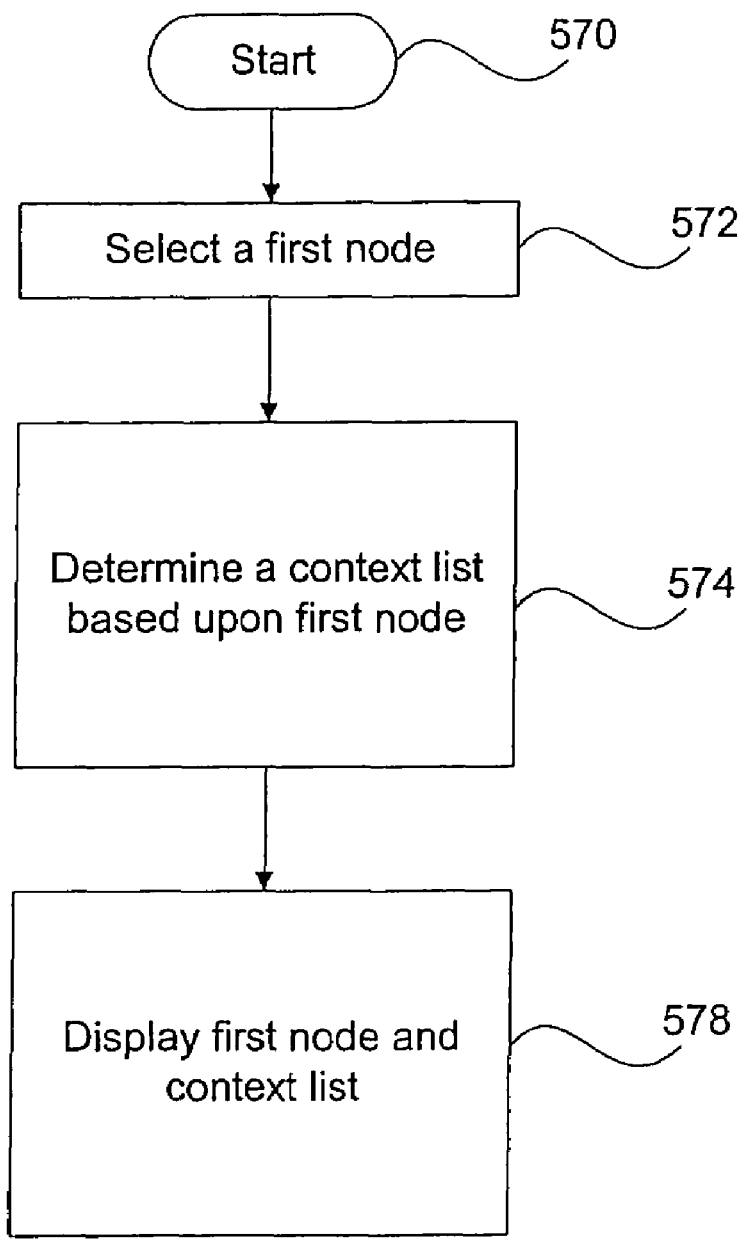
FIG. 13 is a flowchart in accordance with one embodiment.

FIG. 13 is a flowchart in accordance with one embodiment. Operation 570 initializes the operating environment for performing the following operations. Operation 570 may further allocate systems resources in certain embodiments of the invention.

Operation 572 selects a first node. In certain preferred environments, selection a first node may include but is not limited to selecting a file in a file directory system. In certain preferred environments, selection of a first node may include but is not limited to selecting a component of a compression file, containing as nodes, components which may be expanded to become files. In certain preferred environments, selection a first node may include but is not limited to selecting an image component from an image archive stored in a computer readable media. In certain preferred environments, selection a first node may include but is not limited to selecting an audio sequence from an archive of at least one audio sequence. In certain preferred environments, selection of a first node may include but is not limited to selecting an image component based upon its copyright signature.

Note that in certain embodiments, operation 572 may include but is not limited to receiving the selection from a remote device, such as a client in a client server system. In certain embodiments, operation 572 may include but is not limited to receiving the selection from a software agent, whose location may either be local or external to the system processing this method. In certain embodiments, operation 572 may include but is not limited to selection being made by a human using a selector device 14 as discussed above in FIGS. 1 and 2.

Operation 574 generates a context list based upon the first node. Generating a context list involves collecting contexts, each including a second node essentially referencing the first node. Note that there may be more than one node essentially referencing the first node within an individual context. In certain embodiments, essentially referencing the first node includes but is not limited to aliases of the first node as a file in a file management system. In certain embodiments, essentially referencing the first node includes but is not limited to copies of the content of the node as a file in a file management system. In certain embodiments, essentially referencing the first node includes but is not limited to an essentially contained version of the first node within the second node. In certain further embodiments, essentially containing a version of the first node within the second node includes but is not limited to incorporating essentially copying the contents of the first node into part or all of the content of the second node. In certain further embodiments, essentially copying the contents can be determined by detection of an embedded copyright signature of the first node in the second node.

Note that in certain embodiments, operation 574 may include but is not limited to generating a context list for a remote request, either as a client in a client server system or as a server in a client server system. In certain embodiments, operation 574 may include but is not limited to receiving the selection from a software agent, whose location may either be local or external to the system processing this method. These embodiments will be discussed in greater detail in FIG. 14 below. In certain embodiments, operation 574 may include but is not limited to generating a context list based upon contexts local to the processing system as discussed above in FIGS. 1 and 2. Such embodiments will also be discussed in greater detail in FIG. 14 below. In certain embodiments operation 574 occurs as a single series of actions while in other embodiments, operation 574 occurs spread over time as a functional side effect of other discrete functions.

Operation 578 displays the first node and context list. In certain embodiments, this operation is performed by transmitting the first node and context list to a local unit. In certain other preferred environments, this operation displays the first node and context list on a graphical display device such as 12 as discussed above in FIGS. 1 and 2. These and other embodiments of this operation will be discussed in further detail in FIGS. 16 and 17.

Figure 14:
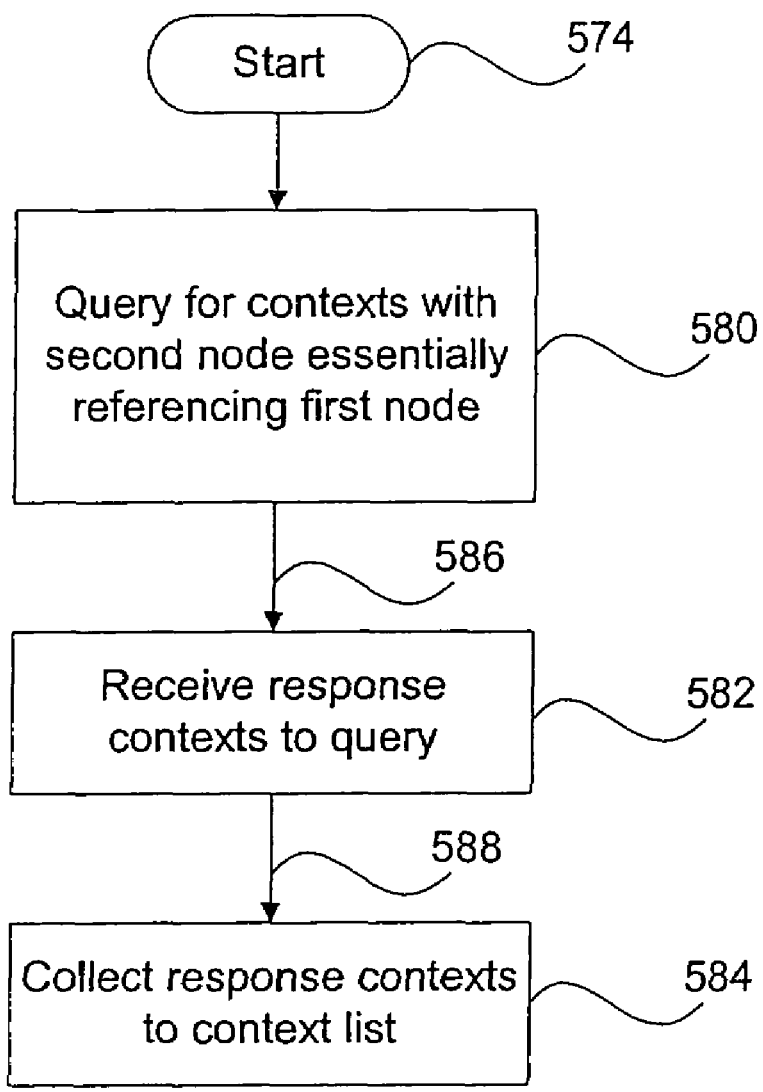
FIG. 14 is a detail flowchart for operation 574 of the flowchart 13 in accordance with one embodiment.

FIG. 14 is a detail flowchart for operation 574 of the flowchart 13 in accordance with certain embodiments. Operation 574 starts in many embodiments by initializing various system resources, such as the stack or heap frame of the runtime environment in which it is operating. Operation 580 queries for contexts with a second node essentially referencing the first node. Operation 582 receives response contexts to the query of operation 580. Operation 584 collects response contexts to a context list.

Operation 580 queries for contexts with a second node essentially referencing the first node. Operation 580 in certain embodiments performs the query locally. Operation 580 in certain further embodiments accesses a file management system to search for nodes (files), which are then examined to determine whether they essentially reference the first node. Operation 580 in certain other, further embodiments accesses a file management system to search for nodes contained in contexts (compression archives), which are then examined to determine whether they essentially reference the first node. These contexts are images archives in certain further embodiments. These contexts are motion video sequences in certain further embodiments. These contexts are audio archives in certain further embodiments. These contexts contain multi-media in certain further embodiments.

Operation 580 in certain embodiments performs the query externally. Operation 580 in certain further embodiments accesses a network file management system to search for nodes (files), which are then examined to determine whether they essentially reference the first node. Operation 580 in certain other, further embodiments accesses a network file management system to search for nodes contained in contexts (compression archives), which are then examined to determine whether they essentially reference the first node. These contexts are images archives in certain further embodiments. These contexts are motion video sequences in certain further embodiments. These contexts are audio archives in certain further embodiments. These contexts contain multi-media in certain further embodiments. Note that these external operations in certain embodiments may involve protocols such as TCPIP on the Internet. These external operations, in certain further embodiments, may involve the World Wide Web. These external operations, in certain embodiments, may involve interactions with software agents.

Operation 582 receives response contexts to the query of operation 580. Operation 580 in certain embodiments has performed the query locally. Receipt of response contexts in certain embodiments entails the reception of messages from operation 580 as represented by 586. Messages 586 in certain embodiments may be from a local concurrent process interrogating one or more mass storage units 30. In other embodiments, these messages 586 may be from a local concurrent process interrogating one or more removable media via removable media interface 34. In other embodiments, these messages may be from a local concurrent process which accesses data from an external environment 54 via external interface 58.

Operation 582 receives response contexts to the query of operation 580. Operation 580 in certain embodiments performs the query externally. Receipt of response contexts in certain embodiments entails the reception of messages from operation 580 as represented by 586. Messages 586 in certain embodiments may be from an external process residing in external environment 54 via external interface 58. Such an external process may reside on a server in certain embodiments. In certain other embodiments, the external process may reside on a client computer.

Operation 584 collects response contexts to a context list. Receipt of response contexts in certain embodiments entails the reception of messages from operation 582 as represented by 588. Note that in certain embodiments, arrow 588 may act as a First In First Out (FIFO) queue. In certain embodiments, operation 582 may perform format conversion operations upon the response contexts which have been received.

FIG. 15 is a portrayal of the user perspective on traversal of contexts in accordance with one embodiment. Display region 590 contains four display regions, labeled 592, 594, 596 and 598. First node 592 is labeled "D" which is diagrammatically shown as essentially references in contexts (regions) 594, 596 and 598. The contexts (regions) 594, 596 and 598 form the context list of first node 592. Context 594 is labeled "A". Context 596 is labeled "B". Context 598 is labeled "C".

Display region 600 is labeled "A" with a sub-region 602 labeled "D". This portrays the user view of selecting context 594 for examination, which is also labeled "A". The selecting context 594 (A) of the node 592 with context list of 594, 596 and 598, with the subsequent modification of the displayed user view to 600 is denoted by arrow 604 which goes from sub-region 594 to region 600. The return to displaying node 592 and the context list of 594, 596 and 598, from the displayed user view of region 600 is denoted by arrow 606 which goes from region 600 to sub-region 594.

Display region 610 is labeled "B" with a sub-region 612 labeled "D". This portrays the user view of selecting context 596 for examination, which is also labeled "B". The selecting context 596 (B) of the node 592 with context list of 594, 596 and 598, with the subsequent modification of the displayed user view to 610 is denoted by arrow 614 which goes from sub-region 594 to region 610. The return to displaying node 592 and the context list of 594, 596 and 598, from the displayed user view of region 610 is denoted by arrow 616 which goes from region 610 to sub-region 596.

Display region 620 is labeled "C" with a sub-region 622 labeled "D". This portrays the user view of selecting context 598 for examination, which is also labeled "B". The selecting context 598 (C) of the node 592 with context list of 594, 596 and 598, with the subsequent modification of the displayed user view to 620 is denoted by arrow 624 which goes from sub-region 594 to region 620. The return to displaying node 592 and the context list of 594, 596 and 598, from the displayed user view of region 620 is denoted by arrow 626 which goes from region 620 to sub-region 598.

Figure 16:
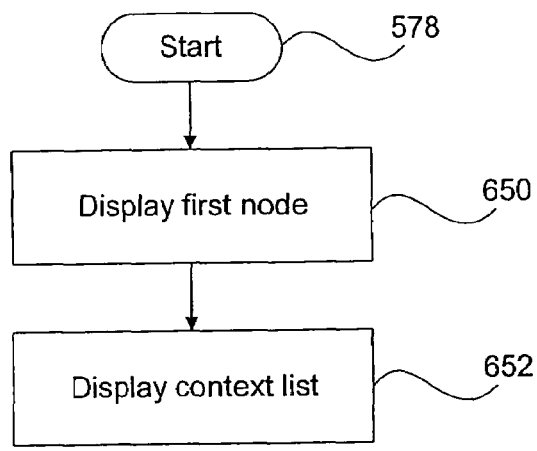
FIG. 16 is a flowchart of displaying first node and context list in accordance with an embodiment.

FIG. 16 is a flowchart of operation 578 displaying first node and context list in accordance with an embodiment. Operation 650 displays the first node. Operation 652 displays the context list. In certain embodiments, operation 650 displays the first node locally. In certain other embodiments, operation 650 transmits the first node to an external system. In certain embodiments, operation 652 displays the context list locally. In certain other embodiments, operation 652 transmits the context list to an external system. Note that in certain embodiments operation 650 transmits externally and operation 652 displays locally. Similarly, in certain embodiments, operation 650 displays locally and operation 652 transmits externally.

Figure 17:
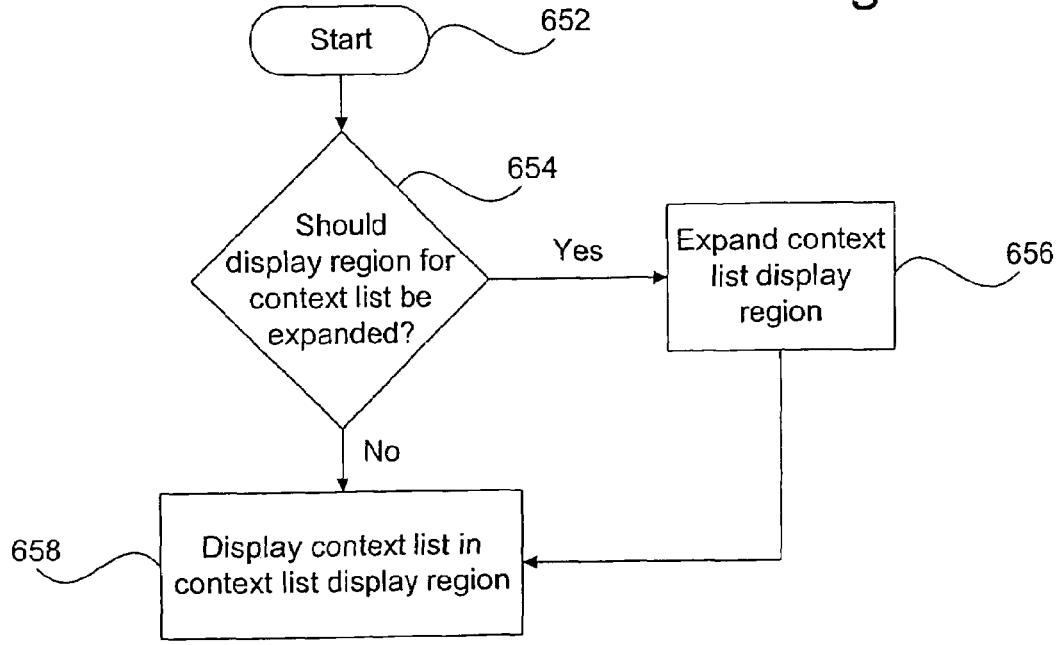
FIG. 17 is a detail flowchart of displaying a context list 652 of FIG. 16 in accordance with an embodiment.

FIG. 17 is a detail flowchart for displaying a context list 652 of FIG. 16 in accordance with an embodiment. Operation 654 determines if the display region for the context list should be expanded. In certain embodiments, operation 654 includes selecting a visual cue, such as pressing a mouse button while proximate with an icon or other windows artifact such an a pull-down menu or menu entry, or window button. If the context list display region should be expanded, operation 656 expands the context list display region. These operations are followed by operation 658 displaying the context list in the context list display region. This figure will be discussed in greater detail after a discussion of FIGS. 18A and 18B.

Figure 18A:
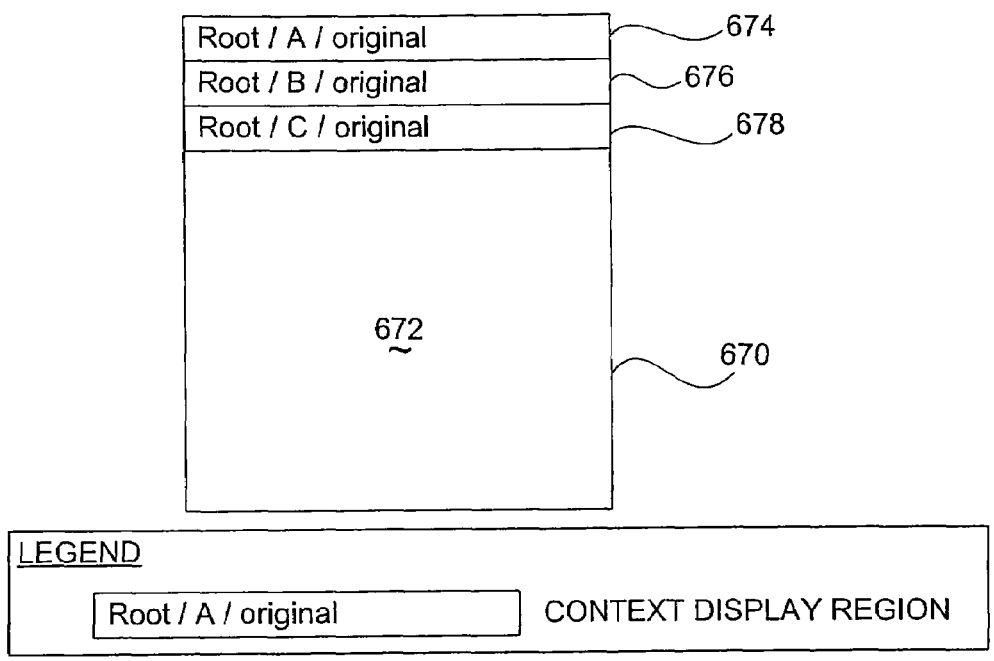
FIG. 18A portrays the display of a first node and a context list in accordance with one embodiment.

FIG. 18A portrays the display 670 of a first node and a context list in accordance with one embodiment. Display region 672 in certain embodiments may display the contents of the first node. Display regions 674, 676 and 678 display the contexts essentially referencing the first node in certain embodiments. In certain further embodiments, these contexts may be displayed as path and possibly file names pointing to the contexts.

Figure 18B:
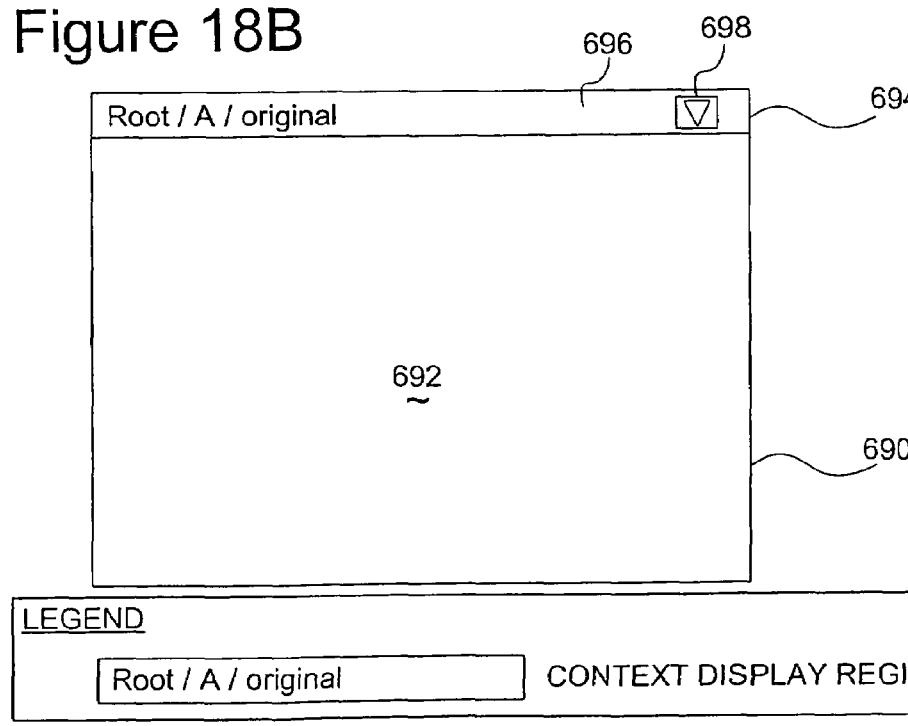
FIG. 18B portrays the display of a first node and a context list in accordance with an embodiment.

FIG. 18B portrays the display 690 of a first node and a context list in accordance with an embodiment. Display 690 is composed of display regions 692 and 694. Display region 692 in certain embodiments displays the contents of the first node. Display region 692 in certain other embodiments displays a summary of the contents of the first node. Display region 692 in certain further embodiments displays a thumbnail sketch of the contents of the first node. The first node in certain embodiments contains one or more images. The first node in certain embodiments contains audio sequences, which may be displayed by title, or alternatively by portrayal of the acoustic envelope of the entire sequence or its opening.

Display region 694 is further composed of a short context list 696 and a context list expansion button 698. The short context list display 696 shows one context as a directory path. In certain embodiments, the short context list display 696 shows more than one context as a directory path. In certain embodiments, the display region 694 may additionally contain buttons to navigate long context lists which may be too big to be viewed all at once.

Consider now the operations of FIG. 17 when applied in the following manner to FIGS. 18A and 18B. Assume that FIG. 18B is initially displayed. Only a limited part of the context list can be seen. Suppose the user selects to push button 698. The system would perform operation 654 and determine that the user wishes to expand the context list display region. Operation 656 would follow, causing the expansion of the context list display as in FIG. 18A. Operation 658 would then display the context list in the context list display region as shown in FIG. 18A.

Note that contraction of the context list display region would use essentially the same approach in reverse.

Figure 19A:
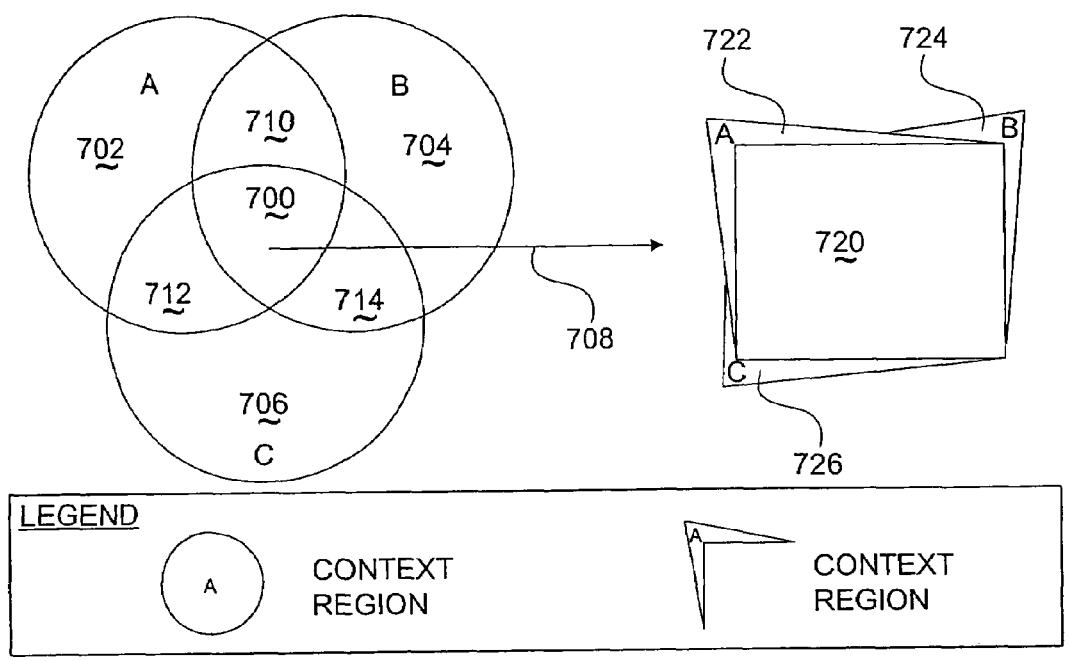
FIG. 19A portrays the relationship between a first node and context list and one user perspective display of the first node and context list in accordance with an embodiment.

FIG. 19A portrays the relationship between a first node and context list and one user perspective display of the first node and context list in accordance with an embodiment.

The figure is divided into a right and left portion connected by an arrow 708. The left portion is composed of three circular areas labeled A, B and C. Circular region A contains sub-regions 700, 702, 710 and 712. Circular region B contains sub-regions 700, 710, 704 and 714. Circular region C contains sub-regions 700, 712, 714 and 706. The right portion of the figure is composed of a rectangular region 720 surrounded by three wedge shaped regions 722 (labeled A), 724 (labeled B) and 726 (labeled C).

Figure 19B:
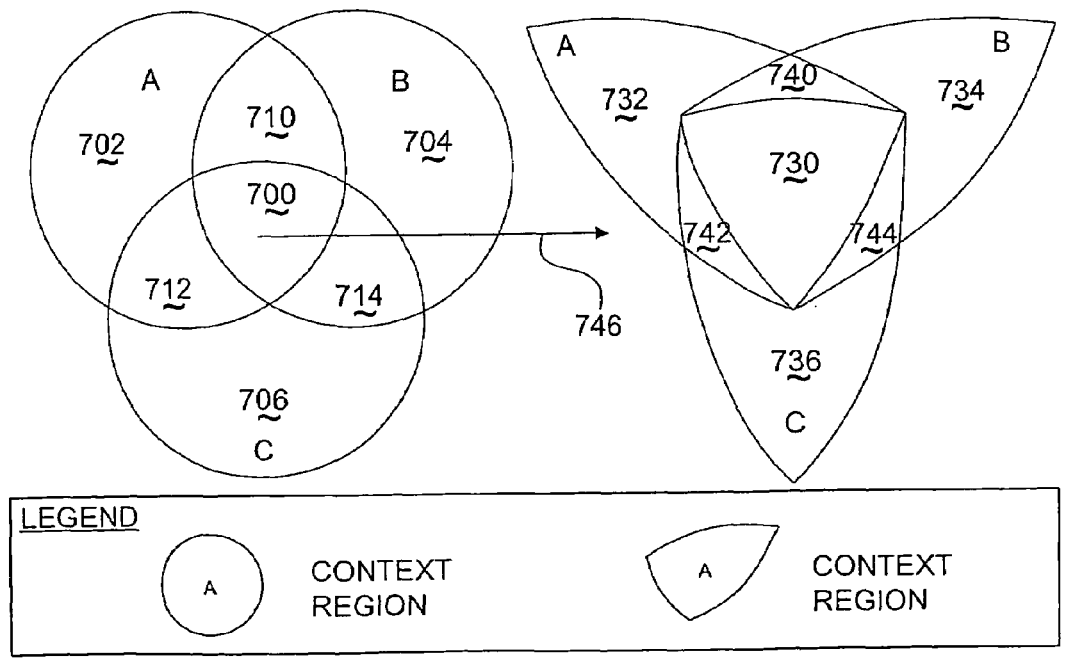
FIG. 19B portrays the relationship between a first node and context list and one user perspective display of the first node and context list in accordance with another embodiment.

FIG. 19B portrays the relationship between a first node and context list and one user perspective display of the first node and context list in accordance with another embodiment.

The figure is divided into a right and left portion connected by an arrow 746. The left portion is composed of three circular areas labeled A, B and C in a similar fashion to FIG. 19A. Circular region A contains sub-regions 700, 702, 710 and 712. Circular region B contains sub-regions 700, 710, 704 and 714. Circular region C contains sub-regions 700, 712, 714 and 706. The right portion of the figure is composed of a rounded triangular region 730 included in three rounded triangular regions labeled A, B and C. Rounded triangular region A contains sub-regions 730, 732, 740 and 742. Rounded triangular region B contains sub-regions 730, 740, 734 and 744. Rounded triangular region C contains sub-regions 730, 742, 744 and 736.

Figure 20:
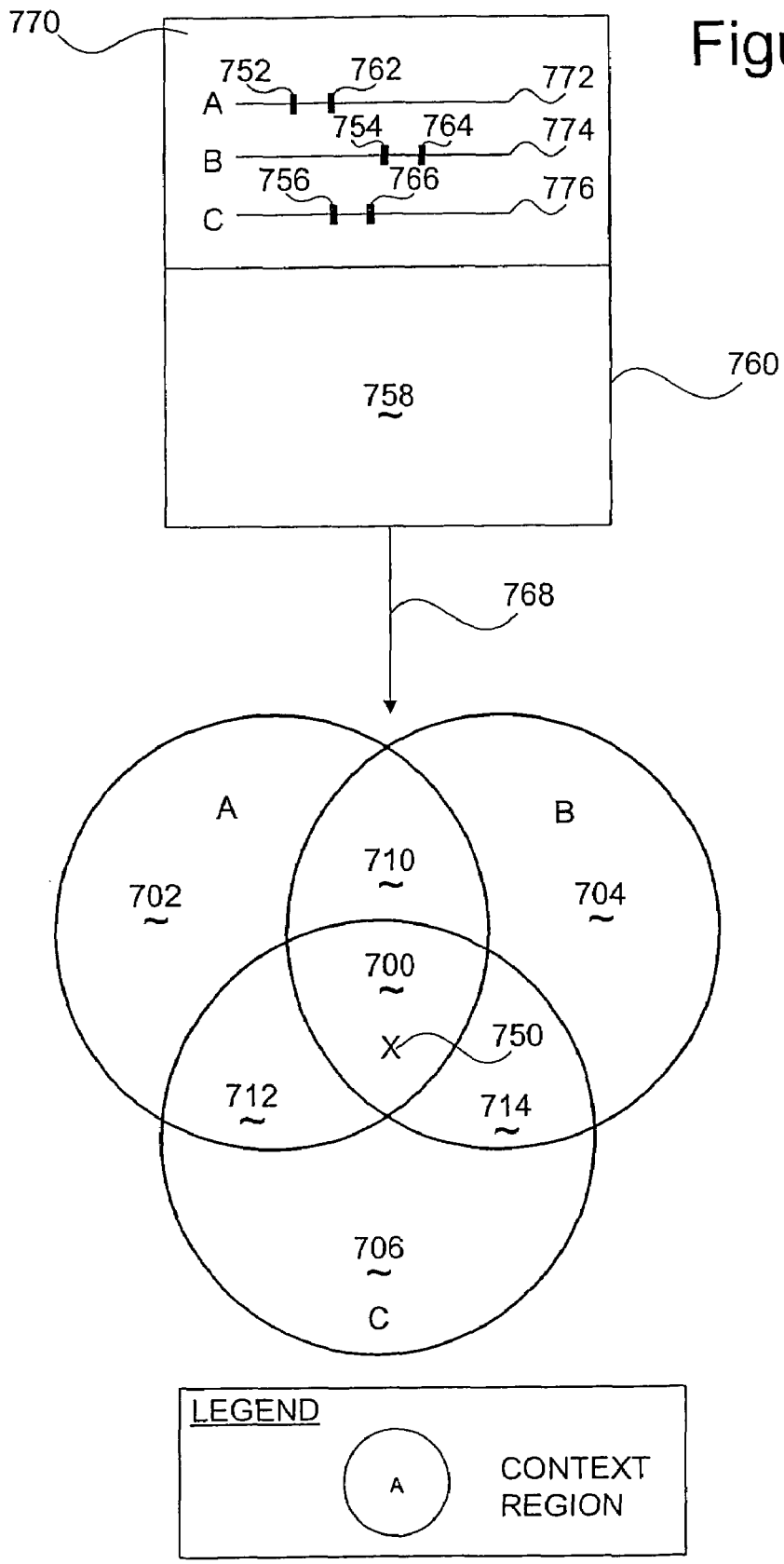
FIG. 20 portrays the relationship between a first node and context list and one user perspective display of the first node and context list in accordance with another embodiment.

FIG. 20 portrays the relationship between a first node and context list and one user perspective display of the first node and context list in accordance with another embodiment.

The figure is divided into an upper and lower portion connected by an arrow 768. The lower portion is composed of three circular areas labeled A, B and C in a similar fashion to FIG. 19A. Circular region A contains sub-regions 700, 702, 710 and 712. Circular region B contains sub-regions 700, 710, 704 and 714. Circular region C contains sub-regions 700, 712, 714 and 706. Sub-region 700 contains a point designated 750. The upper portion 760 contains sub-regions 758 and 770. Sub-region 770 acts as a control panel with sliders 772, 774 and 776 labeled A, B and C, respectively. Slider A has a first slider control point 752. In certain further embodiments, slider A has a second slider control point 762. Slider B has a first slider control point 754. In certain further embodiments, slider B has a second slider control point 764. Slider C has a first slider control point 756. In certain further embodiments, slider C has a second slider control point 766.

FIG. 21 portrays a symmetric parameter domain name viewer in accordance with an embodiment. Viewing region 800 is composed of sub-region 810 and sub-region 812. Sub-region 810 is shown composed of two field type designators 802 and 806. Associated with filed type designator 802 is a field box 804, used to designate the specific first URL. Associated with field type designator 806 is a field box 808, used to designate the specific first URL. Sub-region 812 displays content of a node referenced symmetrically by sub-region 810 URL designators.

By way of example, field type designators have been shown associated with each field box. In certain embodiments, a field type designator may be shown and interpreted as associated with two or more field boxes. In certain embodiments, there may be no separate, associated field type designators displayed.

By way of example, field type designators 802 and 806 are shown as text fields. In certain embodiments, such field type designators may be shown as icons. In certain By way of example, sub-region 810 is positioned above sub-region 812. In other embodiments, sub-region 810 is positioned below sub-region 812. In other embodiments, sub-region 810 is positioned to the right of sub-region 812. In other embodiments, sub-region 810 is positioned to the left of sub-region 812. In certain embodiments, the boundary between sub-region 810 and 812 is clearly marked. In certain other embodiments, there is no clearly marked boundary between sub-region 810 and 812.

By way of example, sub-region 810 is a single essentially rectangular area of the display. In other embodiments, sub-region 810 may be composed of more than one rectangular area. In embodiments possessing two or more rectangular areas, these rectangular areas may be distributed in any combination of above, below, to the left or the right of sub-region 812.

By way of example, sub-region 810 is shown as essentially rectangular. In other embodiments, sub-region 810 is shown as essentially being non-rectangular. In certain embodiments, sub-region 810 is essentially rounded. In certain further embodiments, sub-region 810 is essentially oval. In certain further embodiments, sub-region 810 is essentially circular.

By way of example, sub-region 812 is shown as essentially rectangular. In other embodiments, sub-region 812 is shown as essentially being non-rectangular. In certain embodiments, sub-region 812 is essentially rounded. In certain further embodiments, sub-region 812 is essentially oval. In certain further embodiments, sub-region 812 is essentially circular.

By way of example, sub-region 810 adjoins sub-region 812. In other embodiments, sub-region 810 and sub-region 812 are not adjoining. In other embodiments, sub-region 812 surrounds sub-region 810. In still other embodiments, sub-region 810 surrounds sub-region 812.

By way of example, selection of a field type designator 802 permits changing the field type of field box 804. Selection of field box 804 permits changing the displayed context of field box 804. The contents of field box 804 are associated with an attribute belonging to an attribute collection. The contents of field box 806 are associated with an attribute belonging to an attribute collection. In certain embodiments, the contents of field box 804 are associated with a first sub-attribute of one attribute. The contents of field box 808 are associated with a second sub-attribute of the same attribute.

The system uses these two sub-attributes to form the attribute. This attribute is then treated as at least part of an attribute collection. The attribute collection is in certain embodiments, submitted to an address generation database engine, which searches the database for an attribute collection essentially the same as the submitted attribute collection. Two attribute collections will be the same if they have the same number of attributes and corresponding attributes are each essentially the same. Instances of attributes composed of sub-attributes as described above are essentially the same if each the sub-attributes of the first instance match some corresponding sub-attribute of the second instance. Note that this correspondence may be direct one-for-one correspondence, or any permutation of the direct correspondence.

Figure 22:
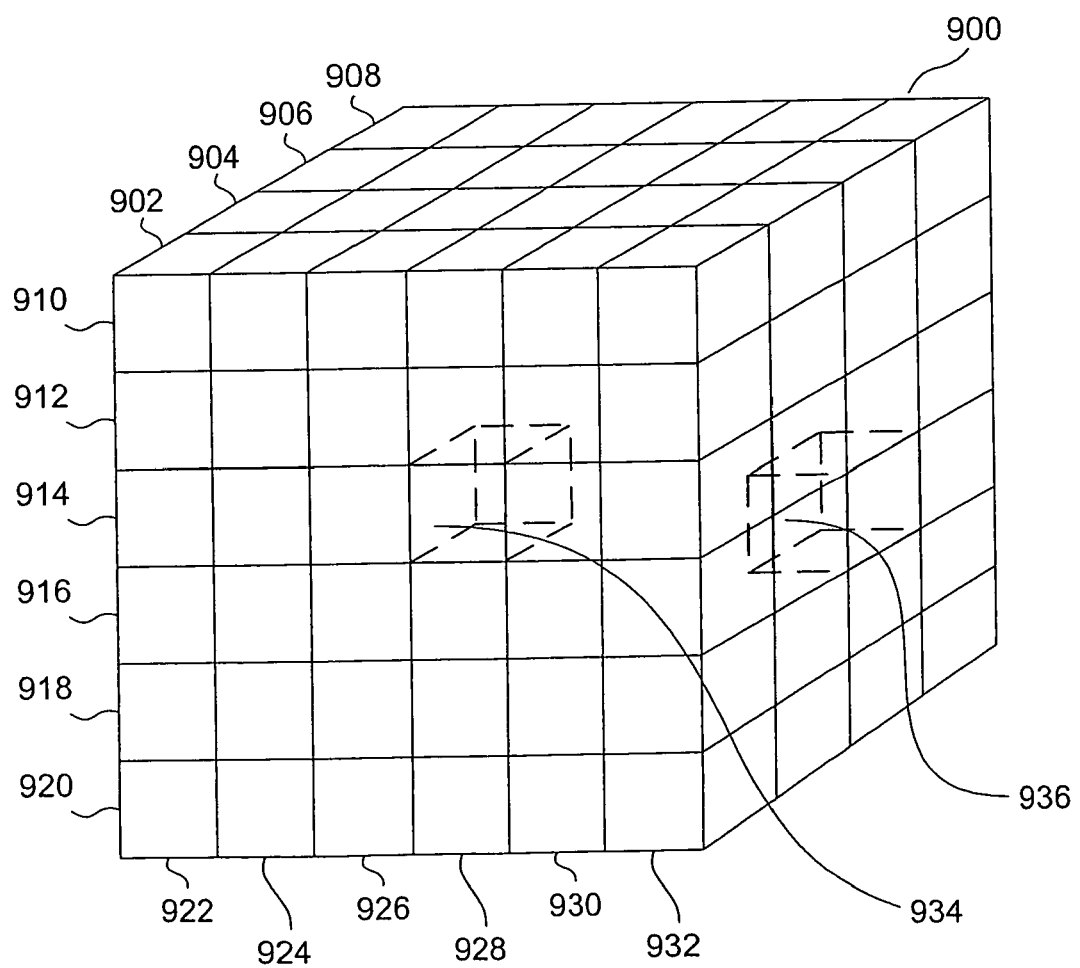
FIG. 22 portrays a domain name address space as a multi-dimensional structure in accordance with an embodiment.

FIG. 22 portrays a domain name address space 900 as a multi-dimensional structure in accordance with an embodiment. By way of example, the domain name space 900 is shown as a three dimensional space. A first dimension is shown delineated by coordinate values of 902, 904, 906 and 908. A second dimension is shown delineated by coordinate values of 910, 912, 914, 916, 918 and 920. A third dimension is shown delineated by coordinate values of 922, 924, 926, 928, 930 and 932. Two sub-domains are delineated as 934 and 936.

In certain embodiments, two of these dimensions may be symmetric, so that the coordinates of the second and third dimension would interchangeably yield the same address. In certain further embodiments, more than two dimensions may be symmetric, so that any permutation of values for those more than two dimensions would interchangeably yield the same address.

In certain alternative embodiments, the dimension axes are associated with specific attribute values and at least one attribute possesses at least two sub-attributes, which may be arranged in any order, and yield the same address. Note that this is from the user's perspective. As will be noted shortly, the crucial issues are the user's perspective and the efficiency of the system.

FIG. 23 portrays a symmetric parameter domain name viewer of a trademark space in accordance with an embodiment. Region 1000 is comprised of sub-region 1002 and sub-region 1004. Sub-region 1002 is comprised of a field type designator 1006 associated with a field box 1008. Sub-region 1002 is further comprised of a field type designator 1010 associated with a field box 1012. Sub-region 1002 is further comprised of a field type designator 1014 associated with a field box 1016. Sub-region 1002 is further comprised of a box 1018.

Field type designator 1006 is shown with the text value of "Name". Associated field box 1008 is shown with the text value of "ACME". Field type designator 1010 is shown with the text value of "Industry". Associated with a field box 1012 is shown with the text value of "Steel". Field type designator 1014 is shown with the text value of "Location". Associated with a field box 1016 is shown with the text value of "Detroit, Mich.". Box 1018 is shown with the text value of "Other".

Figure 24A:
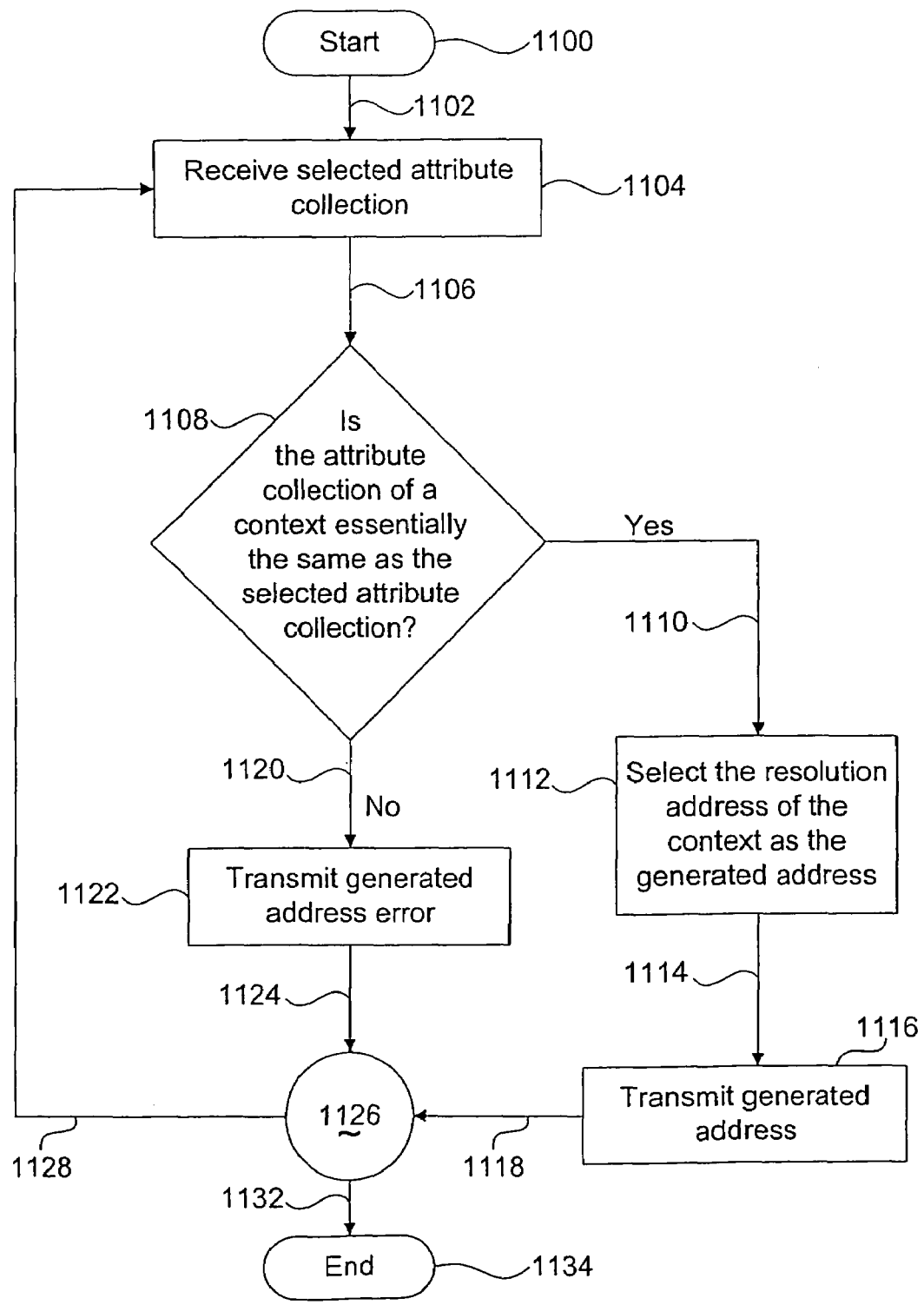
FIG. 24A is a flowchart for the generation of an address based upon an attribute collection in accordance with an embodiment.

FIG. 24A is a flowchart for the generation of an address based upon an attribute collection in accordance with an embodiment. It accesses a database called a context list whose entries are called contexts. Each context is composed of an attribute collection and a resolution address.

There are specific constraints imposed upon this database in certain embodiments. Each context is essentially different from all other context in the context collection in two ways. The attribute collection of each context is not essentially the same as the attribute collection of any other context in the context collection. The resolution address of each context is different from the resolution address of any other context in the context collection. These constraints are advantageous in meeting the requirements for domain name addressing schemes such as employed by the TCP/IP naming protocols such Internet requires.

Operation 1100 starts the process of generating an address based upon an attribute collection. In certain embodiments, the start operation entails system resource allocation. Arrow 1102 designates the flow of execution from starting operation 1100 to operation 1104. Operation 1104 receives the selected attribute collection. Arrow 1106 designates the flow of execution from operation 1104 to operation 1108.

Operation 1108 determines whenever an attribute collection of a context is essentially the same as the selected attribute collection. Arrow 1110 designates execution flow from operation 1108 to operation 1112, whenever an attribute collection of a context is essentially the same as the selected attribute collection. If there is no context whose attribute collection is essentially the same as the selected attribute collection, arrow 1120 designates the flow of execution from operation 1108 to operation 1122.

Operation 1112 designates selecting the resolution address of the context whose attribute collection is essentially the same as the selected attribute collection as the generated address. Arrow 1114 designates the flow of execution from operation 1112 to operation 1116. Operation 1116 designates the transmission of the generated address. Arrow 1118 designates the flow of execution from operation 1116 to operation 1126. Operation 1126 acts as a wait or pause function until a new selected attribute collection is ready to be received in certain embodiments. In certain other embodiments, operation 1126 may determine whether to branch via arrow 1128 or arrow 1132. Arrow 1128 designates the flow of execution from operation 1126 to operation 1104, which then repeats the process.

Operation 1122 designates the transmission of a generated address error. Arrow 1124 designates the flow of execution from operation 1122 to 1126. Arrow 1132 designates the flow of execution from operation 1126 to operation 1134. Operation 1134 exits from this flowchart, in certain embodiments, releasing systems resources allocated upon starting this flowchart.

In certain embodiments, there is no need to either transmit the generated address or transmit the generated address error. Such embodiments include but are not limited to systems in which the requesting activity for address generation and the address generation process are essentially local to each other. In such embodiments operations 1116 and 1122 are null operations.

In certain embodiments, arrow 1128 is not found. Operation 1126 may act to exit the process, which is started the next time a selected attribute collection is ready to be received by this process. In such embodiments, operation 1126 may release systems resources allocated at the start with operation 1100. In certain embodiments, a message paradigm is employed. Matching one or more templates to a received message may trigger operation 1100.

Operation 1104 in certain embodiments includes translation of the incoming selected attribute collection into an internal attribute format. An exemplary embodiment would include the ordering of sub-attributes of an attribute and concatenating these ordered sub-attributes into a string. Such a translation would be applied to each context as it was inserted into the database, so that essential comparisons would be insured completed in one pass without backtracking, as well as supporting comparison of any permutation of the sub-attributes. In certain embodiments, optimizations supporting rapid indexing, such as hash code generation, supporting rapid indexing into the context list database may be performed by this operation.

Arrow 1106 in certain embodiments acts upon the generated hash code to trigger operation 1108 acting upon a restricted portion of the context list database. Note that in certain embodiments, the hash code may be no more than a first level attribute, such as "com", "org" or "gov". Operation 1108 may be a sequential search of the database or portion of the database in certain embodiments. In other embodiments, operation 1108 may be a concurrent examination of the context database or portion of the context database.

Figure 24B:
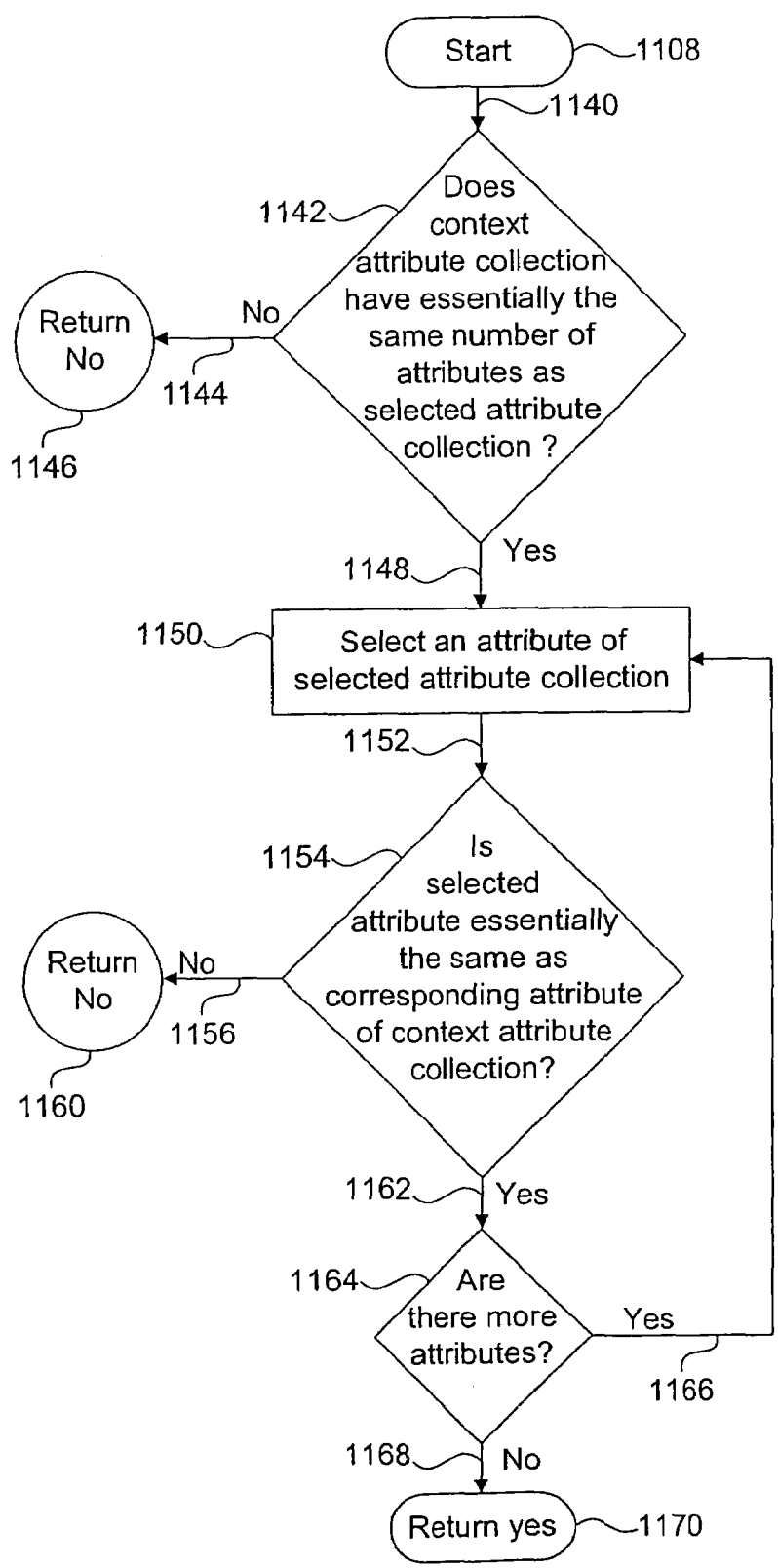
FIG. 24B is a detail flowchart for operation 1108 of the flowchart of FIG. 24A in accordance with an embodiment.

FIG. 24B is a detail flowchart for operation 1108 of the flowchart of FIG. 24A in accordance with an embodiment. Operation 1108 starts in certain embodiments by allocating system resources. Arrow 1140 designates the flow of execution to operation 1142. Operation 1142 compares the number of attributes in a context to the number in the selected context attribute collection. If they are not same, arrow 1144 directs execution to operation 1146, which returns No. If they are the same, arrow 1148 directs execution to operation 1150. Operation 1150 selects an attribute of the context attribute collection. Arrow 1152 designates a flow of execution to operation 1154 from operation 1150. Operation 1154 determines whether the selected attribute is essentially the same as the corresponding attribute of the selected context attribute collection. If it is not essentially the same, arrow 1156 directs execution to operation 1160, which returns No. Arrow 1162 designates the flow of execution from operation 1154 to operation 1164 which is taken when the selected attribute of the context and the corresponding attribute of the selected attribute collection are essentially the same. Operation 1164 determines if there are more attributes. If there are more attributes, arrow 1166 designates the flow of execution to operation 1150 where an attribute is selected from the remaining attribute of the context attribute collection. Arrow 1168 designates the flow of execution from operation 1164 to operation 1170, which is taken when there are no more attributes to be compared. Operation 1170 returns Yes.

In certain embodiments, the operations of this flowchart are performed sequentially. In certain other embodiments, various operations may be concurrently executed. Operations 1142 and the cluster of operations 1150, 1160, 1164 and 1170 may be concurrently performed. Further embodiments may entail the performance of the comparison operation 1154 upon several attributes at once, with operation 1150 selecting several attributes at once. Operations 1146 and 1160 may be performed by the same instructions in a computer program implementing this process.

In certain embodiments, operations 1146, 1160 and 1170 may act to release system resources allocated upon starting operation 1108. In certain further embodiments the instructions of the computer program which releases the system resources may be shared by all or some of these operations.

Figure 25:
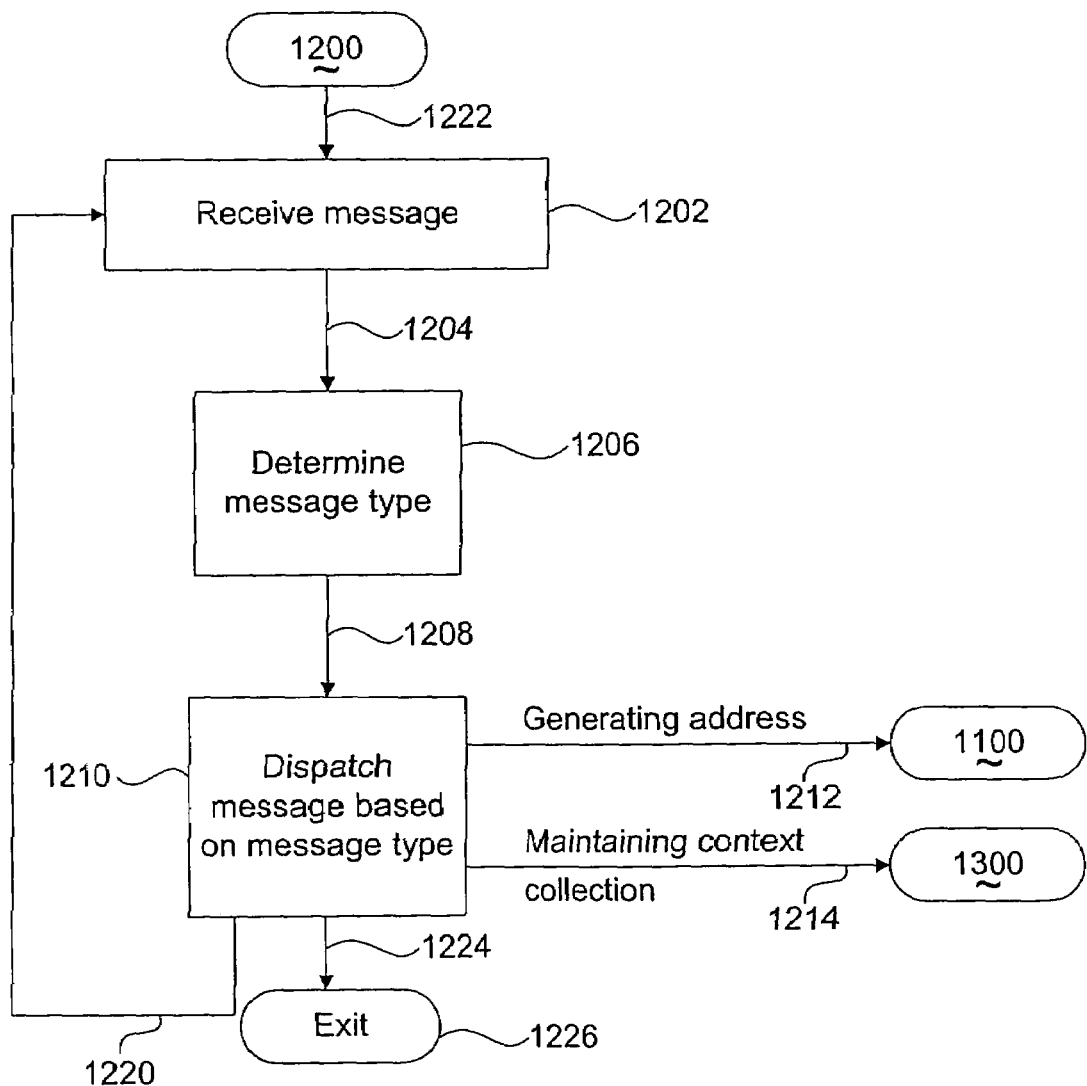
FIG. 25 is a flowchart for the reception and dispatch of messages requesting address generation and context collection maintenance operations in accordance with an embodiment.

FIG. 25 is a flowchart for the reception and dispatch of messages requesting address generation and context collection maintenance operations in accordance with an embodiment. Operation 1200 starts the process. In certain embodiments, systems resources are allocated for the following operations. Arrow 1222 designates the flow of execution from starting to operation 1202. Operation 1202 acts to receive messages. Arrow 1204 designates the flow of execution between operation 1202 and 1206. Operation 1206 determines the message type of received messages. Arrow 1208 designates the flow of execution from operation 1206 to operation 1210. Arrow 1212 designates the flow of execution from operation 1210 to operation 1100. Arrow 1214 designates the flow of execution from operation 1210 to operation 1300. Operation 1300 processes requests for maintenance operations upon the context collection and will be described in greater detail in FIG. 26. Arrow 1220 designates the flow of execution from operation 1210 to operation 1202. Arrow 1224 designates the flow of execution from operation 1210 to operation 1226. Operation 1226 exits the operations of this flowchart.

In certain embodiments, operation 1202 acts to collect more than one message. Arrow 1222 in such embodiments is activated when either a sufficient number of messages have been received, or additionally in certain further embodiments, when a sufficient period of time has transpired since the reception of the earliest message.

In certain embodiments, operation 1206 occurs concurrently with operation 1202. In certain further embodiments, operations 1202 and 1206 are performed on separate hardware execution units. In certain further embodiments, the separate hardware execution units processing 1202 and 1206 are local to the same hardware system. In certain further embodiments, the separate hardware execution units processing 1202 and 1206 are local to the same system package. In certain further embodiments, the separate hardware execution units processing 1202 and 1206 are local to the same integrated circuit.

In certain embodiments, operation 1206 may act upon multiple messages as collected by operation 1202. In certain further embodiments, operation 1206 may further perform operations which in effect group the various messages into those which request address generation and those which request context collection maintenance operations.

In certain embodiments, operation 1210 occurs concurrently with operation 1206. In certain further embodiments, operations 1206 and 1210 are performed on separate hardware execution units. In certain further embodiments, the separate hardware execution units processing 1206 and 1210 are local to the same hardware system. In certain further embodiments, the separate hardware execution units processing 1206 and 1210 are local to the same system package. In certain further embodiments, the separate hardware execution units processing 1206 and 1210 are local to the same integrated circuit.

In certain embodiments, operation 1100 occurs concurrently with operation 1210. In certain further embodiments, operations 1210 and 1100 are performed on separate hardware execution units. In certain further embodiments, the separate hardware execution units processing 1210 and 1100 are local to the same hardware system. In certain further embodiments, the separate hardware execution units processing 1210 and 1100 are local to the same system package. In certain further embodiments, the separate hardware execution units processing 1210 and 1100 are local to the same integrated circuit.

In certain embodiments, operation 1300 occurs concurrently with operation 1202. In certain further embodiments, operations 1202 and 1300 are performed on separate hardware execution units. In certain further embodiments, the separate hardware execution units processing 1202 and 1300 are local to the same hardware system. In certain further embodiments, the separate hardware execution units processing 1202 and 1300 are local to the same system package. In certain further embodiments, the separate hardware execution units processing 1202 and 1300 are local to the same integrated circuit.

In certain embodiments, operation 1100 occurs concurrently with operation 1300. In certain further embodiments, operations 1300 and 1100 are performed on separate hardware execution units. In certain further embodiments, the separate hardware execution units processing 1300 and 1100 are local to the same hardware system. In certain further embodiments, the separate hardware execution units processing 1300 and 1100 are local to the same system package. In certain further embodiments, the separate hardware execution units processing 1300 and 1100 are local to the same integrated circuit.

Figure 26:
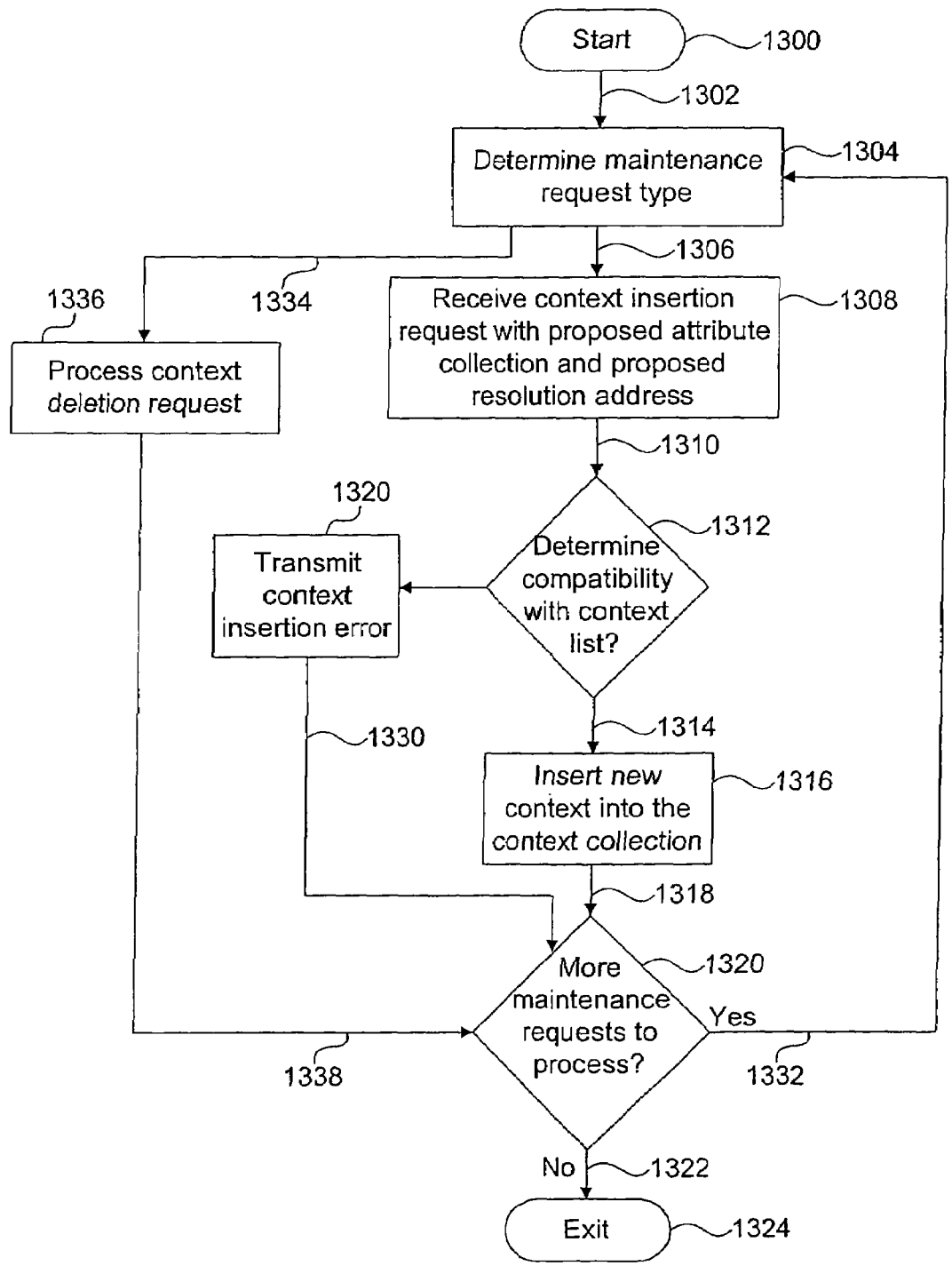
FIG. 26 is a detail flowchart for operation 1300 of FIG. 25 for the processing of context collection maintenance operations in accordance with an embodiment.

FIG. 26 is a detail flowchart for operation 1300 of FIG. 25 for the processing of context collection maintenance operations in accordance with an embodiment. Arrow 1302 designates the flow of execution from operation 1300 to operation 1304. Operation 1304 determines the maintenance request type. Arrow 1306 designates the flow of execution from operation 1304 to operation 1308. Operation 1308 receives the context insertion request with proposed attribute collection and proposed resolution address. Arrow 1310 designates the flow of execution from operation 1308 to operation 1312. Operation 1312 determines whether the proposed context with proposed attribute collection and proposed resolution address is compatible with the context list database. Arrow 1314 designates the flow of execution from operation 1312 to operation 1316. Operation 1316 inserts the new context into the context collection. Arrow 1318 designates the flow of execution from operation 1316 to operation 1320. Operation 1320 determine if there are more maintenance requests to process. Arrow 1322 designates the flow of execution from operation 1320 to operation 1324. Operation 1324 exits from the operations of this flowchart. Arrow 1326 designates the flow of execution from operation 1312 to operation 1328. Operation 1328 transmits a context insertion error. Arrow 1330 designates the flow of execution from operation 1328 to operation 1320. Arrow 1332 designates the flow of execution from operation 1320 to operation 1304. Arrow 1334 designates the flow of execution from operation 1304 to operation 1336. Operation 1336 processes a context deletion request. Arrow 1338 designates the flow of execution from operation 1336 to operation 1320.

In certain embodiments, only one context list maintenance request is processed at one time, so that operation 1320 and arrow 1332 are not actively present in this flowchart.

In certain embodiments, no transmission of context insertion errors may be performed, making operation 1328 inactive in this flowchart, and having the effect of combining arrows 1326 and 1330 into a single arrow.

In certain embodiments, processing only context insertion requests may be implemented as a standalone process, rendering operations 1304 and 1336 as well as arrows 1334 and 1338 inactive in this flowchart. In certain further embodiments, multiple context insertion requests may be processed, making operation 1304 combined with arrow 1332 lead directly to arrow 1306.

In certain embodiments, operation 1304 acts upon a collection of maintenance requests. Thus operations 1308, 1312, 1316, 1328 and 1336 may each act upon more than one request.

Operations 1304, 1308, 1312, 1316, 1320, 1328 and 1336 may each be performed concurrently in certain embodiments. In such embodiments the arrows of this flowchart may be implemented as signals and signaling protocols in hardware. In further embodiments, the operations and arrows of this flowchart may be implemented as concurrent components and their interface signaling within a single system component. In certain further embodiments, the operations and arrows of this flowchart may be implemented as concurrent components and their interface signaling within a single integrated circuit.

Figure 27:
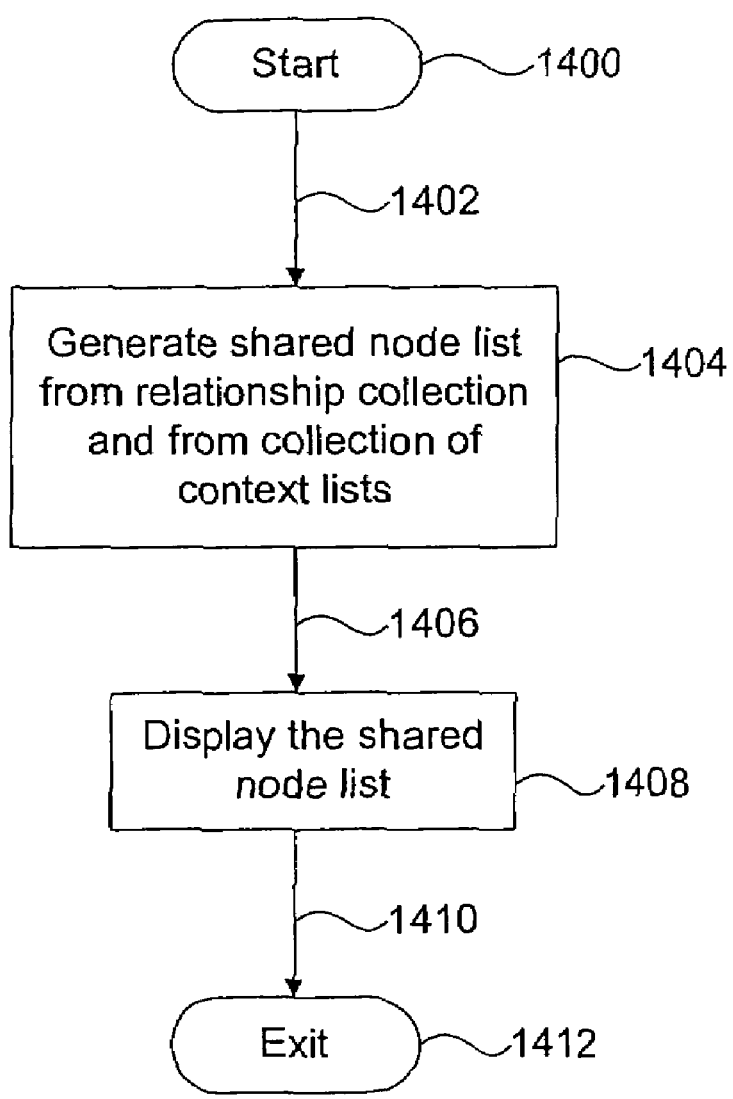
FIG. 27 is a flowchart for processing the generation of a shared node list and display of the shared node list in accordance with an embodiment.

FIG. 27 is a flowchart for processing the generation of a shared node list and display of the shared node list in accordance with an embodiment. Operation 1400 starts the operations of the flowchart. Arrow 1402 designates the flow of execution from operation 1400 to operation 1404. Operation 1404 generates a shared node list from a relationship collection and from a collection of context lists. Arrow 1406 designates the flow of execution from operation 1404 to operation 1408. Operation 1408 displays the shared node list. Arrow 1410 designates the flow of execution from operation 1408 to operation 1412. Operation 1412 exits from the operations of this flowchart.

In certain embodiments, all of these operations are performed on a single computer. In certain further embodiments, these operations are performed sequentially. In certain embodiments. These operations are performed concurrently.

In certain other embodiments, performance of these operations involves activities on multiple processors. In certain further embodiments, these operations involve the interaction of processors over a network. In certain further embodiments, these operations involve interactions between processors involving a client-server paradigm. In certain embodiments, these interactions involve the Internet. In certain embodiments, these interactions involve an Intranet. In certain embodiments, these interactions involve an Extranet.

Figure 28:
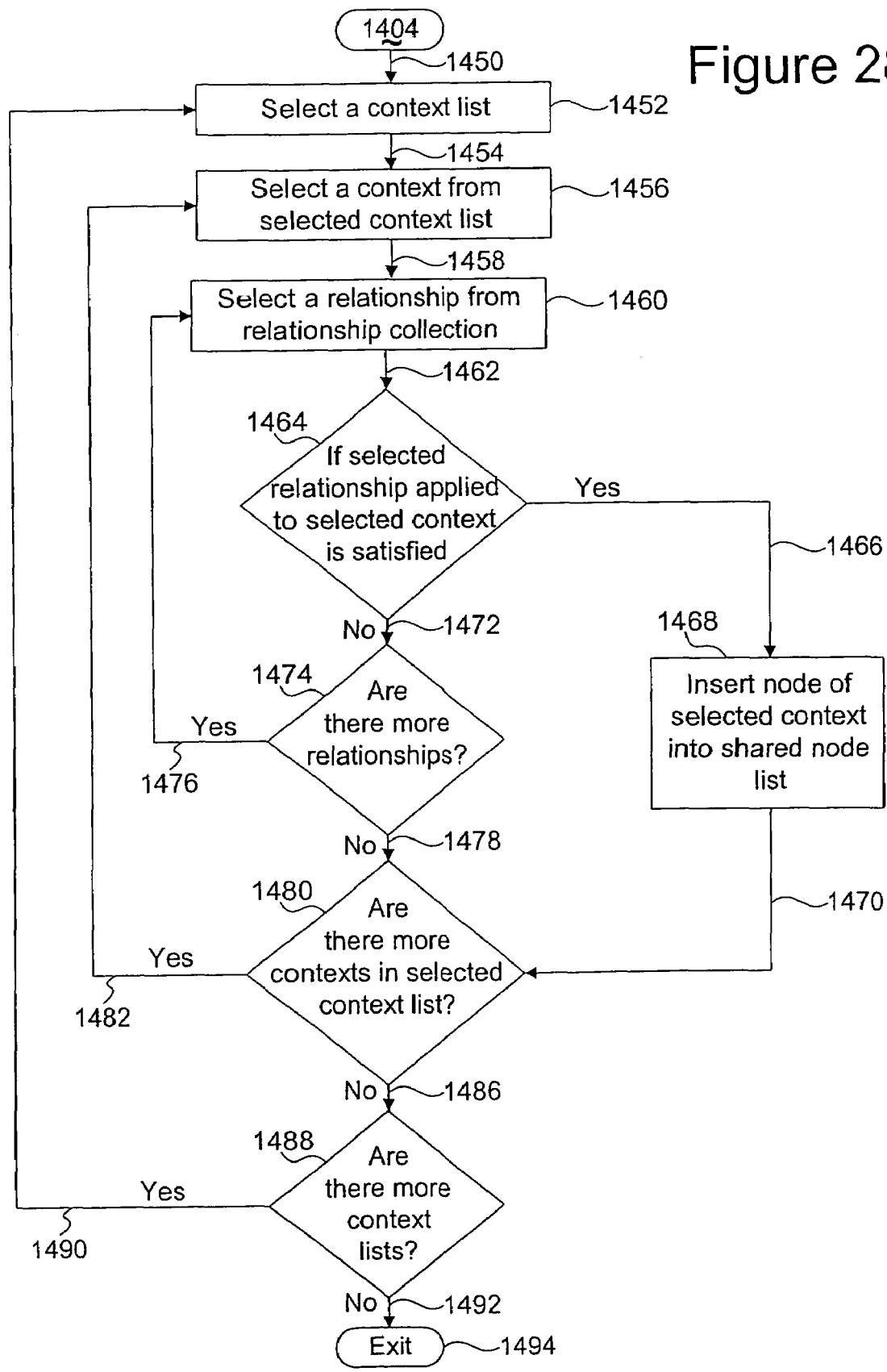
FIG. 28 is a detail flowchart for operation 1404 of the flowchart of FIG. 27 in accordance with an embodiment.

FIG. 28 is a detail flowchart for operation 1404 of the flowchart of FIG. 27 in accordance with an embodiment. Operation 1404 starts by allocating systems resources in certain embodiments. Arrow 1450 designates the flow of execution from operation 1404 to operation 1452. Operation 1452 selects a context list from a plurality of context lists. Arrow 1454 designates the flow of execution from operation 1452 to operation 1456. Operation 1456 selects a context from the selected context list. Arrow 1458 designates the flow of execution from operation 1456 to operation 1460. Operation 1460 selects a relationship from the relationship collection. Arrow 1462 designates the flow of execution from operation 1460 to operation 1464.

Operation 1464 determines if the selected relationship, when applied to the selected context, is satisfied. Arrow 1466 designates the flow of execution from operation 1464 to operation 1468, when the selected relationship when applied to the selected context is satisfied. Operation 1468 inserts the node of the selected context into the shared node list. Arrow 1470 designates the flow of execution from operation 1468 to operation 1484. Arrow 1472 designates the flow of execution from operation 1464 to operation 1474, when the selected relationship when applied to the selected context is not satisfied.

Operation 1474 determines whether there are more relationships in the relationship collection. Arrow 1478 designates the flow of execution from operation 1474 to operation 1480, when there are no more relationships in the relationship collection. Arrow 1476 designates the flow of execution from operation 1474 to operation 1460, when there are more relationships in the relationship collection.

Operation 1484 determines whether there are more context lists. Operation 1480 determines whether there are more contexts in the selected context list. Arrow 1482 designates the flow of execution from operation 1480 to operation 1456. Arrow 1486 designates the flow of execution from operation 1484 to operation 1488. Arrow 1490 designates the flow of execution from operation 1488 to operation 1452. Arrow 1492 designates the flow of execution from operation 1488 to operation 1494. Operation 1494 exits the operations of this flowchart.

The overall effect of this flowchart is to describe a process where if one relationship is satisfied by a context, the node of that context is inserted into the shared node list. This activity is performed across all contexts of all context lists. It is shown illustratively as a sequential process acting upon one selected relationship and one selected context within the selected context list. This is done strictly for illustrative purposes and is not meant to limit the concurrency of the execution process of the relevant operations.

Operation 1404 further starts by initializing the shared node list in certain embodiments. In certain alternative embodiments, operation 1404 further starts configuring the shared node list to be extended. Operation 1404 further starts by signaling other potentially concurrent processes which might perform maintenance upon the context list and relationship collection, that they are in use and not available for maintenance activities which might alter the results of this flowchart, in certain embodiments.

Operation 1452 selects a context list from a plurality of context lists. After the first iteration of operation 1452 within the execution of this flowchart, the selection chooses context lists not previously selected, in certain embodiments.

Operation 1456 selects a context from the selected context list. After the first iteration of operation 1456 within the execution of this flowchart, the selection chooses contexts not previously selected, in certain embodiments.

Operation 1460 selects a relationship from the relationship collection. After the first iteration of operation 1460 within the execution of this flowchart, the selection chooses relationships not previously selected, in certain embodiments.

Operation 1494 further signals other potentially concurrent processes which might perform maintenance upon the context list and relationship collection, that they are no longer in use and are available for maintenance activities which might alter the results of this flowchart, in certain embodiments. Operation 1494 may further release systems resources allocated at the start of operation 1404 in certain embodiments.

This flowchart may be sequentially performed in certain embodiments in essentially the order represented by this flowchart. In certain alternative embodiments, the application of a relationship may be performed first across all contexts of each context list, before a second relationship is applied across all contexts of each context list.

This flowchart may have concurrent operations performed in certain embodiments, such as the application of a relationship to more than one context in parallel. Operation 1456 would select more than one context from the selected context list. Operation 1464 would apply the selected relationship to the multiplicity of selected contexts concurrently in certain further embodiments. Alternatively, the selection of contexts may act to load a cache memory, while the application of the selected relationship may be performed concurrently in a sequential manner upon the preloaded contexts.

Figure 29:
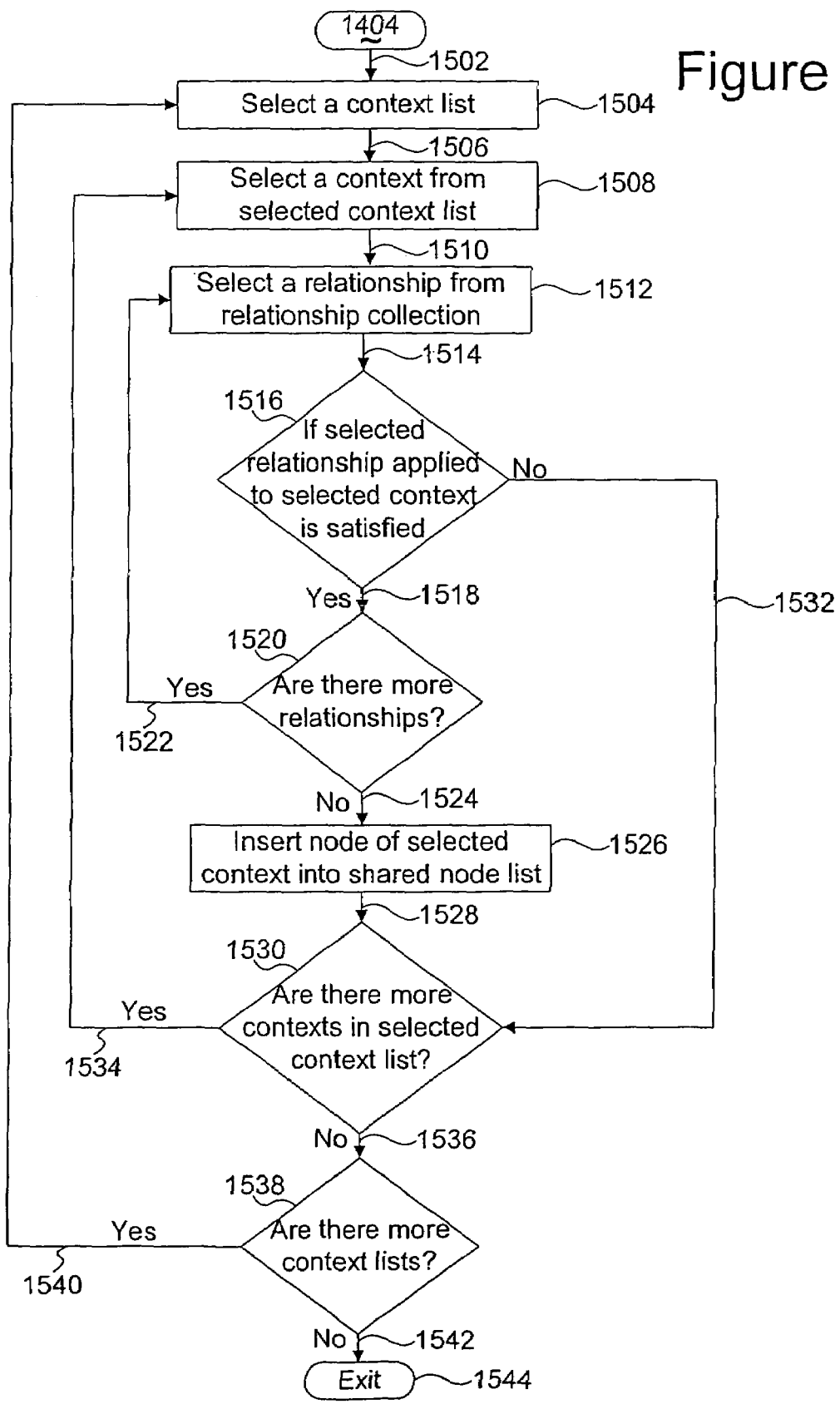
FIG. 29 is a detail flowchart for operation 1404 of the flowchart of FIG. 27 in accordance with an alternative embodiment.

FIG. 29 is a detail flowchart for operation 1404 of the flowchart of FIG. 27 in accordance with an alternative embodiment. Operation 1404 starts by allocating systems resources in certain embodiments. Arrow 1502 designates the flow of execution from operation 1404 to operation 1504. Operation 1504 selects a context list from a plurality of context lists. Arrow 1506 designates the flow of execution from operation 1504 to operation 1508. Operation 1508 selects a context from the selected context list. Arrow 1510 designates the flow of execution from operation 1508 to operation 1512. Operation 1512 selects a relationship from the relationship collection. Arrow 1514 designates the flow of execution from operation 1512 to operation 1516.

Operation 1516 determines if the selected relationship, when applied to the selected context is satisfied. Arrow 1518 designates the flow of execution from operation 1516 to operation 1520, when the selected relationship applied to the selected context is satisfied. Arrow 1532 designates the flow of execution from operation 1516 to operation 1530, when the selected relationship applied to the selected context is not satisfied.

Operation 1520 determines if there are more unselected relationships for the selected context of the selected context list. Arrow 1522 designates the flow of execution from operation 1520 to operation 1512, when there are more unselected relationships. Arrow 1524 designates the flow of execution from operation 1520 to operation 1526, when there are no more unselected relationships.

Operation 1526 inserts the node of the selected context into the shared node list. Arrow 1528 designates the flow of execution from operation 1526 to operation 1530. Operation 1530 determines whether there are more unselected context lists. Operation 1530 determines whether there are more unselected relationships in the relationship collection. Arrow 1534 designates the flow of execution from operation 1530 to operation 1508, when there are more unselected relationships. Arrow 1536 designates the flow of execution from operation 1530 to operation 1538, when there are no more unselected relationships.

Operation 1538 determines whether there are more unselected contexts in the selected context list. Arrow 1540 designates the flow of execution from operation 1538 to operation 1504, when there are more unselected contexts in the selected context list. Arrow 1542 designates the flow of execution from operation 1538 to operation 1544 when there are no more unselected contexts in the selected context list. Operation 1544 exits the operations of this flowchart.

The overall effect of this flowchart is to describe a process where if all relationships are satisfied by a context, the node of that context is inserted into the shared node list.

Operation 1404 further starts by initializing the shared node list in certain embodiments. In certain alternative embodiments, operation 1404 further starts configuring the shared node list to be extended. Operation 1404 further starts by signaling other potentially concurrent processes which might perform maintenance upon the context list and relationship collection, that they are in use and not available for maintenance activities which might alter the results of this flowchart, in certain embodiments.

Operation 1504 selects a context list from a plurality of context lists. After the first iteration of operation 1504 within the execution of this flowchart, the selection chooses context lists not previously selected, in certain embodiments.

Operation 1508 selects a context from the selected context list. After the first iteration of operation 1508 within the execution of this flowchart, the selection chooses contexts not previously selected, in certain embodiments.

Operation 1512 selects a relationship from the relationship collection. After the first iteration of operation 1512 within the execution of this flowchart, the selection chooses relationships not previously selected, in certain embodiments.

Operation 1544 further signals other potentially concurrent processes which might perform maintenance upon the context list and relationship collection, that they are no longer in use and are available for maintenance activities which might alter the results of this flowchart, in certain embodiments. Operation 1544 may further release systems resources allocated at the start of operation 1404 in certain embodiments.

This flowchart may be sequentially performed in certain embodiments in essentially the order represented by this flowchart. In certain alternative embodiments, the application of a relationship may be performed first across all contexts of each context list, before a second relationship is applied across all contexts of each context list.

This flowchart may have concurrent operations performed in certain embodiments, such as the application of a relationship to more than one context in parallel. Operation 1508 would select more than one context from the selected context list. Operation 1516 would apply the selected relationship to the multiplicity of selected contexts concurrently in certain further embodiments. Alternatively, the selection of contexts may act to load a cache memory, while the application of the selected relationship may be performed concurrently in a sequential manner upon the preloaded contexts.

Figure 30:
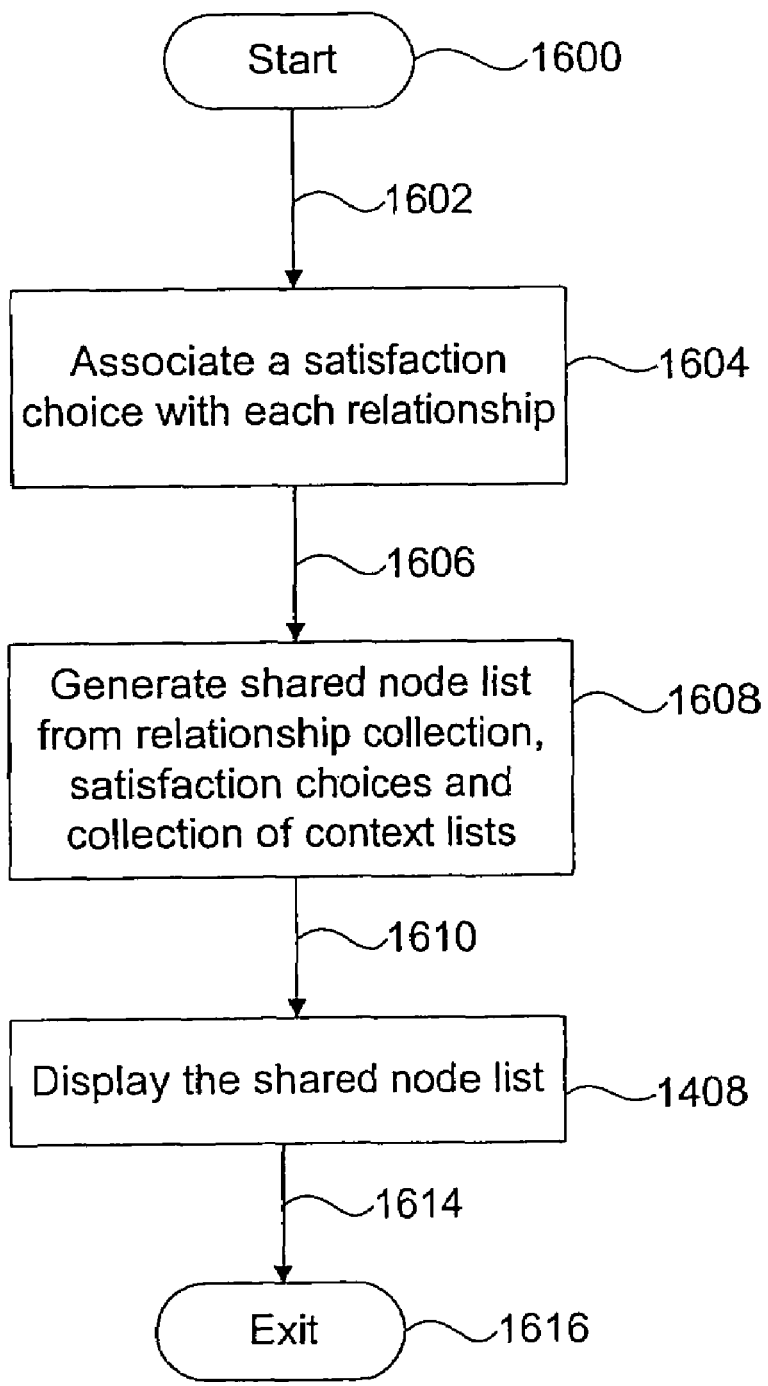
FIG. 30 is a flowchart for processing the generation of a shared node list and display of the shared node list in accordance with an embodiment.

FIG. 30 is a flowchart for processing the generation of a shared node list and display of the shared node list in accordance with an embodiment. Operation 1600 starts the operations of this flowchart. Arrow 1602 designates the flow of execution from operation 1600 to operation 1604. Operation 1604 associates a satisfaction choice with each relationship. Arrow 1606 designates the flow of execution from operation 1604 to operation 1608. Operation 1608 generates a shared node list from the relationship collection and collection of context lists. Arrow 1610 designates the flow of execution from operation 1608 to operation 1612. Operation 1612 displays the shared node list. Arrow 1614 designates the flow of execution from operation 1612 to operation 1616. Operation 1616 exits the operations of this flowchart.

Operation 1600 starts the operations of this flowchart. In certain embodiments, operation 1600 initializes the shared node list. In certain alternative embodiments, operation 1600 configures the shared node list to accept additional nodes. In certain embodiments, operation 1600 signals other processes performing tasks which may include but are not limited to maintenance operations upon the context lists and relationship collection, that these entities are in use, stalling such operations from being performed. In certain embodiments, this operation allocates temporarily system resources used by the operations of this flowchart.

Operation 1604 associates a satisfaction choice with each relationship. In certain embodiments, operation 1604 associates a default choice as the satisfaction choice with each relationship. In certain embodiments, operation 1604 interacts with other elements of the system to associate the satisfaction choice. In certain further embodiments, operation 1604 interacts with a user to determine the satisfaction choice with at least one relationship. In certain other further embodiments, operation 1604 interacts with a software agent to determine the satisfaction choice with at least one relationship.

Operation 1608 generates a shared node list from the relationship collection and collection of context lists. Operation 1608 will be discussed in greater detail in the flowcharts of FIGS. 31, 32 and 33.

Operation 1408 displays the shared node list. A detailed discussion of this operation can be found above regarding FIG. 27 and in what follows in the discussion of FIGS. 36A, 36B and 37.

Operation 1616 exits the operations of this flowchart. In certain embodiments, operation 1616 releases temporarily allocated system resources used by the operations of this flowchart. In certain embodiments, operation 1616 signals other processes performing tasks which may include but are not limited to maintenance operations upon the context lists and relationship collection, that these entities are no longer in use, allowing such operations to be performed.

Figure 31:
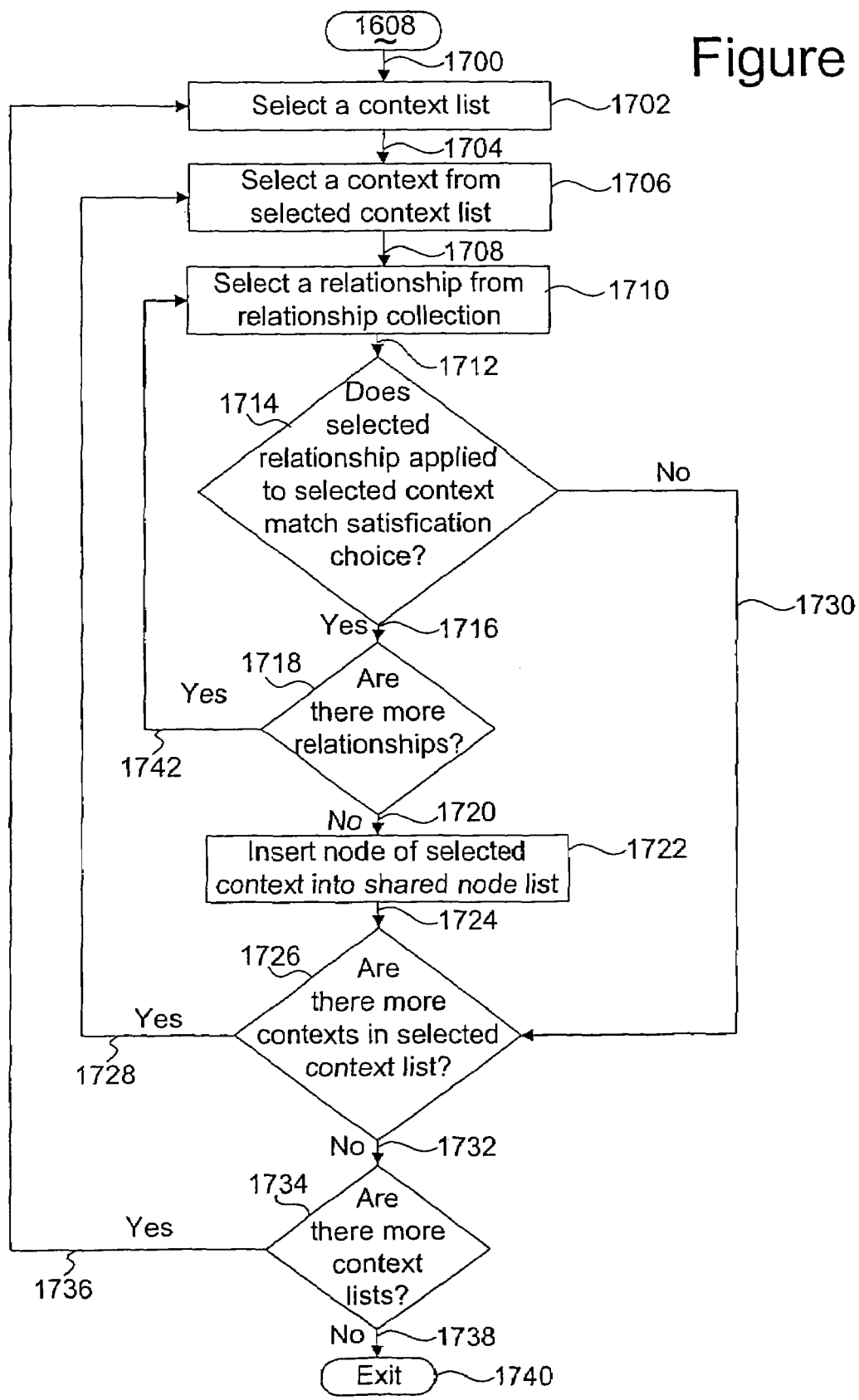
FIG. 31 is a detail flowchart for operation 1608 of the flowchart of FIG. 30 in accordance with an embodiment.

FIG. 31 is a detail flowchart for operation 1608 of the flowchart of FIG. 30 in accordance with an embodiment. Operation 1608 starts the operations of this flowchart, in certain embodiments. Arrow 1700 designates the flow of execution from operation 1608 to operation 1702. Operation 1702 selects a context list. The execution of operation 1702 selects from previously unselected context lists. Arrow 1704 designates the flow of execution from operation 1702 to operation 1706. Operation 1706 selects a context from the selected context list. Execution of operation 1706 is from previously unselected contexts of the selected context list. Arrow 1708 designates the flow of execution from operation 1706 to operation 1710. Operation 1710 selects a relationship from the relationship collection. Execution of operation 1710 is from previously unselected relationships regarding the selected context of the selected context list. Arrow 1712 designates the flow of execution from operation 1710 to operation 1714.

Operation 1714 determines if the selected relationship applied to the selected context matches the satisfaction choice associated with the selected relationship. Arrow 1716 designates the flow of execution from operation 1714 to operation 1718, when the selected relationship, applied to the selected context, matches the satisfaction choice. Arrow 1730 designates the flow of execution from operation 1714 to operation 1726, when the selected relationship, applied to the selected context, does not match the satisfaction choice.

Operation 1718 determines if there are more relationships in the relationship collection. Arrow 1720 designates the flow of execution from operation 1718 to operation 1722, when there no are more relationships may be selected regarding the selected context of the selected context list. Arrow 1742 designates the flow of execution from operation 1718 to operation 1710, when there are more relationships may be selected regarding the selected context of the selected context list.

Operation 1722 inserts the node of the selected context into the shared node list. Arrow 1724 designates the flow of execution from operation 1722 to operation 1726. Operation 1726 determines whether there are more contexts to select in the selected context list. Arrow 1728 designates the flow of execution from operation 1726 to operation 1706, which is taken when there are more contexts to select in the selected context list. Arrow 1732 designates the flow of execution from operation 1726 to operation 1734, which is taken when there are no more contexts to select in the selected context list.

Operation 1734 determines if more context lists may be selected. Arrow 1736 designates the flow of execution from operation 1734 to operation 1702, if more context lists may be selected. Arrow 1738 designates the flow of execution from operation 1734 to operation 1740, if no more context lists may be selected. Operation 1740 exits the operations of this flowchart.

Operation 1608 starts by allocating systems resources used by operations of this flowchart, in certain embodiments. In certain embodiments, operation 1608 initializes the shared node list. In certain alternative embodiments, operation 1608 configures the shared node list to accept additional nodes. In certain embodiments, operation 1608 signals other processes performing tasks which may include but are not limited to maintenance operations upon the context lists and relationship collection, that these entities are in use, stalling such operations from being performed. In certain embodiments, this operation allocates temporarily system resources used by the operations of this flowchart.

Operation 1740 exits the operations of this flowchart. In certain embodiments, operation 1740 releases temporarily allocated system resources used by the operations of this flowchart. In certain embodiments, operation 1740 signals other processes performing tasks which may include but are not limited to maintenance operations upon the context lists and relationship collection, that these entities are no longer in use, allowing such operations from being performed.

This flowchart essentially portrays inserting a node of a context from a context list into the shared node list when the satisfaction of each relationship when applied to the context matches the associated satisfaction choice. In certain embodiments, the operations of this flowchart are sequentially performed in essentially the order represented by this flowchart.

In certain embodiments, certain operations of this flowchart are concurrently performed. In certain embodiments, operation 1706 may act to select more than one context from the selected context list. In certain further embodiments, operation 1706 may act to cache these selected contexts for use by operations 1710, 1714 and 1722.

In certain embodiments, operations 1710, 1714 and 1718 may be performed with regards to multiple relationships concurrently. In such embodiments, if operation 1714 finds any relationship, when applied to a selected context does not match the satisfaction choice of that relationship, the node of the selected context will not be inserted into the shared node list.

In certain embodiments, the relationships may be applied to specific orderings of a context list. Operation 1706 may act to select more than one context from the selected context list.

Operation 1722 inserts the node of the selected context into the shared node list. In certain embodiments, operation 1722 may insert redundant copies of a node into the shared node list. In certain other embodiments, operation 1722 inserts no more than one instance of a node into the shared node list.

Figure 32:
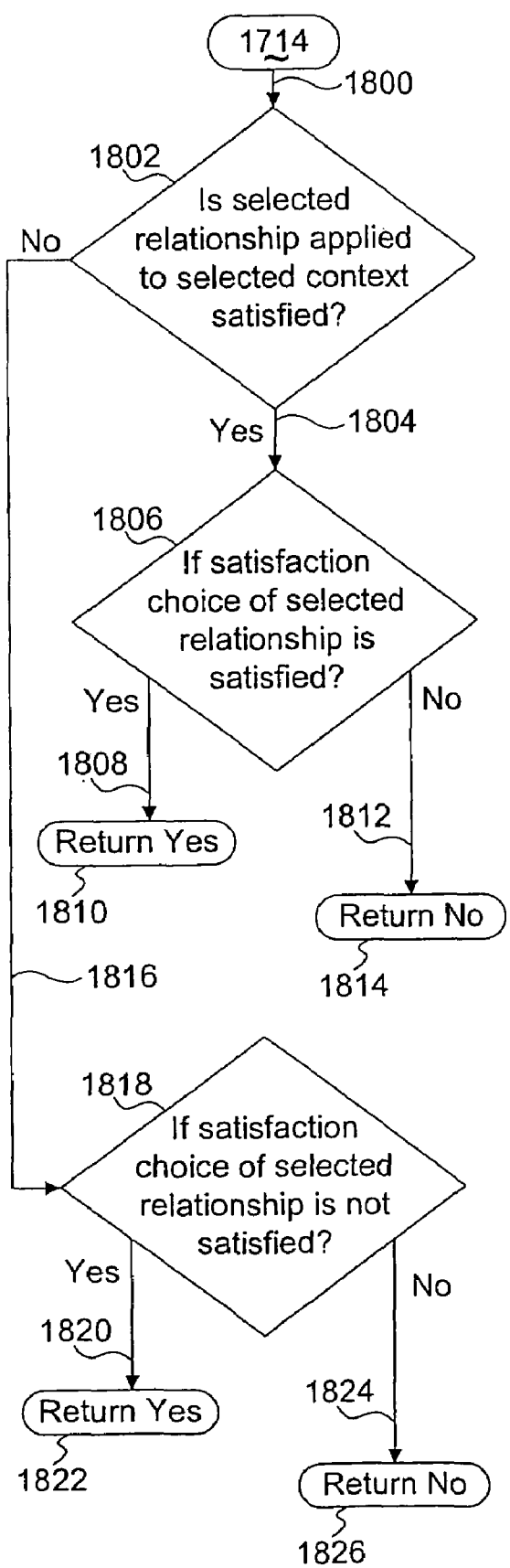
FIG. 32 is a detail flowchart for operation 1714 of FIG. 31 in accordance with an embodiment.

FIG. 32 is a detail flowchart for operation 1714 of FIG. 31 in accordance with an embodiment. Arrow 1800 designates the flow of execution from operation 1714 to operation 1802. Operation 1802 determines if the selected relationship applied to the selected context is satisfied. Arrow 1804 designates the flow of execution from operation 1802 to operation 1806, when the selected relationship applied to the selected context is satisfied. Arrow 1816 designates the flow of execution from operation 1802 to operation 1818, when the selected relationship applied to the selected context is not satisfied.

Operation 1806 determines if the satisfaction choice of the selected relationship is satisfied. Arrow 1808 designates the flow of execution from operation 1806 to operation 1810, when the satisfaction choice of the selected relationship is satisfied. Arrow 1812 designates the flow of execution from operation 1806 to operation 1814, when the satisfaction choice of the selected relationship is not satisfied.

Operation 1818 determines if the satisfaction choice of the selected relationship is not satisfied. Arrow 1820 designates the flow of execution from operation 1818 to operation 1822, when the satisfaction choice of the selected relationship is not satisfied. Arrow 1824 designates the flow of execution from operation 1818 to operation 1826, when the satisfaction choice of the selected relationship is satisfied.

In certain embodiments, satisfaction is represented as a boolean value, often denoted as a member of the collection of 0 and 1. An alternative representation is as a member of the collection of false and true. As a boolean representation, it may be encoded as a bit of a digitally represented number, which may facilitate performance of parallel or concurrent operations upon more than one relationship in single computer instruction, in certain embodiments. Note that this approach can bee seen as comparison of two numbers, one containing bits corresponding to the results of applying relationships to the same context, and the other number whose corresponding bits are the associated satisfaction choices. The operations of this flowchart return Yes if the two numbers exactly identical and No otherwise.

In certain other embodiments boolean representations of multiple context satisfactions may be represented in a single digitally represented number, which may facilitate performance of parallel or concurrent operations in multiple contexts by the same relationship.

Figure 33:
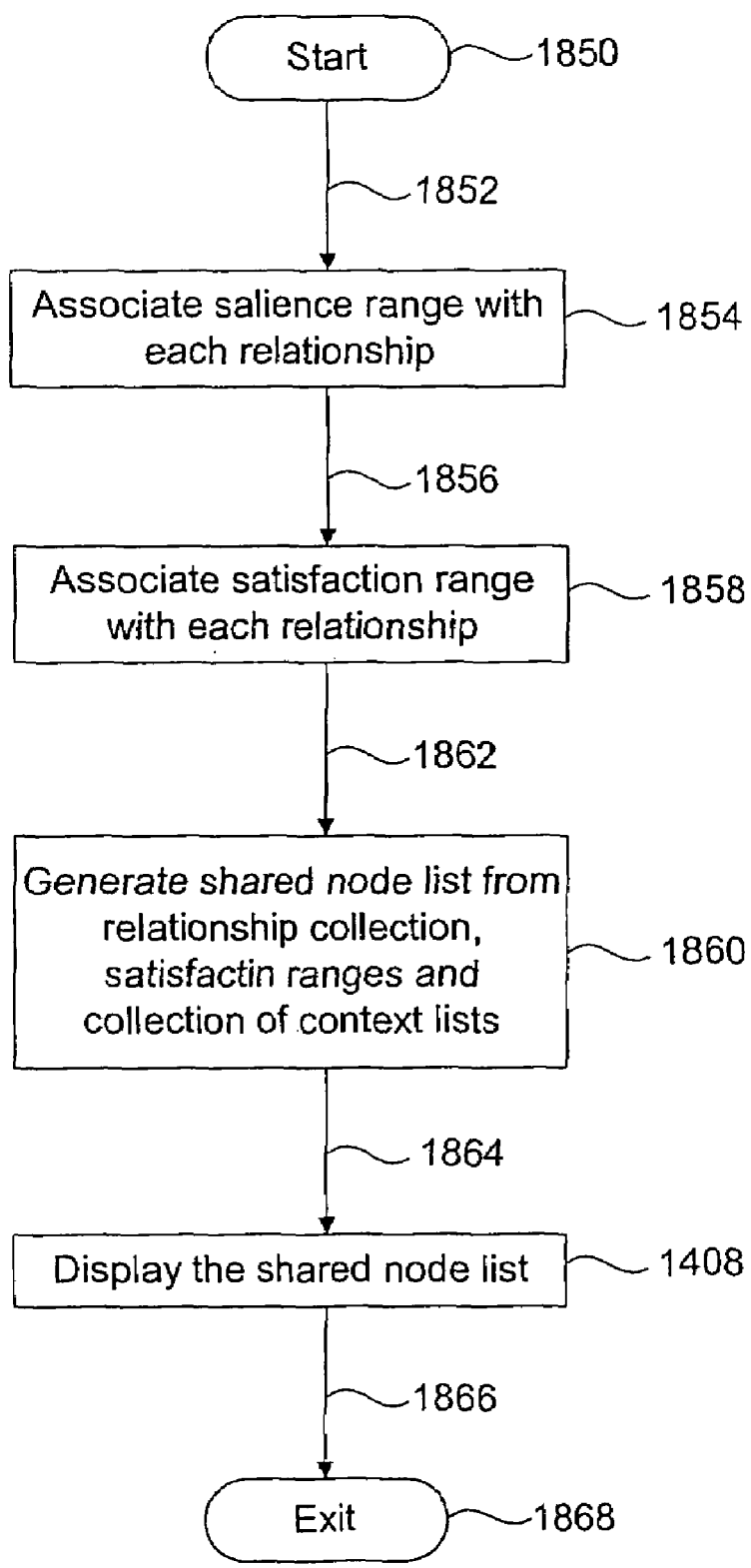
FIG. 33 is a flowchart for processing the generation of a shared node list and display of the shared node list with in accordance with an embodiment.

FIG. 33 is a flowchart for processing the generation of a shared node list and display of the shared node list with in accordance with an embodiment. Operation 1850 starts the operations of this flowchart. Arrow 1852 designates the flow of execution from operation 1850 to operation 1854. Operation 1854 associates a salience range with each relationship. Arrow 1856 designates the flow of execution from operation 1854 to operation 1858. Operation 1858 associates a satisfaction range with each relationship. Arrow 1862 designates the flow of execution from operation 1858 to operation 1860. Operation 1862 generates a shared node list from the relationship collection, satisfaction ranges and collection of context lists. Arrow 1864 designates the flow of execution from operation 1862 to operation 1408. Operation 1408 displays the shared node list. Arrow 1866 designates the flow of execution from operation 1408 to operation 1868. Operation 1868 exits the operations of this flowchart.

Operation 1850 starts the operations of this flowchart. In certain embodiments, operation 1850 initializes the shared node list. In certain alternative embodiments, operation 1850 configures the shared node list to accept additional nodes. In certain embodiments, operation 1850 signals other processes performing tasks which may include but are not limited to maintenance operations upon the context lists and relationship collection, that these entities are in use, stalling such operations from being performed. In certain embodiments, this operation allocates temporarily system resources used by the operations of this flowchart. In certain further embodiments, the relationship collection is modified to incorporate an associated salience range.

Operation 1854 associates a salience range with each relationship. In some embodiments, a salience range of a relationship includes a collection of numbers. In some further embodiments, the salience range of a relationship includes a numeric range. In some further embodiments, the salience range of a relationship includes the numbers 0 and 1. In some further embodiments, the salience range of a relationship includes a numeric range including 0 and 1. In some further embodiments, the salience range of a relationship includes a numeric range of percentages. Operation 1854 may associate differing salience ranges to different relationships within the same relationship collection. By way of example, one salience range may be the count of the number of times a character string has been found in a document file. In certain embodiments, operation 1854 acts to associate a salience range with newly included relationships of the relationship collection.

Operation 1858 associates a satisfaction range with each relationship. In certain embodiments, the satisfaction range does not overlap the salience range associated with a relationship. In certain alternative embodiments, the satisfaction range overlaps the salience range associated with a relationship. In certain further embodiments, the satisfaction range is contained in the salience range associated with a relationship. In certain further embodiments, the satisfaction range is the salience range associated with a relationship. In certain embodiments, the satisfaction range is set to the salience range by default, and modified when requested to a different range.

Operation 1860 generates a shared node list from the relationship collection, satisfaction ranges and collection of context lists. Operation 1860 will be discussed in greater detail in the discussions regarding the flowcharts of FIGS. 34 and 35.

Operation 1408 displays the shared node list. A detailed discussion of this operation can be found above regarding FIG. 27 and in what follows in the discussion of FIGS. 36A, 36B and 37.

Operation 1868 exits the operations of this flowchart. In certain embodiments, operation 1868 releases temporarily allocated system resources used by the operations of this flowchart. In certain embodiments, operation 1868 signals other processes performing tasks which may include but are not limited to maintenance operations upon the context lists and relationship collection, that these entities are no longer in use, allowing such operations to be performed. In certain embodiments, operation 1868 modifies the relationship collection to remove an associated salience range.

In certain embodiments, the operations of this flowchart are sequentially performed. In certain embodiments, the operations of this flowchart are all performed locally to one system. In certain embodiments, the operations of this flowchart are performed across a network incorporating more than one system. In certain further embodiments, operations 1854, 1858 and 1408 involve interactions on one local system and operation 1860 involves actions on an external system. In certain further embodiments, operations 1854, 1858 and 1408 involve interactions with one or more users. In certain other, further embodiments, operations 1854, 1858 and 1408 involve interactions with one or more software agents.

FIG. 34 is a detail flowchart for operation 1860 of FIG. 33 in accordance with an embodiment. Operation 1860 starts the operations of this flowchart. Arrow 1900 designates the flow of execution from starting operation 1860 to operation 1902. Operation 1902 selects a context list. Arrow 1904 designates the flow of execution from operation 1902 to operation 1906. Operation 1906 selects a context from the selected context list. Arrow 1908 designates the flow of execution from operation 1906 to operation 1910. Operation 1910 selects a relationship from the relationship collection. Arrow 1912 designates the flow of execution from operation 1910 to operation 1914.

Operation 1914 determines if the selected relationship applied to the selected context is within the relationship satisfaction range. Arrow 1916 designates the flow of execution from operation 1914 to operation 1918, when the selected relationship applied to the selected context is not within the relationship satisfaction range. Arrow 1924 designates the flow of execution from operation 1914 to operation 1926, when the selected relationship applied to the selected context is within the relationship satisfaction range. Operation 1926 inserts the node of the selected context into the shared node list. Arrow 1928 designates the flow of execution from operation 1926 to operation 1922.

Operation 1918 determines whether there are relationships as yet not selected regarding the selected context of the selected context list. Arrow 1920 designates the flow of execution from operation 1918 to operation 1922, when there are no relationships as yet unselected regarding the selected context of the selected context list. Arrow 1942 designates the flow of execution from operation 1918 to operation 1910, when there are no yet unselected relationships regarding the selected context of the selected context list.

Operation 1922 determines whether there are more contexts in the selected context list as yet unselected. Arrow 1932 designates the flow of execution from operation 1922 to operation 1934, when there are no remaining unselected contexts in the selected context list. Arrow 1930 designates the flow of execution from operation 1922 to operation 1906, when there are remaining unselected contexts in the selected context list.

Operation 1934 determines whether there are more unselected context lists. Arrow 1938 designates the flow of execution from operation 1934 to operation 1940, when there are no more unselected context lists. Arrow 1936 designates the flow of execution from operation 1934 to operation 1902, when there are more unselected context lists. Operation 1940 exits the operations of this flowchart.

Operation 1860 starts the operations of this flowchart. In certain embodiments, starting operation 1860 initializes the shared node list. In certain embodiments, starting operation 1860 signals other processes performing tasks, which may include but are not limited to maintenance operations upon the context lists and relationship collection, that these entities are in use, stalling such operations from being performed. In certain embodiments, starting operation 1860 allocates temporarily system resources used by the operations of this flowchart.

Operation 1940 exits the operations of this flowchart. In certain embodiments, starting operation 1940 signals other processes performing tasks, which may include but are not limited to maintenance operations upon the context lists and relationship collection, that these entities are in no longer use, allowing such operations to be performed. In certain embodiments, starting operation 1940 releases temporarily allocated system resources used by the operations of this flowchart.

The effect of the operations of this flowchart is that if the salience of a relationship applied to a context of a context list is within the satisfaction range of the relationship, then the node of the context is inserted into the shared node list. This activity is performed across all contexts of all context lists. It is shown illustratively as a sequential process acting upon one selected relationship and one selected context within the selected context list. This is done strictly for illustrative purposes and is not meant to limit the concurrency of the execution process of the relevant operations.

Operation 1902 selects a context list from a plurality of context lists. After the first iteration of operation 1902 within the execution of this flowchart, the selection chooses context lists not previously selected, in certain embodiments.

Operation 1906 selects a context from the selected context list. After the first iteration of operation 1906 within the execution of this flowchart, the selection chooses contexts not previously selected, in certain embodiments.

Operation 1910 selects a relationship from the relationship collection. After the first iteration of operation 1910 within the execution of this flowchart, the selection chooses relationships not previously selected, in certain embodiments.

Operation 1940 further signals other potentially concurrent processes which might perform maintenance upon the context list and relationship collection, that they are no longer in use and are available for maintenance activities which might alter the results of this flowchart, in certain embodiments. Operation 1940 may further release systems resources allocated at the start of operation 1860 in certain embodiments.

This flowchart may have concurrent operations performed in certain embodiments, such as the application of a relationship to more than one context in parallel. Operation 1906 would select more than one context from the selected context list. Operation 1914 would apply the selected relationship to the multiplicity of selected contexts concurrently in certain further embodiments. Alternatively, the selection of contexts may act to load a cache memory, while the application of the selected relationship may be performed concurrently in a sequential manner upon the preloaded contexts.

This flowchart may be sequentially performed in certain embodiments in essentially the order represented by this flowchart. In certain alternative embodiments, the application of a relationship may be performed first across all contexts of each context list, before a second relationship is applied across all contexts of each context list.

FIG. 35 is a detail flowchart for operation 1860 of FIG. 33 in accordance with an alternative embodiment.

Operation 1860 starts by allocating systems resources in certain embodiments. Arrow 2000 designates the flow of execution from operation 1860 to operation 2002. Operation 2002 selects a context list from a plurality of context lists. Arrow 2004 designates the flow of execution from operation 2002 to operation 2006. Operation 2006 selects a context from the selected context list. Arrow 2008 designates the flow of execution from operation 2006 to operation 2010. Operation 2010 selects a relationship from the relationship collection. Arrow 2012 designates the flow of execution from operation 2010 to operation 2014.

Operation 2014 determines if the selected relationship, when applied to the selected context has salience within the satisfaction range associated with the relationship. Arrow 2016 designates the flow of execution from operation 2014 to operation 2018, when the selected relationship applied to the selected context has salience within the associated satisfaction range. Arrow 2032 designates the flow of execution from operation 2014 to operation 2028, when the selected relationship applied to the selected context has salience not within the associated satisfaction range.

Operation 2018 determines if there are more unselected relationships for the selected context of the selected context list. Arrow 2020 designates the flow of execution from operation 2018 to operation 2010, when there are more unselected relationships. Arrow 2022 designates the flow of execution from operation 2018 to operation 2024, when there are no more unselected relationships.

Operation 2024 inserts the node of the selected context into the shared node list. Arrow 2026 designates the flow of execution from operation 2024 to operation 2028. Operation 2028 determines whether there are more unselected context lists. Operation 2028 determines whether there are more unselected relationships in the relationship collection. Arrow 2030 designates the flow of execution from operation 2028 to operation 2006, when there are more unselected relationships. Arrow 2034 designates the flow of execution from operation 2028 to operation 2036, when there are no more unselected relationships.

Operation 2036 determines whether there are more unselected contexts in the selected context list. Arrow 2038 designates the flow of execution from operation 2036 to operation 2002, when there are more unselected contexts in the selected context list. Arrow 2040 designates the flow of execution from operation 2036 to operation 2042 when there are no more unselected contexts in the selected context list. Operation 2042 exits the operations of this flowchart.

The overall effect of this flowchart is to describe a process where if all relationships are satisfied by a context, the node of that context is inserted into the shared node list.

Operation 1860 further starts by initializing the shared node list in certain embodiments. In certain alternative embodiments, operation 1860 further starts configuring the shared node list to be extended. Operation 1860 further starts by signaling other potentially concurrent processes which might perform maintenance upon the context list and relationship collection, that they are in use and not available for maintenance activities which might alter the results of this flowchart, in certain embodiments.

Operation 2002 selects a context list from a plurality of context lists. After the first iteration of operation 2002 within the execution of this flowchart, the selection chooses context lists not previously selected, in certain embodiments.

Operation 2006 selects a context from the selected context list. After the first iteration of operation 2006 within the execution of this flowchart, the selection chooses contexts not previously selected, in certain embodiments.

Operation 2010 selects a relationship from the relationship collection. After the first iteration of operation 2010 within the execution of this flowchart, the selection chooses relationships not previously selected, in certain embodiments.

Operation 2042 further signals other potentially concurrent processes which might perform maintenance upon the context list and relationship collection, that they are no longer in use and are available for maintenance activities which might alter the results of this flowchart, in certain embodiments. Operation 2042 may further release systems resources allocated at the start of operation 1860 in certain embodiments.

This flowchart may be sequentially performed in certain embodiments in essentially the order represented by this flowchart. In certain alternative embodiments, the application of a relationship may be performed first across all contexts of each context list, before a second relationship is applied across all contexts of each context list.

This flowchart may have concurrent operations performed in certain embodiments, such as the application of a relationship to more than one context in parallel. Operation 2006 would select more than one context from the selected context list. Operation 2014 would apply the selected relationship to the multiplicity of selected contexts concurrently in certain further embodiments. Alternatively, the selection of contexts may act to load a cache memory, while the application of the selected relationship may be performed concurrently in a sequential manner upon the preloaded contexts.

Figure 36A:
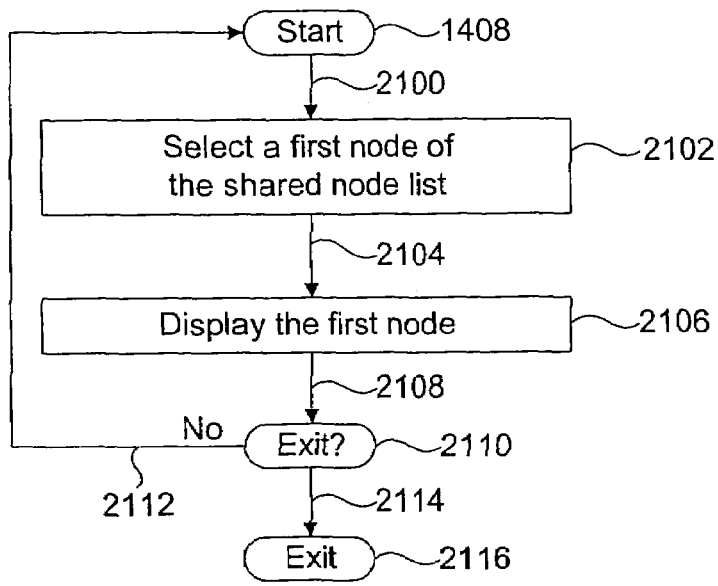
FIG. 36A is a detail flowchart for operation 1408 of FIGS. 27, 30 and 33 in accordance with an embodiment.

FIG. 36A is a detail flowchart for operation 1408 of FIGS. 27, 30 and 33 in accordance with an embodiment.

Operation 1408 starts by allocating systems resources in certain embodiments. Arrow 2100 designates the flow of execution from operation 1408 to operation 2102. Operation 2102 selects a first node of the shared node list. Arrow 2104 designates the flow of execution from operation 2102 to operation 2106. Operation 2106 displays the first node. Arrow 2108 designates the flow of execution from operation 2106 to operation 2110.

Operation 2110 determines whether to exit the operations of this flowchart. Arrow 2112 designates the flow of execution from operation 2110 to operation 2102, when the determination is made not to exit the operations of this flowchart. Arrow 2114 designates the flow of execution from operation 2110 to operation 2116 when the determination is made to exit the operations of this flowchart. Operation 2116 exits the operations of this flowchart.

In certain embodiments, a node belonging to the shared list may be selected more than once as the iterative performance of operation 2102 progresses through time. In certain embodiments, the selection of a first node in operation 2102 is driven by software providing a script by which various nodes are displayed from the shared node list. In certain embodiments, the selection of a first node involves interaction with an external agent to the computer executing this process. In certain further embodiments, the external agent is a user. In certain other, further embodiments, the external agent is a software agent.

Figure 36B:
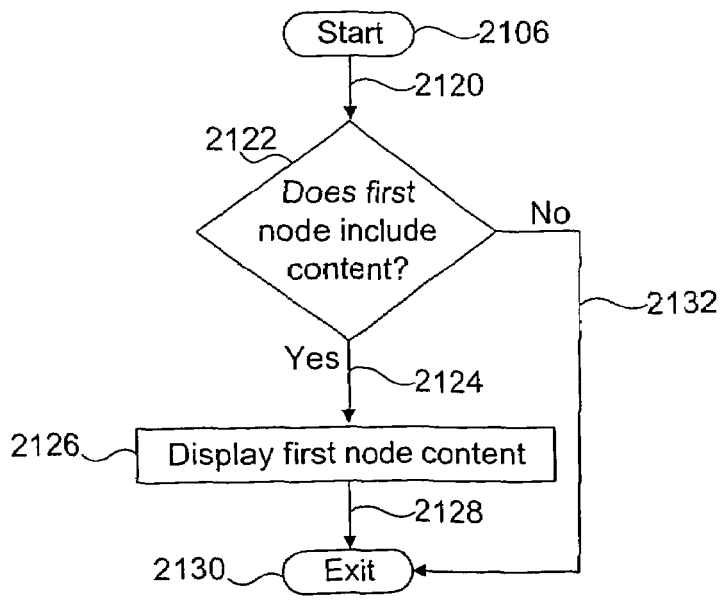
FIG. 36B is a detail flowchart for operation 2106 of FIG. 36A in accordance with an embodiment.

FIG. 36B is a detail flowchart for operation 2106 of FIG. 36A in accordance with an embodiment.

Operation 2106 starts by allocating systems resources in certain embodiments. Arrow 2120 designates the flow of execution from operation 2106 to operation 2122. Operation 2122 determines whether the first node includes content. Arrow 2124 designates the flow of execution from operation 2122 to operation 2126, when the first node includes content. Arrow 2132 designates the flow of execution from operation 2122 to operation 2130 when the first node does not include content.

Operation 2126 displays the first node content. Arrow 2128 designates the flow of execution from operation 2126 to operation 2130. Operation 2130 exits the operations of this flowchart.

FIG. 37 is a detail flowchart for operation 2136 of FIG. 36B in accordance with an embodiment. Operation 2126 starts operations of this flowchart. Arrow 2200 designates the flow of execution from starting operation 2126 to arrow 2202 and to arrow 2204. Arrows 2202 and 2204 designate potentially concurrent activation of operations involving the audio and image content of the first node. Arrow 2200 combined with arrow 2202 designates the flow of execution from starting operation 2126 to operation 2206. Arrow 2200 combined with arrow 2204 designates the flow of execution from starting operation 2126 to operation 2218.

Operation 2206 determines whether the first node includes audio content. Arrow 2208 designates the flow of execution from operation 2206 to operation 2210, when the first node includes audio content. Arrow 2216 designates the flow of execution from operation 2206 to operation 2214 when the first node does not includes audio content. Operation 2210 displays the first node audio content. Arrow 2212 designates the flow of execution from operation 2210 to operation 2214. Operation 2214 effects an exit from the audio operations of this flowchart.

Operation 2218 determines whether the first node includes visual content. Arrow 2220 designates the flow of execution from operation 2218 to arrow 2222 and to arrow 2224, when whether the first node includes visual content. Arrows 2222 and 2224 designate potentially concurrent activation of operations involving the still image content and the motion video content of the first node. Arrow 2250 designates the flow of execution from operation 2218 to operation 2242 when whether the first node includes visual content. Arrow 2220 combined with arrow 2222 designates the flow of execution from operation 2118 to operation 2226. Arrow 2220 combined with arrow 2224 designates the flow of execution from operation 2118 to operation 2238.

Operation 2226 determines whether the first node includes still image content. Arrow 2228 designates the flow of execution from operation 2226 to operation 2230, when the first node includes still image content. Arrow 2234 designates the flow of execution from operation 2226 to operation 2242 via arrow 2236 when the first node does not include still image content.

Operation 2238 determines whether the first node includes motion video content. Arrow 2228 designates the flow of execution from operation 2238 to operation 2230, when whether the first node includes motion video content. Arrow 2240 designates the flow of execution from operation 2238 to operation 2242 via arrow 2236 when whether the first node includes motion video content.

In certain embodiments, concurrent activity in operations 2210, 2230 and 2246 may include an audio sequence, still images and motion video sequence integrated into form a single experience intended as the content of the first node. In certain embodiments, integration of audio, still image and motion video requires synchronization between operations 2210, 2230 and 2246, as will be apparent to one of ordinary skill in the art. This flowchart leaves silent these issues, which are performed via standard system functions inherent in such embodiments.

In certain embodiments, the audio and motion video sequence may be stored in a combined audio-video stream implemented as some form of MPEG. The separation of such streams and the independent processing of the audio and video stream are not the subject of this invention and are well known to one of ordinary skill in the art.

In certain embodiments, the audio content may consist of more than one audio voice, which operation 2210 mixes to create the displayed audio content.

Figure 38:
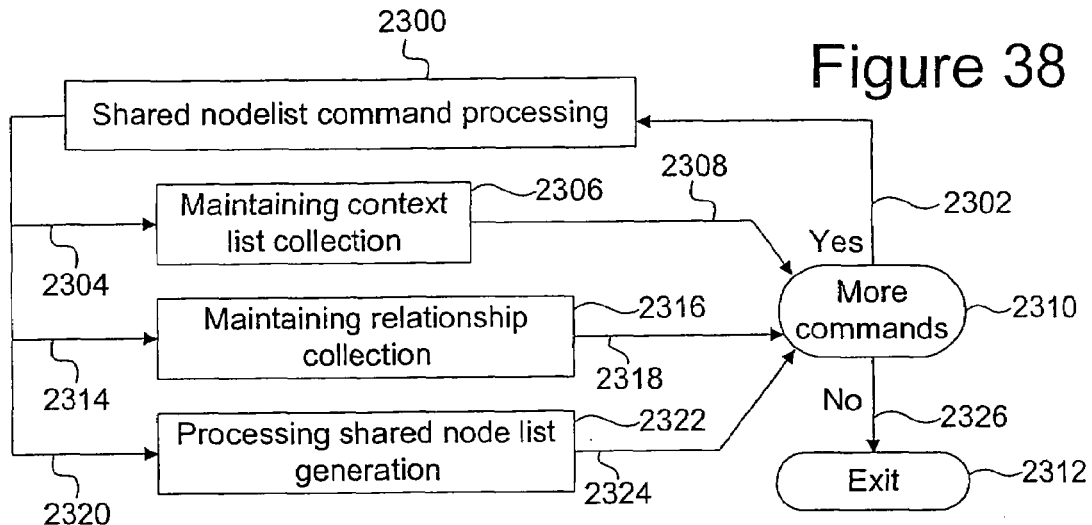
FIG. 38 is a flowchart of command processing for a system in accordance with an embodiment.

FIG. 38 is a flowchart of command processing for a system in accordance with an embodiment. Starting operation 2300 performs the initial shared node list command processing.

Arrow 2304 designates the flow of execution and communication from starting operation 2300 to operation 2306 to process requests regarding maintaining the context list collection. Operation 2306 maintains the context list collection. Arrow 2308 designates the flow of execution from operation 2306 to operation 2310.

Arrow 2314 designates the flow of execution and communication from starting operation 2300 to operation 2316 to process requests regarding maintaining the relationship collection. Operation 2316 maintains the relationship collection. Arrow 2318 designates the flow of execution from operation 2316 to operation 2310.

Arrow 2320 designates the flow of execution and communication from starting operation 2300 to operation 2322 to process requests regarding shared node list generation. Operation 2322 generates the shared node list. Arrow 2324 designates the flow of execution from operation 2322 to operation 2310.

Operation 2310 determined whether there are more shared node list commands to process. Arrow 2302 designates the flow of execution and communication from starting operation 2310 to operation 2310, when there are more shared node list commands to process. Arrow 2326 designates the flow of execution to operation 2312, when there are no more shared node list commands to process. Operation 2312 exits the operations of this flowchart.

In certain embodiments, an object oriented software paradigm may provide the implementation framework for the implementation of the operations of this flowchart. In certain further embodiments, message passing provides the mechanism by which execution and data are transfer from one operation to another operation in this flowchart. In certain further embodiments, various operations of this flowchart may be performed concurrently. Please see the previous discussions of FIGS. 27 to 35 regarding the use of permission mechanisms to lock the context list collections and relationship collections while shared node list generation operations are performed.

Figure 39:
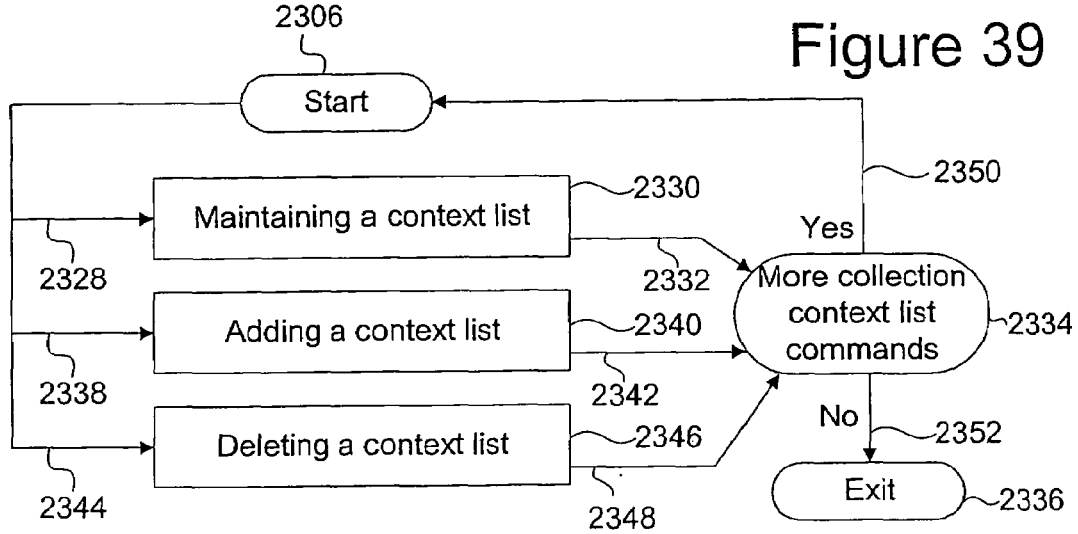
FIG. 39 is a detail flowchart for operation 2306 of FIG. 38 in accordance with an embodiment.

FIG. 39 is a detail flowchart for operation 2306 of FIG. 38 in accordance with an embodiment. Starting operation 2330 performs the initial context list maintenance command processing.

Arrow 2328 designates the flow of execution and communication from starting operation 2330 to operation 2330 to process requests regarding maintaining a context list. Operation 2330 maintains a context list. Arrow 2332 designates the flow of execution from operation 2330 to operation 2334.

Arrow 2338 designates the flow of execution and communication from starting operation 2330 to operation 2340 to process requests regarding adding a context list. Operation 2340 adds a context list. Arrow 2342 designates the flow of execution from operation 2340 to operation 2334.

Arrow 2344 designates the flow of execution and communication from starting operation 2330 to operation 2346 to delete a context list. Operation 2346 deletes a context list. Arrow 2348 designates the flow of execution from operation 2346 to operation 2334.

Operation 2334 determined whether there are more context list maintenance commands to process. Arrow 2350 designates the flow of execution and communication from starting operation 2334 to operation 2334, when there are more context list maintenance commands to process. Arrow 2352 designates the flow of execution to operation 2336, when there are no more context list maintenance commands to process. Operation 2336 exits the operations of this flowchart.

In certain embodiments, an object oriented software paradigm may provide the implementation framework for the implementation of the operations of this flowchart. In certain further embodiments, message passing provides the mechanism by which execution and data are transfer from one operation to another operation in this flowchart. In certain further embodiments, various operations of this flowchart may be performed concurrently.

Figure 40:
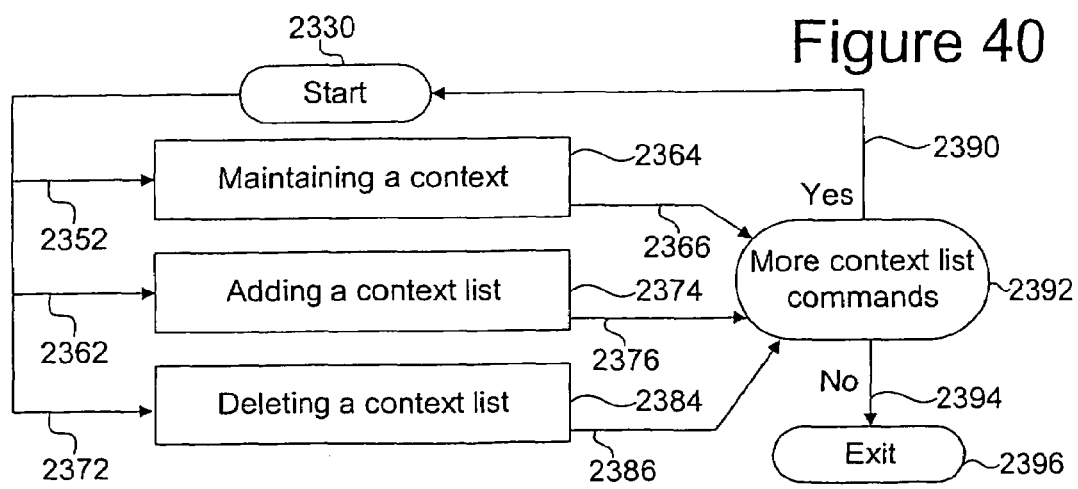
FIG. 40 is a detail flowchart for operation 2330 of FIG. 39 in accordance with an embodiment.

FIG. 40 is a detail flowchart for operation 2330 of FIG. 39 in accordance with an embodiment. Starting operation 2330 performs the initial context maintenance command processing.

Arrow 2362 designates the flow of execution and communication from starting operation 2330 to operation 2364 to process requests regarding maintaining a context. Operation 2364 maintains the context. Arrow 2366 designates the flow of execution from operation 2364 to operation 2392.

Arrow 2372 designates the flow of execution and communication from starting operation 2330 to operation 2374 to process requests regarding adding a context. Operation 2374 adds a context. Arrow 2376 designates the flow of execution from operation 2374 to operation 2392.

Arrow 2382 designates the flow of execution and communication from starting operation 2330 to operation 2384 to process deleting a context. Operation 2384 deletes a context. Arrow 2386 designates the flow of execution from operation 2384 to operation 2392.

Operation 2392 determined whether there are more context maintenance commands to process. Arrow 2390 designates the flow of execution and communication from starting operation 2392 to operation 2392, when there are more context maintenance commands to process. Arrow 2394 designates the flow of execution to operation 2396, when there are no more context maintenance commands to process. Operation 2396 exits the operations of this flowchart.

In certain embodiments, an object oriented software paradigm may provide the implementation framework for the implementation of the operations of this flowchart. In certain further embodiments, message passing provides the mechanism by which execution and data are transfer from one operation to another operation in this flowchart. In certain further embodiments, various operations of this flowchart may be performed concurrently.

FIGS. 38, 39 and 40 taken collectively have been presented to illustrate a simple, modular approach to making and using a useful collection of operations to develop and maintain a collection of context lists and collection of relationships, as well as generate a shared node list from them. In certain embodiments, commands regarding the operations maintaining context list collections, context lists and contexts, operations maintaining relationship collections, relationships and operations generating shared node lists might be distributed from a single command processor similar to operation 2300 while removing the necessity of operations 2306 and 2330. Implementation variations of this sort will be apparent to anyone of ordinary skill in the art.

Figure 41:
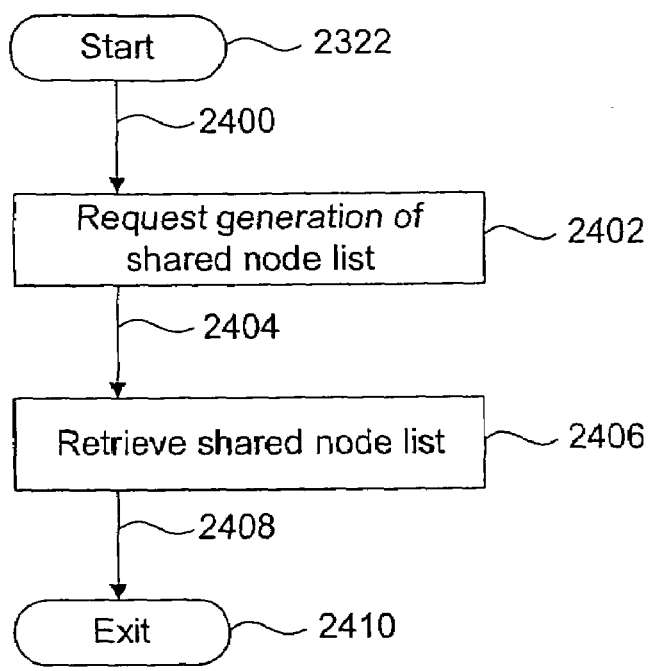
FIG. 41 is a detail flowchart for operation 2322 of FIG. 38 in accordance with an embodiment.

FIG. 41 is a detail flowchart for operation 2322 of FIG. 38 in accordance with an embodiment. Starting operation 2322 in certain embodiments includes allocation of systems resources for the performance of the operation of this flowchart. Arrow 2400 designates the flow of execution from starting operation 2322 to operation 2402. Operation 2402 request generation of the shared node list from the context list collection and relationship collection. Arrow 2404 designates the flow of execution from operation 2402 to operation 2406. Operation 2406 retrieves the shared node list generated from the context list collection and relationship collection. Arrow 2408 designates the flow of execution from operation 2406 to operation 2410. Operation 2410 exits the operations of this flowchart.

Figure 42:
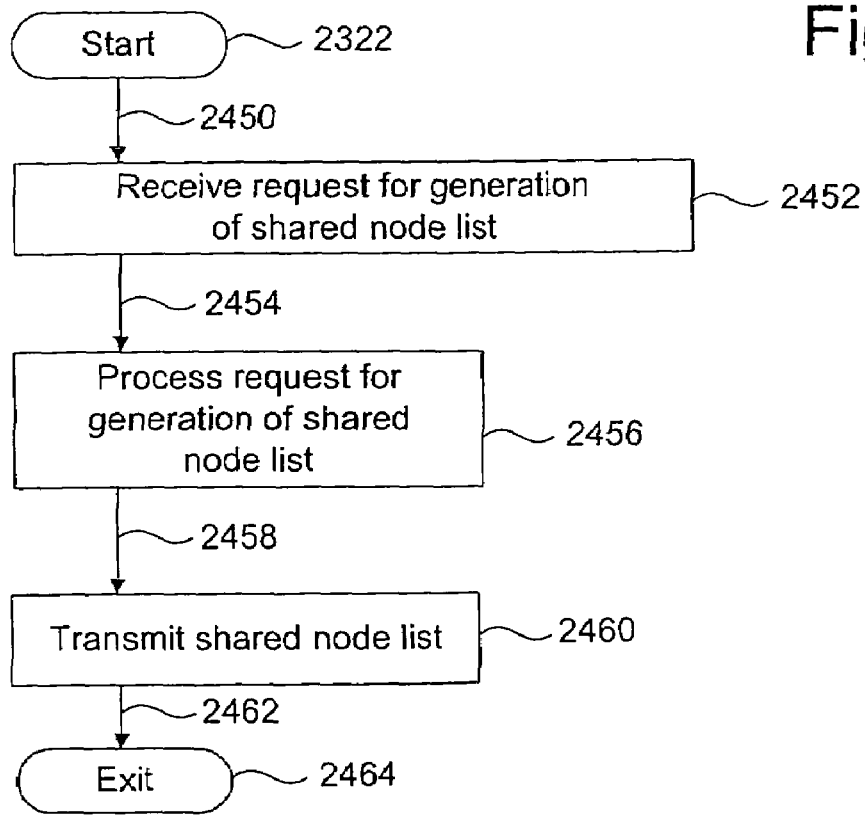
FIG. 42 is a detail flowchart for operation 2322 of FIG. 38 in accordance with an embodiment.

FIG. 42 is a detail flowchart for operation 2322 of FIG. 38 in accordance with an embodiment. Starting operation 2322 in certain embodiments includes allocation of systems resources for the performance of the operation of this flowchart. Arrow 2450 designates the flow of execution from starting operation 2322 to operation 2452. Operation 2452 receives a request for generation of the shared node list from the context list collection and relationship collection. Arrow 2454 designates the flow of execution from operation 2452 to operation 2456. Operation 2456 processes a request for generation of the shared node list from the context list collection and relationship collection. Arrow 2458 designates the flow of execution from operation 2456 to operation 2460. Operation 2460 transmits the generated shared node list. Arrow 2462 designates the flow of execution from operation 2460 to operation 2464. Operation 2464 exits the operations of this flowchart.

Figure 43:
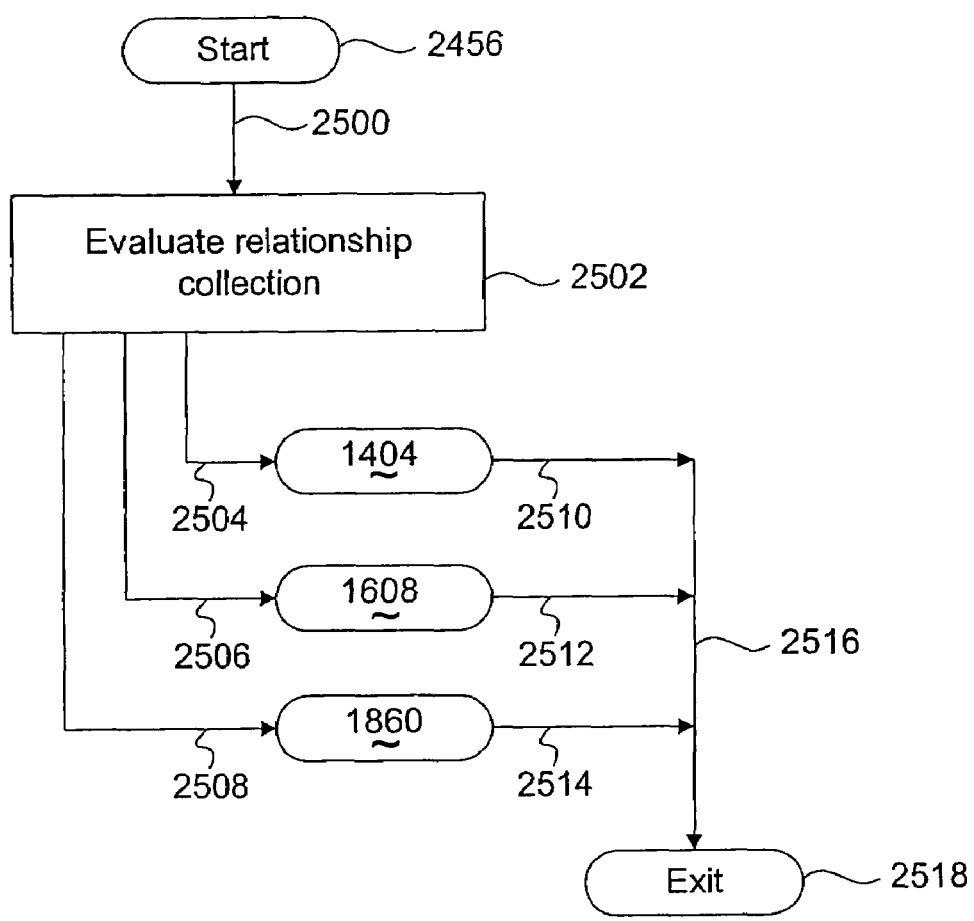
FIG. 43 is a detail flowchart for operation 2456 of FIG. 42 in accordance with an embodiment.

FIG. 43 is a detail flowchart for operation 2456 of FIG. 42 in accordance with an embodiment. Starting operation 2456 in certain embodiments includes allocation of systems resources for the performance of the operation of this flowchart. Arrow 2500 designates the flow of execution from starting operation 2456 to operation 2502. Operation 2502 evaluates the relationship collection of the received request.

Arrow 2504 designates the flow of execution from operation 2502 to operation 1404, when the relationship collection is found not to contain relationships with salience ranges or satisfaction choices. Operation 1404 generates of the shared node list from the context list collection and relationship collection, where the shared node list includes nodes from contexts satisfying at least one relationship. Arrow 2510, combined with arrow 2516 designates the flow of execution from operation 1404 to operation 2518.

Arrow 2506 designates the flow of execution from starting operation 2456 to operation 1608, when the relationship collection is found not to contain relationships with salience ranges, but possessing satisfaction choices. Operation 1608 generates of the shared node list from the context list collection and relationship collection, where the shared node list includes nodes from contexts satisfying relationships with regards to associated satisfaction choices. Arrow 2512, combined with arrow 2516 designates the flow of execution from operation 1608 to operation 2518.

Arrow 2508 designates the flow of execution from starting operation 2456 to operation 1860, when the relationship collection is found to contain relationships with salience ranges. Operation 1860 generates of the shared node list from the context list collection and relationship collection, where the shared node list includes nodes from contexts satisfying relationship with salience found in an associated satisfaction range. Arrow 2514, combined with arrow 2516 designates the flow of execution from operation 1860 to operation 2518. Operation 2518 exits the operations of this flowchart.

Figure 44:
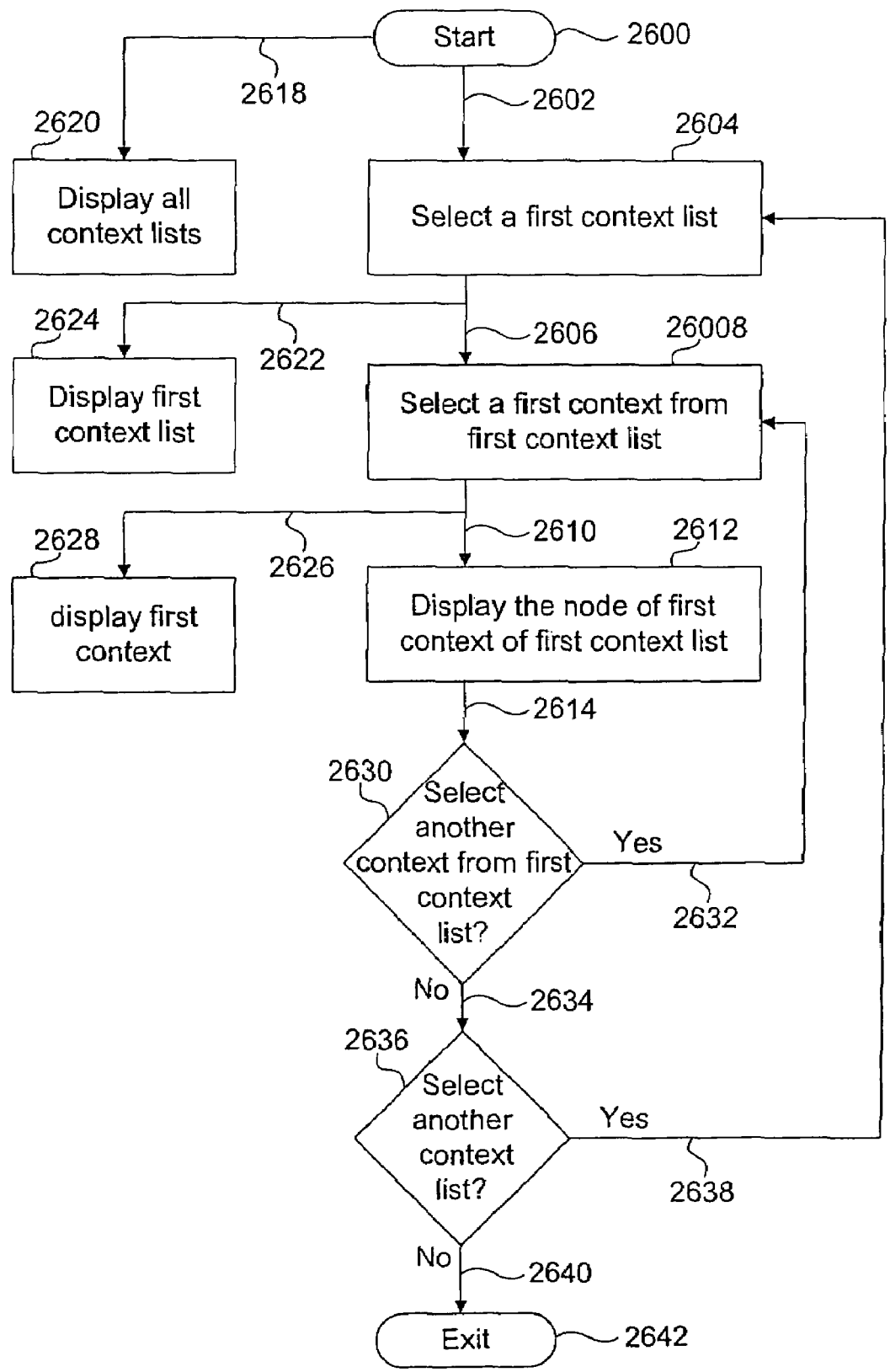
FIG. 44 is a flowchart of hypergraph display and traversal in accordance with an embodiment.

FIG. 44 is a flowchart of hypergraph display and traversal in accordance with an embodiment. Starting operation 2600 allocates systems resources in certain embodiments. Arrow 2602 designates the flow of execution from starting operation 2600 to operation 2604. Operation 2604 selects a first context list from the collection of context lists. Arrow 2618 designates the flow of execution from starting operation 2600 to operation 2620. Operation 2620 displays the collection of context lists.

Arrow 2606 designates the flow of execution from starting operation 2604 to operation 2608. Operation 2608 selects a first context from the first context list. Arrow 2622 designates the flow of execution from starting operation 2604 to operation 2624. Operation 2620 displays the first context list.

Arrow 2610 designates the flow of execution from starting operation 2608 to operation 2612. Operation 2612 selects a first context from the first context list. Arrow 2626 designates the flow of execution from starting operation 2608 to operation 2628. Operation 2628 displays the first context.

Arrow 2614 designates the flow of execution from starting operation 2612 to operation 2630. Operation 2630 determines whether to select another context from the first context list. Arrow 2632 designates the flow of execution from starting operation 2630 to operation 2604, when another context from the first context list is to be selected. Arrow 2634 designates the flow of execution from starting operation 2630 to operation 2636, when another context is not to be selected from the first context list.

Operation 2636 determines whether to select another context list from the collection of context lists. Arrow 2638 designates the flow of execution from starting operation 2636 to operation 2604, when another context list from the context list collection is to be selected. Arrow 2640 designates the flow of execution from starting operation 2636 to operation 2642, when another context list is not to be selected from the context list collection. Operation 2642 exits the operation of this flowchart.

In certain preferred embodiments, operation 2620 and arrow 2618 are not implemented. In certain preferred embodiments, operation 2624 and arrow 2622 are not implemented. In certain preferred embodiments, operation 2628 and arrow 2626 are not implemented.

Figure 45A:
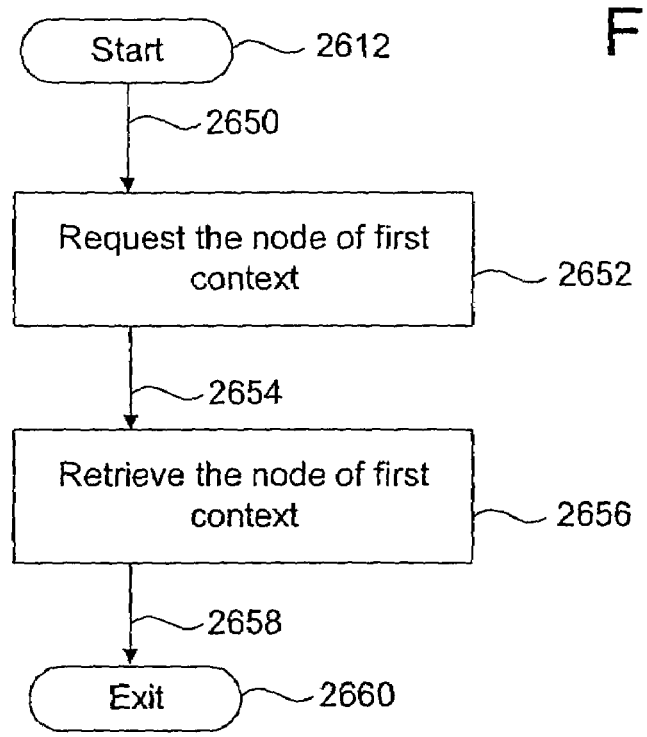
FIG. 45A is a detail flowchart for operation 2612 of FIG. 44 in accordance with an embodiment.

FIG. 45A is a detail flowchart for operation 2612 of FIG. 44 in accordance with an embodiment. Starting operation 2612 in certain embodiments includes allocation of systems resources for the performance of the operation of this flowchart. Arrow 2650 designates the flow of execution from starting operation 2612 to operation 2652. Operation 2652 requests the node of the first context. Arrow 2654 designates the flow of execution from operation 2652 to operation 2656. Operation 2656 receives the node of the first context. Arrow 2658 designates the flow of execution from operation 2656 to operation 2660. Operation 2660 exits the operations of this flowchart.

Figure 45B:
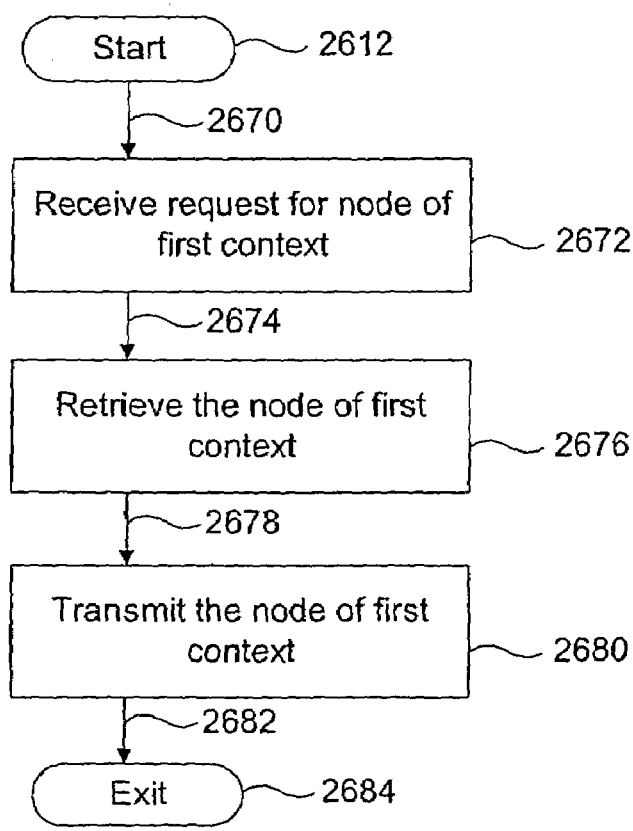
FIG. 45B is a detail flowchart for operation 2612 of FIG. 44 in accordance with an embodiment.

FIG. 45B is a detail flowchart for operation 2612 of FIG. 44 in accordance with an embodiment. Starting operation 2612 in certain embodiments includes allocation of systems resources for the performance of the operation of this flowchart. Arrow 2670 designates the flow of execution from starting operation 2322 to operation 2672. Operation 2672 receives a request for the node of the first context. Arrow 2674 designates the flow of execution from operation 2672 to operation 2676. Operation 2676 retrieves the node of the first context. Arrow 2678 designates the flow of execution from operation 2676 to operation 2480. Operation 2480 transmits the node of the first context. Arrow 2482 designates the flow of execution from operation 2480 to operation 2484. Operation 2484 exits the operations of this flowchart.

We claim:

1. A method, comprising:
a computer system receiving information specifying a search query, wherein the search query includes three or more search criteria;
the computer system creating a node list, wherein the creating includes adding to the node list nodes in an information hierarchy that satisfy one or more of the specified three or more search criteria;
the computer system using the node list to generate data usable by a system having a display device to display a first visual representation that includes first and second portions;
wherein the first portion includes a depiction of one or more nodes within the information hierarchy that satisfy a first combination of the three or more specified search criteria; and
wherein the second portion includes two or more elements, each of which is selectable to navigate directly from the first visual representation to a corresponding other visual representation, wherein each of the other visual representations corresponds to a respective combination of the three or more search criteria that is different from the first combination, and wherein each of the other visual representations includes a depiction of one or more nodes within the information hierarchy that satisfy the respective combination corresponding to that visual representation.

2. The method of claim 1, wherein the three or more search criteria include first, second, and third search criteria, and wherein the first combination of the three or more search criteria includes each of the first, second, and third search criteria; and
wherein a first of the two or more elements is selectable to navigate directly to a visual representation that includes a depiction of one or more nodes satisfying the first and second search criteria but not the third search criteria; and
wherein a second of the two or more elements is selectable to navigate directly to a visual representation that includes a depiction of one or more nodes satisfying the second and third search criteria but not the first search criteria.

3. The method of claim 1, wherein the information hierarchy includes information stored throughout a wide-area network.

4. The method of claim 1, wherein the system having the display device is the computer system.

5. The method of claim 1, wherein each node in the plurality of nodes is included in at least one of a plurality of contexts; and
wherein the information hierarchy includes a first of the plurality of nodes located within a first of the plurality of contexts, wherein the first node is a file and the first context is a directory.

6. The method of claim 1, wherein at least one of the three or more search criteria includes a range of numbers.

7. The method of claim 1, wherein at least one of the three or more search criteria specifies content, wherein a given node satisfies the at least one search criteria if the given node essentially includes the specified content.

8. The method of claim 7, further comprising receiving a salience indication for the at least one search criteria.

9. The method of claim 8, wherein the salience indication specifies that the specified content appears in a given node at least a minimum number of times.

10. The method of claim 9, wherein the node satisfies the salience indication if the node essentially includes the specified content at least the minimum number of times.

11. The method of claim 1, farther comprising determining a salience value for one or more of the nodes in the node list.

12. The method of claim 11, wherein the salience value for a given node in the node list estimates the relevance of the given node to one or more of the search criteria.

13. The method of claim 12, wherein a node in the one or more nodes is a file, and wherein the salience value for the node is determined at least in part by the proximity of specified terms within the file.

14. The method of claim 1, wherein at least one of the three or more search criteria includes a particular attribute, wherein the at least one search criteria is satisfied for a given node if the given node has essentially the same particular attribute.

15. The method of claim 14, further comprising receiving a satisfaction value corresponding to the at least one search criteria, wherein the satisfaction value specifies a desired value or range of values for the particular attribute.

16. The method of claim 15, wherein, with regard to the at least one search criteria a node is added to the node list only if the node has a value of the particular attribute that matches the desired value or range of values specified by the satisfaction value.

17. The method of claim 1, wherein the search query further includes one or more Boolean operators including a first Boolean operator, and wherein the first combination is based, at least in part, on the first Boolean operator.

18. A computer system comprising:
one or more processors;
memory storing program instructions executable by the one or more processors to:
receive information specifying a search query, wherein the search query includes three or more search criteria applicable to data within an information hierarchy, wherein the information hierarchy includes a plurality of nodes;
for each node in the plurality of nodes, add that node to a node list, if that node satisfies one or more of the three or more search criteria;
generate data using the node list, wherein the generated data is usable by a system having a display device to display a first visual representation that includes first and second portions;
wherein the first portion includes a depiction of one or more nodes within the information hierarchy that satisfy a first combination of the three or more search criteria; and
wherein the second portion includes two or more elements, each of which is selectable to navigate directly from the first visual representation to a corresponding other visual representation, wherein each of the other visual representations corresponds to a respective combination of the three or more search criteria that is different from the first combination, and wherein each of the other visual representations includes a depiction of one or more nodes within the information hierarchy that satisfy the respective combination corresponding to that visual representation.

19. The system of claim 18, wherein the information hierarchy includes information stored throughout a network.

20. The system of claim 18, wherein each node in the plurality of nodes is included in at least one of a plurality of contexts; and
the information hierarchy includes a first of the plurality of nodes located within a first of the plurality of contexts, wherein the first node is a file and the first context is a directory.

21. The system of claim 18, wherein at least one of the three or more search criteria specifies a range of numbers.

22. The system of claim 18, wherein at least one of the three or more search criteria specifies content, wherein a given node satisfies the at least one search criteria if the given node essentially includes the specified content.

23. The system of claim 22, wherein the program instructions are executable by the one or more processors to receive a salience value associated with the at least one search criteria.

24. The system of claim 18, wherein the salience value is a numeric value, and wherein a particular node satisfies the salience value if the particular node includes at least a minimum number of instances of the specified content, wherein the minimum number corresponds to the numeric value.

25. The system of claim 18, wherein said the program instructions are executable by the one or more processors to determine a salience value for one or more of the nodes added to the node list.

26. The system of claim 25, wherein the salience value for a given node added to the node list is an estimate of the relevance of the given node to one or more of the search criteria.

27. The system of claim 26, wherein the given node is a file, and wherein the salience value for the given node is determined at least in part by the proximity of specified terms within the file.

28. The system of claim 18, wherein at least one of the three or more search criteria includes a particular attribute, wherein the at least one search criteria is satisfied for a given node if the given node has essentially the same particular attribute.

29. The system of claim 28, wherein the program instructions are executable by the one or more processors to receive a satisfaction value for the at least one search criteria, wherein the satisfaction value specifies a desired value or range of values for the particular attribute.

30. The system of claim 29, wherein, with regard to the at least one search criteria, a particular node is added to the node list only if the particular node has a value of the particular attribute that matches the desired value or range of values specified by the satisfaction value.

31. The computer system of claim 18, wherein the search query further includes one or more Boolean operators including a first Boolean operator, and wherein the first combination is based, at least in part, on the first Boolean operator.

32. A tangible computer-readable medium having stored thereon computer-executable instructions that, if executed by a computing device, cause the computing device to perform a method comprising:
receiving information specifying a search query, wherein the search query includes three or more search criteria applicable to data within an information hierarchy, wherein the information hierarchy includes a plurality of nodes;

for each node in the plurality of nodes, add that node to a node list, if that node satisfies one or more of the three or more search criteria;

generate data using the node list, wherein the generated data is usable by a system having a display device to display a first visual representation that includes first and second portions;

wherein the first portion includes a depiction of one or more nodes within the information hierarchy that satisfy a first combination of the three or more search criteria;

wherein the second portion includes two or more elements, each of which is selectable to navigate directly from the first visual representation to a corresponding other visual representation, wherein each of the other visual representations corresponds to a respective combination of the three or more search criteria that is different from the first combination, and wherein each of the other visual representations includes a depiction of one or more nodes within the information hierarchy that satisfy the respective combination corresponding to that visual representation.

33. The computer-readable medium of claim 32, wherein at least one of the three or more search criteria specifies a range of numbers.

34. The computer-readable medium of claim 32, wherein at least one of the three or more search criteria specifies content, wherein a given node satisfies the at least one search criteria if the given node essentially includes the specified content.

35. The computer-readable medium of claim 32, wherein said at least one of the three or more search criteria includes a particular attribute, wherein for a given node, the at least one search criteria is satisfied if the given node essentially includes the particular attribute.

36. The computer-readable medium of claim 35, wherein the program instructions are computer-executable to receive a satisfaction value for the at least one search criteria, wherein the satisfaction value specifies a desired value or range of values for the particular attribute.

37. The computer-readable medium of claim 32, wherein the program instructions are computer-executable to determine a salience value for one or more of the nodes added to the node list.

38. The computer-readable medium of claim 37, wherein the salience value for a given node added to the node list is an estimate of the relevance of the given node to one or more of the three or more search criteria.

39. The computer-readable medium of claim 32, wherein the search query further includes one or more Boolean operators including a first Boolean operator, and wherein the first combination is based, at least in part, on the first Boolean operator.

* * * * *